United States Patent [19]
Suzuki et al.

[11] Patent Number: 6,148,515
[45] Date of Patent: Nov. 21, 2000

[54] METHOD OF BONDING ALUMINUM MEMBERS

[75] Inventors: Nobuaki Suzuki, Shizuoka; Akihiro Sagara, Nagano; Shigenori Yamada, Shizuoka; Sotaro Terada, Shizuoka; Yutaka Takayanagi, Shizuoka; Hidehiko Amano, Shizuoka; Yoichi Shimasaki, Shizuoka; Masahiro Takahashi, Shizuoka, all of Japan

[73] Assignee: Suzuki Motor Corporation, Shizuoka, Japan

[21] Appl. No.: 08/790,314

[22] Filed: Jan. 28, 1997

[30] Foreign Application Priority Data

| Jan. 30, 1996 | [JP] | Japan | 8-035444 |
| Feb. 6, 1996 | [JP] | Japan | 8-044111 |
| Feb. 16, 1996 | [JP] | Japan | 8-054227 |
| Feb. 21, 1996 | [JP] | Japan | 8-058460 |
| Jun. 6, 1996 | [JP] | Japan | 8-166880 |
| Jun. 27, 1996 | [JP] | Japan | 8-186615 |
| Sep. 18, 1996 | [JP] | Japan | 8-267947 |

[51] Int. Cl.$^7$ ................................. B23P 11/00
[52] U.S. Cl. .................. 29/888.06; 29/458; 29/527.2; 228/111.5; 228/262.51
[58] Field of Search ................... 29/527.2, 458, 29/888.06, 888.061; 228/111.5, 111, 182, 199, 262.51; 420/516

[56] References Cited

U.S. PATENT DOCUMENTS

| 2,990,609 | 7/1961 | Ohmi . | |
| 3,543,383 | 12/1970 | Freeman et al. | 228/111 |
| 3,633,266 | 1/1972 | Taylor . | |
| 3,684,496 | 8/1972 | Tanaka et al. | 420/516 |
| 3,703,763 | 11/1972 | Berry | 228/199 |
| 3,949,118 | 4/1976 | Nagano et al. | 228/111.5 |
| 3,985,280 | 10/1976 | Yamaji et al. | 228/111.5 |
| 4,496,095 | 1/1985 | Renshaw et al. | 228/111 |

(List continued on next page.)

FOREIGN PATENT DOCUMENTS

| 203198 | 12/1986 | European Pat. Off. . |
| 1100352 | 4/1889 | Japan . |

(List continued on next page.)

OTHER PUBLICATIONS

Patent Abstracts of Japan, vol. 014, No. 361 (M–1006), Aug. 6, 1990.
Patent Abstracts of Japan, vol. 010, No. 326 (M–532), Nov. 6, 1986.

(List continued on next page.)

*Primary Examiner*—Irene Cuda
*Assistant Examiner*—Trinh Nguyen
*Attorney, Agent, or Firm*—Greenblum & Bernstein, P.L.C.

[57] ABSTRACT

The method of the present invention comprises the steps of:
providing a first aluminum member and a second aluminum member to be bonded to each other;
forming a zinc alloy soldering layer on the surface while applying ultrasonic vibration to any one of the first aluminum member and the second aluminum member; and bonding the first aluminum member and the second aluminum member through the zinc alloy soldering layer. That is, the first aluminum member and the second aluminum member are formed by casting. The first aluminum member is thereafter immersed in a molten zinc alloy soldering bath. Ultrasonic vibration is applied, and a zinc alloy soldering layer is formed in a prescribed region of the first aluminum member. Further, a zinc alloy soldering layer is formed in a prescribed region of the second aluminum member in the same manner as in the first aluminum member. Then, the first aluminum member and the second aluminum member are bonded through the zinc alloy soldering layer.

Upon bonding, ultrasonic vibration is applied, or the members are heated to a temperature over the melting point of the zinc alloy solder.

29 Claims, 63 Drawing Sheets

U.S. PATENT DOCUMENTS

| | | | |
|---|---|---|---|
| 4,523,710 | 6/1985 | Renshaw et al. | 228/111 |
| 5,002,217 | 3/1991 | Tani et al. | 228/111 |
| 5,182,854 | 2/1993 | Voss | 29/888.061 |
| 5,183,025 | 2/1993 | Jorstad et al. | 29/888.061 |
| 5,288,006 | 2/1994 | Otsuka et al. | 228/111 |
| 5,320,158 | 6/1994 | Helgesen | 29/888.061 |
| 5,333,581 | 8/1994 | Cagle | 29/888.06 |
| 5,403,785 | 4/1995 | Arai et al. | 228/111 |
| 5,768,779 | 6/1998 | Adachi | 29/888.061 |
| 5,778,531 | 7/1998 | Inami et al. | 29/888.061 |

FOREIGN PATENT DOCUMENTS

| | | |
|---|---|---|
| 60-155661 | 8/1985 | Japan . |
| 61-132752 | 6/1986 | Japan . |
| 1100352 | 4/1989 | Japan . |
| 1147145 | 6/1989 | Japan . |
| 2127970 | 5/1990 | Japan . |
| 2105557 | 8/1990 | Japan . |
| 2103981 | 3/1983 | United Kingdom . |

OTHER PUBLICATIONS

Patent Abstracts of Japan, vol. 009, No. 324 (C–320), Dec. 19, 1985.

Patent Abstracts of Japan, vol. 013, No. 405 (M–868), Sep. 7, 1989.

Patent Abstracts of Japan, vol. 013, No. 311 (M–851), Jul. 17, 1989.

European Search Report and Annex.

FIG. 12

| Material | | Bonding strength | Fracture position |
|---|---|---|---|
| A | B | | |
| ADC12 | ADC12 | av. 142 MPa | Substrate |
| AC4B | AC4B | av. 200 MPa | Substrate |

METHOD OF BONDING ALUMINUM MEMBERS

BACKGROUND OF THE INVENTION

1. Field of the Invention

The present invention relates to a method of bonding aluminum members, and more particularly, to a method of bonding together a plurality of aluminum castings formed by die casting.

2. Description of the Prior Art

The following methods of bonding aluminum members have conventionally been available. For example, it is the recent increasing tendency for the cylinder block of a water-cooling type internal combustion engine such as an automobile engine to be manufactured from aluminum. Types of cylinder blocks include the so-called closed deck type and the open deck type. In the closed deck type cylinder block, a cooling water channel is formed around the cylinder, and members on the cylinder side and on the cylinder block side are partially bonded together at the top end. In the open deck type one, on the other hand, a cooling water channel is formed on the entire periphery of the cylinder, with the entire cylinder periphery being open at the top end of the cylinder block, and the cooling water channel is formed in the shape of glasses.

For structural reasons, the closed type cylinder block is manufactured generally by the low pressure casting method, and the open deck type is manufactured by the die casting method. Because the entire upper end of the cylinder block of the open deck type is open, this portion is low in strength. The following improvements have therefore been proposed.

For example, Japanese Unexamined Patent Publication No. 1-100352 (first document) proposes a method of fixing by welding a piece member of a prescribed shape to an opening of the cooling water channel. Japanese Unexamined Patent Publication No. 1-147145 (second document) proposes a method of fixing by welding a prescribed piece member to the open portion of the cooling water channel, in which the piece member comprises aluminum alloy having a melting point higher than that of the cylinder block body. Japanese Unexamined Patent Publication No. 2-105557 (third document) proposes a method which comprises making a prescribed plug member (piece member) from a material having a melting point lower than that of the cylinder block body, and attaching this member to the cylinder block body by heating with a heat source such as an arc or a laser.

SUMMARY OF THE INVENTION

The present invention provides a method of bonding aluminum members comprising a first aluminum member and a second aluminum member to be bonded together, which comprises:

- a soldering layer forming step of forming a zinc alloy soldering layer on at least any of the surfaces of the first aluminum member and the second aluminum member while applying ultrasonic vibration thereon; and
- a bonding step of bonding together the first aluminum member and the second aluminum member through the zinc alloy soldering layer.

One of the preferred embodiments of the bonding step is to bond the aluminum members while applying ultrasonic vibration to the aluminum members.

Another preferred embodiment of the bonding step is to accomplish bonding while pressing the first aluminum member and the second aluminum member against each other.

BRIEF DESCRIPTION OF THE DRAWINGS

FIG. 3(A) shows the state before insertion and FIG. 3(B), the state immediately before insertion;

FIG. 4(A) shows a case where a cylinder liner forms a cooling water channel only in the upper portion, and FIG. 4(B) shows a case where the cylinder liner forms a cooling water channel throughout the entire body;

FIG. 10(A) corresponds to the cylinder block body and FIG. 10(B), to the bonding member;

FIG. 12 illustrates the result of a tensile test carried out on the test pieces shown in FIGS. 10 and 11;

FIG. 14 illustrates solidification start temperature (° C.) and hardness (HRB) of an alloy comprising 3.5 wt. % Al, Mg in wt. % shown on the abscissa, and the balance Zn;

FIG. 27(A) shows the cylinder block body, and FIG. 27(B) shows the sealing member;

FIG. 28(A) shows the state before bonding, and FIG. 28(B) shows the state after bonding;

FIG. 29(A) shows the cylinder block body, and FIG. 29(B) shows the sealing member;

FIG. 30(A) shows the state before bonding, and FIG. 30(B) shows the state after bonding;

FIG. 48(A) shows a first bonding member, and FIG. 48(B) shows a second bonding member;

FIG. 53(A) shows a plan view, and FIG. 53(B) shows a front view;

FIG. 62(A) shows the deck member, and FIG. 62(B) shows the cylinder block body;

FIG. 68(A) is a plan view of the deck member, and FIG. 68(B) is a plan view of the cylinder block body;

FIG. 71 is a flowchart illustrating a sixth embodiment;

(FIG. 81 is a sectional view illustrating the state of coating a zinc alloy soldering layer onto the bonding surface of the cylinder block body.)

DETAILED DESCRIPTION OF THE PREFERRED EMBODIMENTS

A first embodiment of the present invention will be described below.

Figure 1:
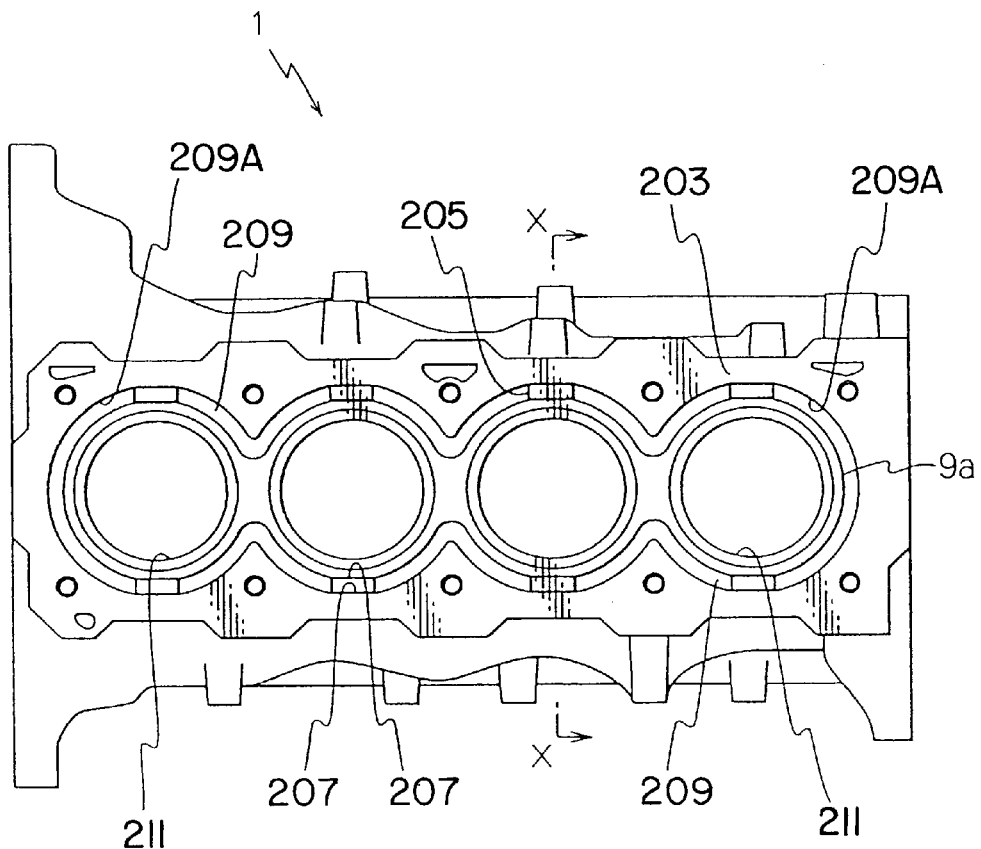
FIG. 1 is a plan view illustrating a first embodiment of the cylinder block of the present invention.
Figure 2:
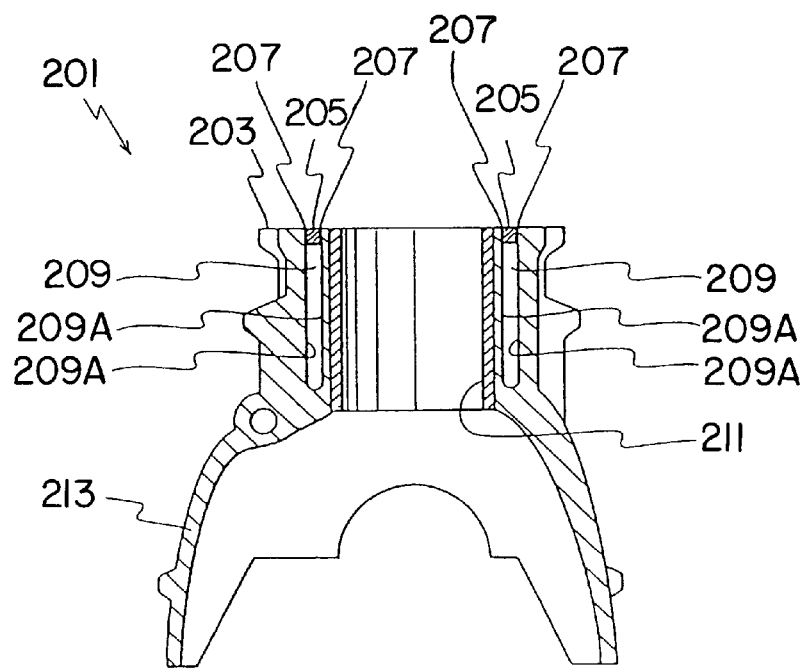
FIG. 2 is a side sectional view of the cylinder block shown in FIG. 1 cut along the line X—X.
Figure 4A:
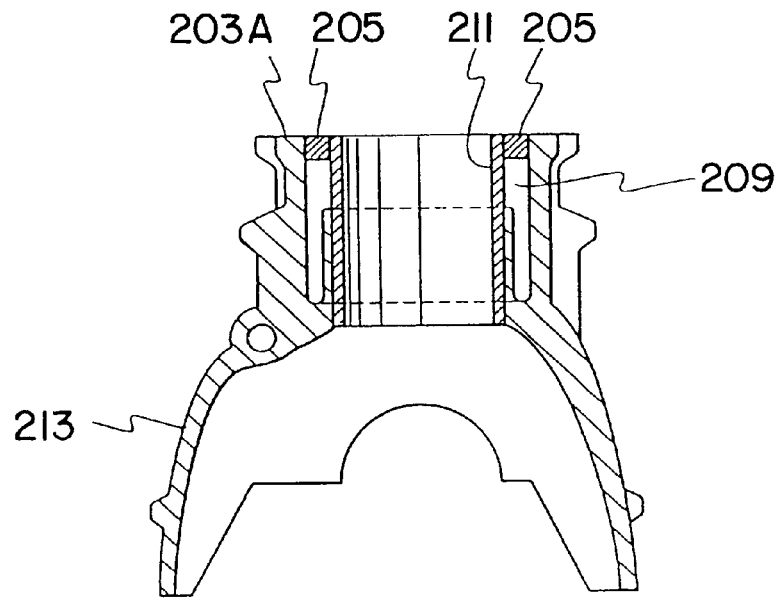
FIGS. 4(A) and 4(B) are sectional views illustrating another open deck type cylinder block body.
Figure 4B:
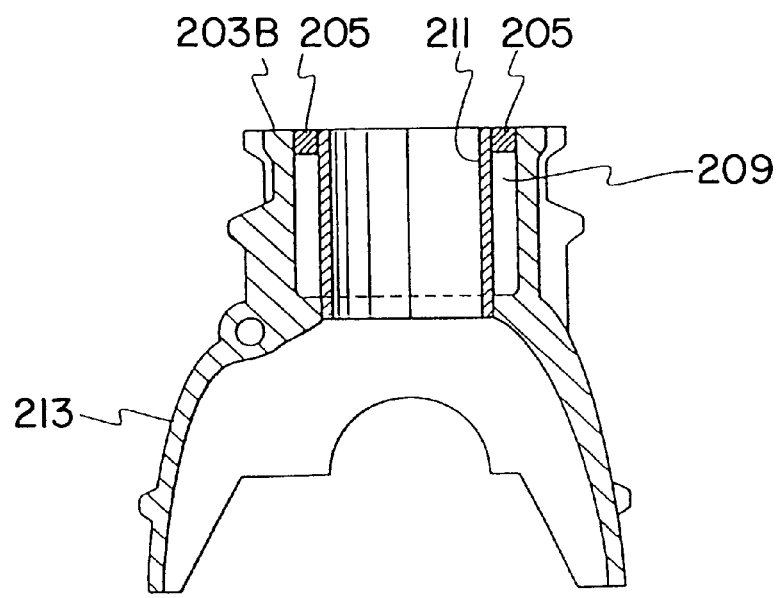

In FIG. 1 or 2, reference numeral 203 represents a cylinder block body of an engine (not shown), 205 is a bonding member, and 207 is a bonding portion formed by ultrasonic vibration. FIGS. 1 and 2 show a dry liner type cylinder block. The present invention is not limited to this, but is applicable also to a half-wet liner type cylinder block shown in FIG. 4(A) and a wet liner type cylinder block shown in FIG. 4(B).

The cylinder block body 203 is formed by an aluminum (alloy) casting, and the bonding members 205 are individually formed by an aluminum alloy. The plurality of bonding members 205 are inserted into a channel wall 209*a* of a cooling water channel 209 through a zinc alloy soldering layer. That is, the bonding members are bonded between the channel walls 209*a* of the cooling water channel 209 open at the top end of the cylinder block body 203.

In this case, when bonding the channel walls 209*a* of the cylinder block body 203 and the bonding member 205, the zinc alloy soldering layer is formed on the surface of the bonding portion by first immersing each bonding portion into a molten solder in a soldering tank, and applying ultrasonic vibration. Then, the bonding member 205 is inserted into the channel walls 209*a* under a prescribed pressing force. This is followed by uniformly heating the portion surrounding the bonding portion 207 for melting, and bonding is accomplished by applying ultrasonic vibration under a pressure.

For heating the portion surrounding the bonding portion 207, high-frequency heating technique is used to uniformly heating the surrounding portion. Heating is not however limited to this, but for example, low-frequency heating may be applied, or heating with an LPG gas burner may be used. Bonding may be accomplished by placing the bonding member 205 as inserted in the channel walls 209*a* into the heating furnace, taking out from the furnace after heating the entire assembly, and applying ultrasonic vibration while pressing under a prescribed pressure as described above.

In this embodiment, as shown in FIGS. 1 and 2, four cylinders are arranged in a row, forming a cylinder block body 203 for an engine known as a four-cylinder engine. This cylinder block body 203 is a die-cast aluminum casting. The material thereof is ADC10, ADC12 or ADC14 used commonly. The cooling water channel 209 is formed over the entire periphery of the cylinder liner 211.

As shown in FIG. 2, the top end of the cooling water channel 209 is open before the insertion of the bonding member 205. FIG. 2 is a sectional view of the finished product having the bonding member 205 inserted therein shown in FIG. 1 cut along the line X—X. In FIG. 2, the top end of the cylinder block body 203 is processed flat so as to allow attachment of a cylinder head not shown. The cooling water channel 209 is formed into the shape of glasses (see FIG. 1) so as to surround each cylinder, and cooling water channels 209 for all the cylinders are connected to each other.

The region below the cylinder block body 203 has a crank case 213 formed so as to attach a prescribed crank shaft (not shown) therein. The lower end of this crank case 213 is composed of a flat surface so as to come into contact with a bottom case not shown, and is connectible together with a bolt member not shown.

Figure 3A:
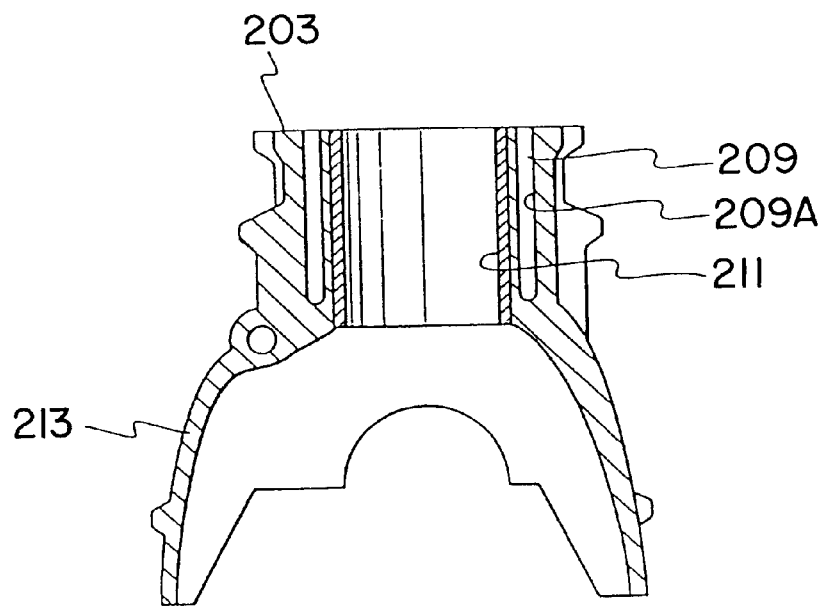
FIGS. 3(A) and 3(B) are descriptive views illustrating insertion of a member to be bonded into a cylinder block body.

Now, the method for manufacturing the cylinder block 201 will be described. As shown in FIG. 3(A), an open deck type cylinder block body 203 in which the entire top end of the cooling water channel 209 is open is used. After manufacture by the casting method (die casting) (S1 in FIG. 8), this cylinder block body 203 is subjected to a prescribed machining (S2 in FIG. 8), and then preheated to about 350° C. on the maximum (S3 in FIG. 8).

For reference, an embodiment of the present invention as applied to another open deck type cylinder block body is shown in FIG. 4. These cylinder block bodies 203*a* and 203*b* are called the half-west liner type and the wet liner type, respectively. After casting of the cylinder block body, a separate cylinder liner having a processed outer periphery is pressure inserted into the cylinder block body. Therefore, the bonding portion is formed through bonding of different materials comprising aluminum on the cylinder block side and a cast iron cylinder liner. A firm bonding is however possible by appropriately selecting a material for the bonding member and a material for soldering.

Figure 5:
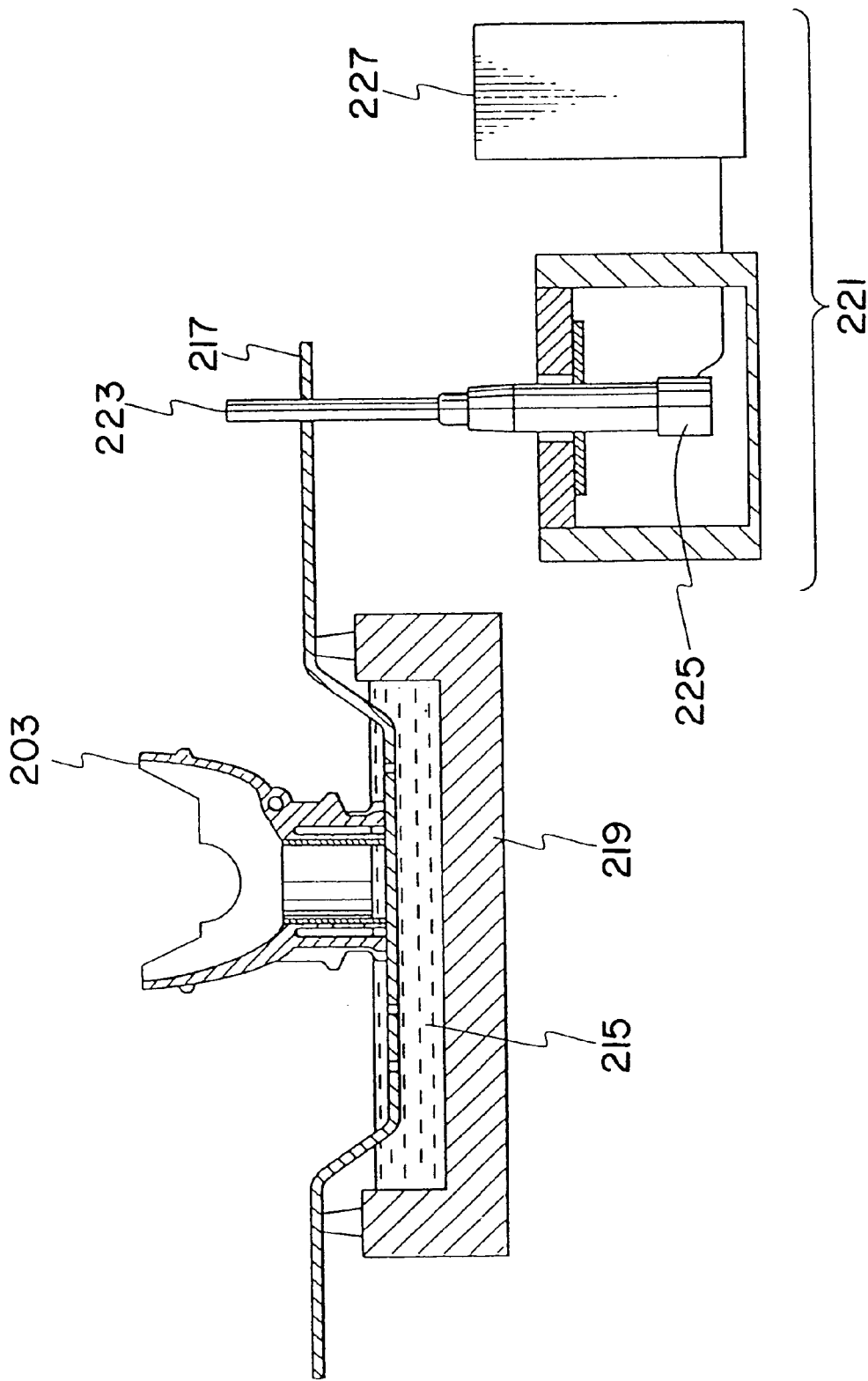
FIG. 5 is a schematic descriptive view of an apparatus for ultrasonic-soldering the cylinder block body.

Upon bonding in this embodiment, as shown in FIG. 5, zinc alloy soldering layers are previously formed by ultrasonic vibration on appropriate portions of the both members. More specifically, as shown in FIG. 5, a portion of the cylinder block body 203 is immersed in a molten zinc alloy soldering bath 215, and zinc alloy soldering is carried out to the bonding portion 207 of the channel wall 209a (S4 in FIG. 8). In the cylinder block body 203, a zinc alloy soldering layer is formed only on the end region on the side to be attached with the cylinder head: the zinc alloy soldering layer is formed over a portion of about 30 mm from the upper end. For zinc alloy soldering, for example, a material having a melting point of about 382° C. is employed. This zinc alloy solder is melted, and temperature is held within a range of from 410 to 430° C. The foregoing bonding portion is immersed in this molten zinc alloy soldering bath 215, and ultrasonic vibration is applied.

Ultrasonic vibration should preferably have a frequency within a range of from about 18 to 20 kHz, and should be applied with an output of the oscillator within a range of from 100 to 1,000 W. Ultrasonic vibration is applied for several seconds. The prescribed zinc alloy soldering layer is thus formed on the channel wall 209 of the cylinder block body 203.

Now, an apparatus for applying ultrasonic vibration to the cylinder block body 203 will be described below in detail. The cylinder block body 203 is carried on a prescribed vibration plate 217 as shown in FIG. 5, and the upper end portion is immersed in the molten zinc alloy soldering bath 215. This molten zinc alloy soldering bath 215 is held by a soldering tank 219 with a heater, which maintains the temperature of molten zinc alloy solder at the above-mentioned value. An ultrasonic oscillator 221 is engaged with the vibration plate 217 to allow communication of ultrasonic vibration. This ultrasonic oscillator 221 comprises a horn 223 imparting vibration to the foregoing vibration plate 217, a vibrator 225 providing the horn 223 with vibration, and an oscillator 227 communicating an oscillation signal to the vibrator 225.

In FIG. 5, the upper and lower portions of the vibration plate 217 are illustrated as being separated. The vibration plate 217 is immersed in the molten zinc alloy soldering bath 215 by a prescribed depth so as not to allow ultrasonic vibration to be applied to the wall of the soldering tank 219 with a heater. Therefore, in the end region of the cylinder block body 203, molten solder can flow even into the portion immersed in the molten zinc alloy soldering bath 215.

Figure 8:
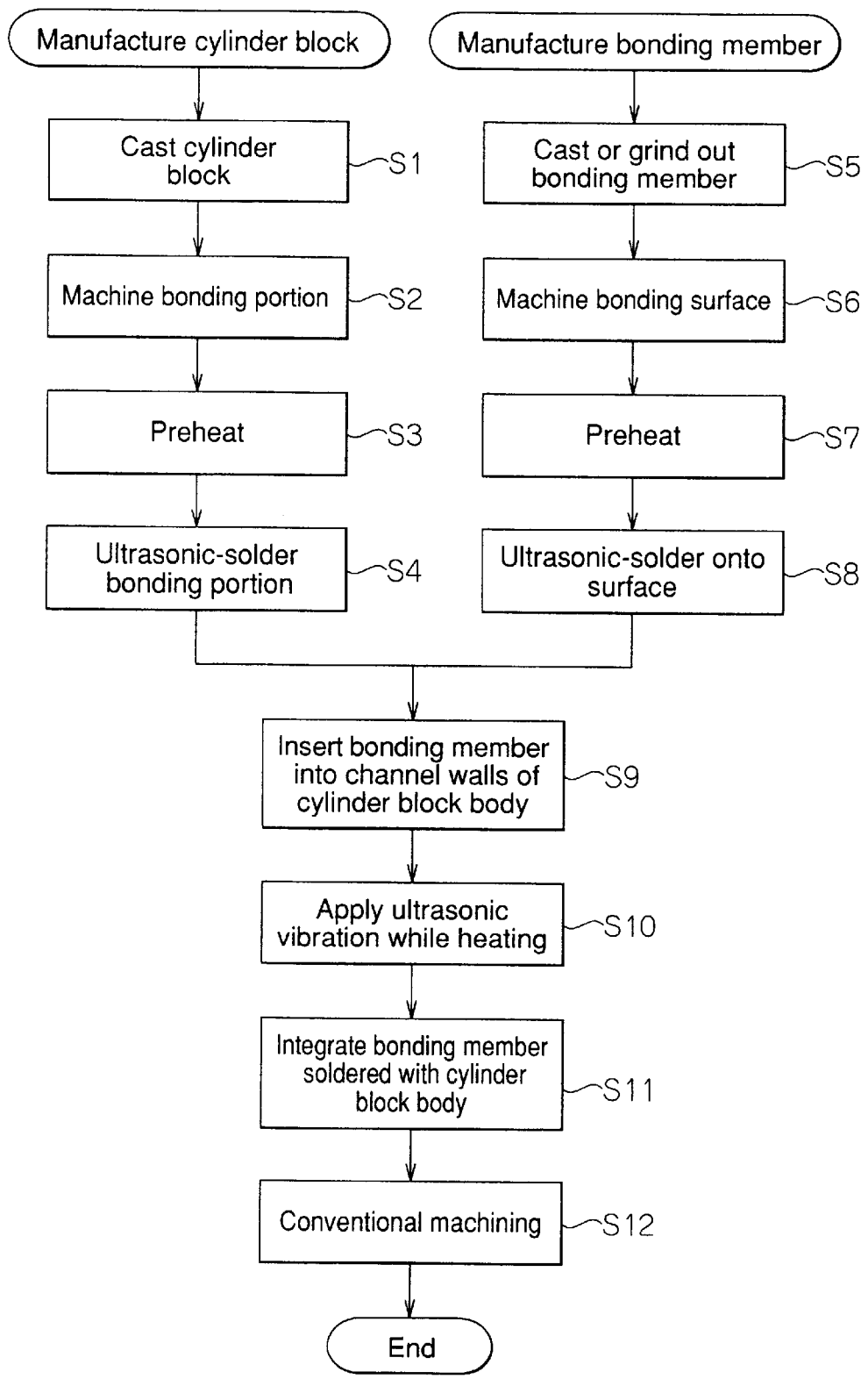
FIG. 8 is a flowchart of the manufacture of the cylinder block.

When manufacturing the bonding member 205, on the other hand, the member is formed into a shape and size which permit insertion thereof into the channel wall 209a of the cooling water channel 209 by the die casting process (S5 in FIG. 8). The manufacturing method is not however limited to the die casting process, but the member may be manufactured by grinding out a prescribed shape from a rolled material. Then, the surface to be bonded to the cooling water channel 209 is machined (S6 in FIG. 8).

After machining, the member is preheated to up to 350° C. as in the case of the cylinder block body 203 (S7 in FIG. 8), and is applied with ultrasonic vibration while being immersed in the molten zinc alloy soldering bath (S8 in FIG. 8). At this point, conditions for forming the zinc alloy soldering layer are substantially the same as those for the cylinder block body 203. The application time of ultrasonic vibration to the bonding member 205 is however limited within a range of from about two to five seconds. The zinc alloy soldering layer is thus formed on the surface of the bonding member 205. Immersion of the bonding member 205 in the zinc alloy soldering bath causes formation of the zinc alloy soldering layer on the entire surface of the bonding member 205, and this poses no problem in the manufacture. Operations for forming the zinc alloy soldering layer on the bonding member 205 are not described in FIG. 5, but are similar to those for the cylinder block body 203.

Now, the forming mechanism of the zinc alloy soldering layer will be described below. Cavitation is processed by applying ultrasonic vibration to the vibration plate 217 installed in the molten zinc alloy soldering bath 215. Then, surface oxide films of the channel wall 209a of the cylinder block body 203 and the bonding member 205 are broken by the produced cavitation and an active metal surface is exposed. An alloying reaction takes place as a result between this active metal surface and zinc in the molten zinc alloy soldering bath, thus forming a firm zinc alloy soldering layer.

Figure 3B:
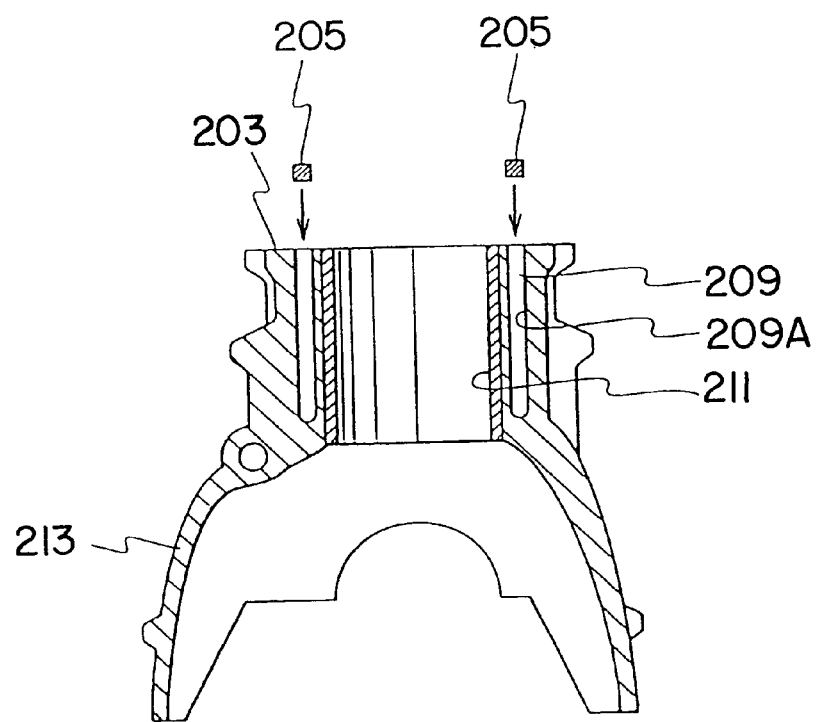

Then, the step of accomplishing bonding by inserting the bonding member 205 into the cylinder block body 203 will be described below. As described above, zinc alloy soldering layers are formed on the cylinder block body 203 and the bonding member 205, respectively, and as shown in FIG. 3(B), the bonding member 205 is inserted into the channel wall 209a of the cooling water channel 209 at the top end of the cylinder block body 203 (S9 in FIG. 8).

Figure 6:
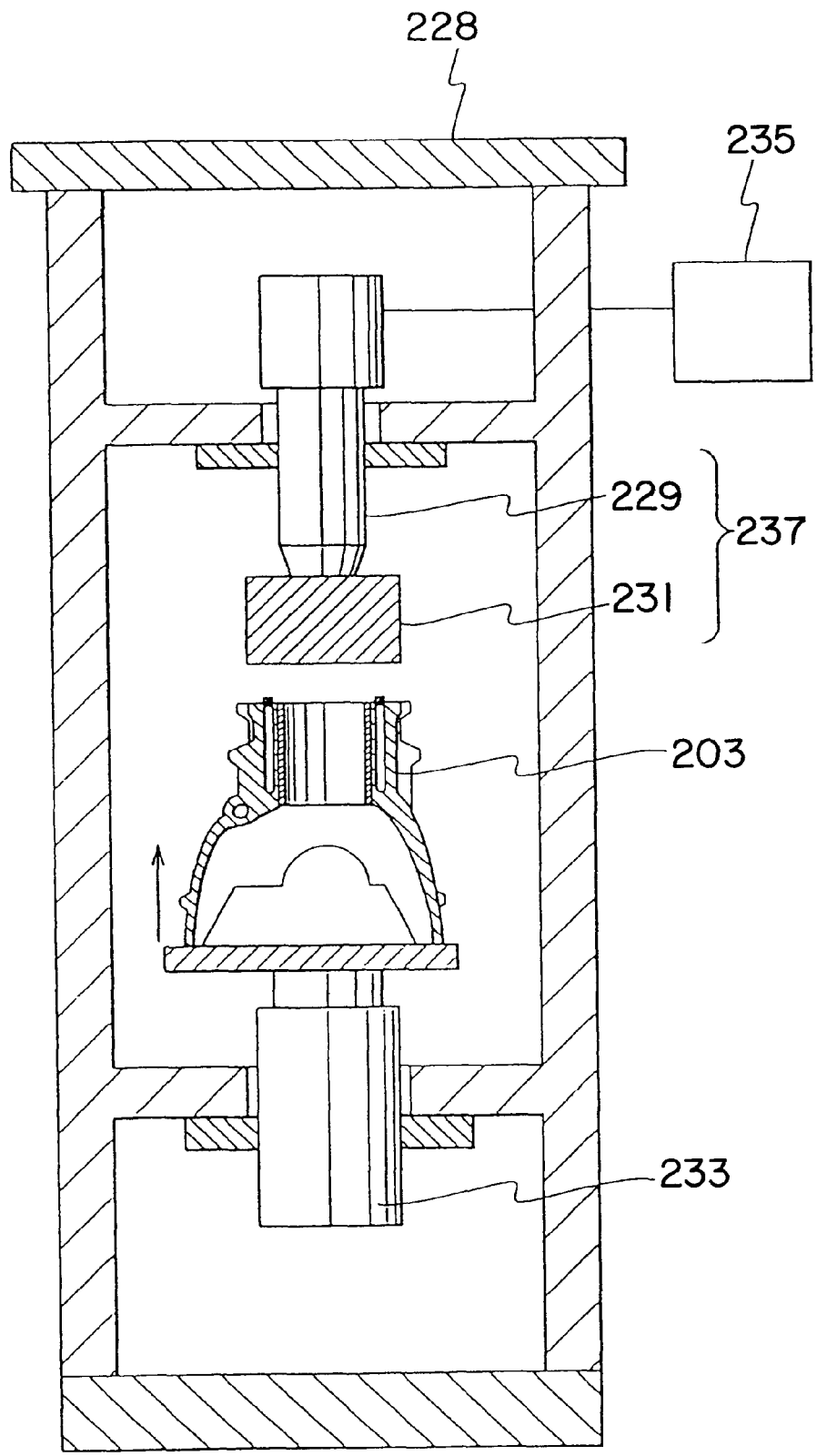
FIG. 6 is a descriptive view illustrating a case where ultrasonic vibration is applied to the bonding portion after insertion of a bonding member into the cylinder block body.

Then, the cylinder block body 203 having the bonding member 205 inserted into the channel wall 209a is charged into an ultrasonic bonding apparatus 228 provided separately, as shown in FIG. 6. This ultrasonic bonding apparatus 228 carries the cylinder block body 203, and is provided with an air cylinder 233 for bringing the cylinder block body 203 into contact with the horn 231 bonded to the ultrasonic vibrator 229 described later. A prescribed ultrasonic oscillator 237 is arranged above the air cylinder 233. This ultrasonic oscillator 237 comprises, as shown in FIG. 6, a horn 231 directly giving vibration to the bonding member 205, a vibrator 229 communicating vibration to this horn 231, and an oscillator 235 imparting an oscillation signal to this vibrator 229.

A prescribed heater (not shown) is provided near the above-mentioned horn 231. This heater is for preheating the bonding portions of the cylinder block body 203 and the bonding member 205, and comprises a high-frequency heater. The heater is not however limited to this, but it may be, for example, a gas burner using LPG gas.

The cylinder block body 203 carried on the air cylinder 233 is moved up by the action of the air cylinder 233 and comes into contact with the horn 231 arranged thereabove. More correctly, it is inserted into the channel wall 209a, and the bonding member 205 still projecting comes into contact with the horn 231. Subsequently, the bonding portion 207 is heated by the above-mentioned heater, and ultrasonic vibration is applied (S10 in FIG. 8). Since the air cylinder 233 always presses the cylinder block body 203 against the horn 231 under a prescribed pressure, the zinc alloy soldering layer is melted along with the application of ultrasonic vibration, and the bonding member 205 is gradually inserted into the cylinder block body 203.

These steps integrate the cylinder block body 203 and the bonding member 205 (S11 in FIG. 8), and application of a final prescribed machining (S12 in FIG. 8) completes the cylinder block 201 shown in FIGS. 1 and 2.

Figure 7:
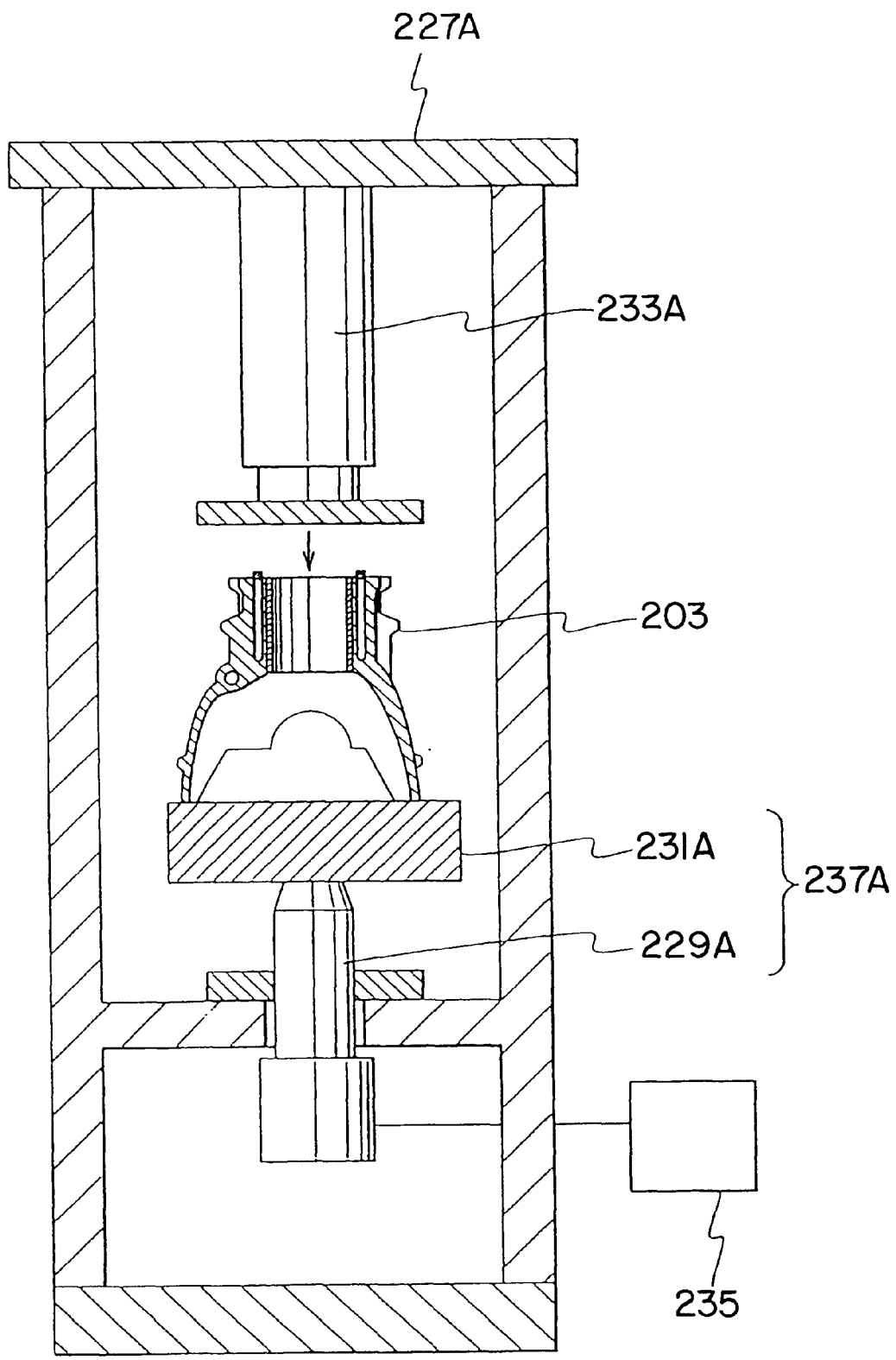
FIG. 7 is a descriptive view illustrating another example in which ultrasonic vibration is applied to the bonding portion after insertion of the bonding member into the cylinder block.

The foregoing embodiment has covered a case where the ultrasonic oscillator 237 has been arranged above the cylinder block body 203. For example, however, as shown in FIG. 7, the cylinder block body 203 may be carried on the horn 231a of the ultrasonic oscillator 237a, with the air cylinder 233a arranged thereabove, and the bonding member 205 may be pressed from above under a prescribed pressure.

Figure 9:
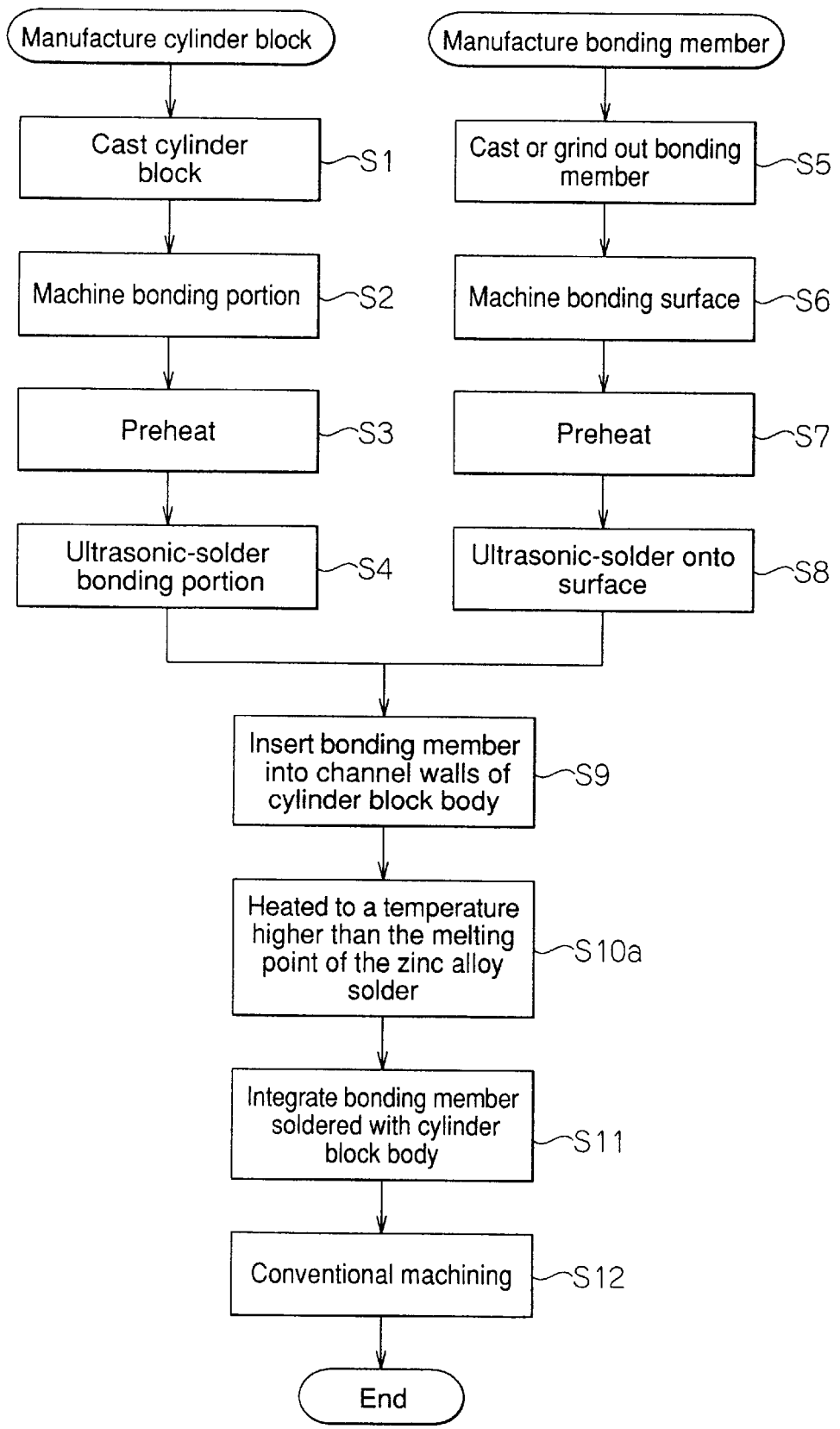
FIG. 9 is a flowchart of another embodiment of the manufacture of the cylinder block.

Now, a variation of the embodiment is illustrated in FIG. 9. In this variation, as shown by S10a in FIG. 9, ultrasonic vibration is not applied, and the proximity of the bonding portion 207 is heated to a temperature higher than the melting point of the zinc alloy solder. Thus, by only heating the bonding portion 207, the zinc alloy solder is melted, and a similar effect is available.

Figure 10A:
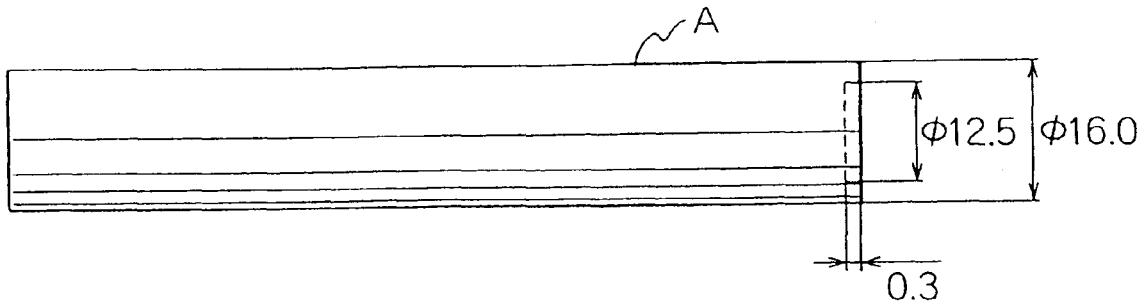
FIGS. 10(A) and 10(B) are views illustrating test pieces used for verifying bonding strength.
Figure 10B:
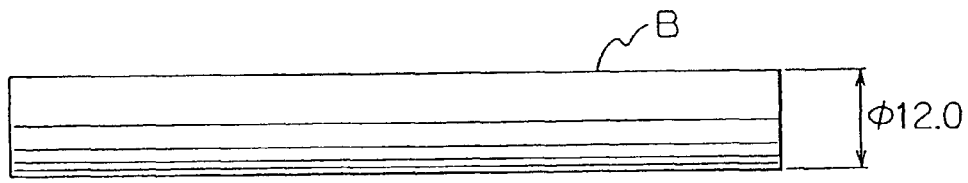
Figure 11:
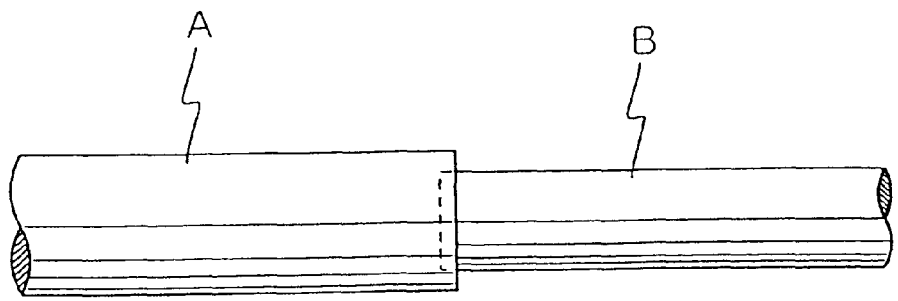
FIG. 11 is a descriptive view illustrating ultrasonic soldering of test pieces in butt shown in FIG. 10.

For reference purposes, test pieces comprising a plurality of materials were ultrasonic-soldered, and then subjected to a tensile test to verify bonding strength. The size of the test piece A comprised, as shown in FIG. 10, an outside diameter of 16.0 mm with a recess having an inside diameter of 12.5 mm and a depth of 0.3 mm. The butt surface of this recess was precision-processed into a smooth surface to increase reliability of experiment. The test piece B had an outside diameter of 12.0 mm and was made to be inserted into the above-mentioned recess (see FIG. 11). The butt surface of the test piece B was smoothly formed by precision processing as in the case of the test piece A.

According to the result of test using these test pieces, as shown in FIG. 12, the average tensile strength in a case where "ADC12" was used as the test pieces A and B was 142 MPa, the fracture position being not in the bonding surface but in the substrate. The case where "AC4B" was used as the material showed an average tensile strength of 200 MPa and fracture took place in the substrate. The result of fracture in the substrate is shown in FIG. 12.

The present invention, in which a first aluminum member and a second aluminum member are bonded through a zinc alloy soldering layer formed by applying ultrasonic vibration, gives an excellent effect of permitting firm bonding of the two members.

The present invention, in which the bonding member is ultrasonic-soldered to an open deck type cylinder block body, permits low-cost manufacture of the cylinder block body by die casting, for example. Because the channel wall of the cooling water channel is bonded with the bonding member by ultrasonic soldering, an excellent effect is available of manufacturing a cylinder block high in mechanical strength and having a strength similar to that in the closed deck type. Possibility of using die casting leads to improvement of productivity.

The present invention, in which a zinc alloy soldering layer is formed only in the end region of the cylinder block body, i.e., only in the end region on the cylinder head attaching side, provides an excellent effect of preventing formation of an unnecessary zinc alloy soldering layer in any other region.

In the present invention, in which the channel walls both comprising aluminum castings are bonded, there is available an excellent effect of permitting manufacture of a cylinder block excellent in mechanical strength.

In the present invention, one of the channel walls is a channel wall of the cylinder block body and the other is the outer periphery of the cylinder liner. This brings about an excellent effect of permitting manufacture of a wet liner type cylinder block.

In the present invention, the bonding member is bonded to the cylinder block body by heating the bonding portion to a temperature higher than the melting point of the zinc alloy solder. It is therefore possible to obtain an excellent effect of forming a zinc alloy soldering layer between these members which are firmly bonded together.

In the present invention, furthermore, ultrasonic vibration is applied upon bonding the cylinder block body and the bonding member. It is thus possible to achieve an excellent effect of more effectively heating the both members and forming a firm zinc alloy soldering layer.

Now, an example of zinc alloy will be described.

The conventional solders applicable for bonding metal members include those specified in JIS Z3261 to Z3283. However, because aluminum has a low melting point (660° C.), use of a solder having a high melting point may cause a trouble when bonding aluminum and aluminum alloy castings. Solders commonly used for bonding aluminum castings include therefore JIS Z3281, Z3282 and Z3283. Of these, JIS Z3281 covers Zn—Al, Sn—Zn, Cd—Zn and Zn—Cd solders for aluminum. JIS Z3282 and Z3283 are Sn—Pb, Pb—Sn and Sn—Pb—Bi solders.

From among the JIS Z3281 solders for aluminum, the Sn—Zn one, having a low melting point, has a low strength (tensile strength) of about 50 N/mm$^2$ of solder itself and is not suitable in some cases for bonding structural members. The Zn—Al one, having in contrast a high strength as at least 170 N/mm$^2$, has a high melting point of about 382° C. When using the Zn—Al solder for ultrasonic soldering of die-cast aluminum castings, it is necessary to heat the die castings to a temperature near or higher than the melting point thereof. As a result, blisters unique to die castings may sometimes appear.

JIS Z3282 and Z3283 solders are characterized by a low melting point within a range of from about 180 to 320° C., leading to easier handling, but has a low strength of the solders, and are not suitable for bonding structural members.

In order to apply ultrasonic soldering to aluminum castings, there is a demand for development of a solder having a melting point of under 370° C. which is a temperature permitting avoidance of occurrence of blister, or more preferably, under 360° C., and a high strength.

For example, a conceivable chemical composition of a zinc alloy solder is as follows. It comprises from 88 to 99 wt. % Zn, from 0.5 to 6 wt. % Al, from 0.5 to 4 wt. % Mg, from 0 to 1.5 wt. % Cu, and from 0 to 1.0 wt. % other elements, where the other elements are at least one element selected from the group of impurities Sn, Cd, Pb and Fe contained in the substrate.

Now, the chemical composition and properties of zinc alloy will be described. The Al content is within a range of from 0.5 to 6 wt. % as described above. In a Zn—Al alloy, the solidification start temperature decreases according as the amount of added Al increases, the alloy becoming eutectic with the addition of 5 wt. %, with the maximum melting point of the zinc alloy. With an Al content of over 6 wt. %, the solidification start temperature gradually becomes higher, with a longer solidification range.

The Mg content is within a range of from 0.5 to 4 wt. %. This is based on the fact that the Zn—Al—Mg tertiary eutectic temperature is lower than the Zn—Al binary eutectic temperature. Since rapid cooling of a Zn—Al alloy causes ageing during holding at the room temperature, resulting in contraction and a change in hardness, it is the conventional practice to prevent this inconvenience by adding Mg in a slight amount (0.03 to 0.08 wt. %). Addition of Mg in a large amount, hindering fluidity of the molten alloy, has not been conducted. However, this fluidity of molten alloy is not a factor necessary for a solder. More specifically, it is the general preference to use a solidification pattern [liquidus→solidus α+solidus β] as in a eutectic alloy having a small solidification range. Addition of Mg in an amount of from 0.5 to 4 wt. % therefore not only reduces the melting point of the solder, but also contributes to prevention of ageing of the Zn—Al alloy and strengthening of the alloy caused by the generation of an intermetallic compound, as well as to inhibition of intergranular corrosion which may occur upon mixing of impurities, particularly Pb or Sn. With the addition of Mg of under 0.5 wt. %, a solder having a desired melting point is unavailable. With an Mg content of over 4 wt. %, on the other hand, generation of oxides upon melting becomes more serious, and this may lead to a decreased material yield, or to a serious embrittlement of the solder.

The Cu content should be within a range of from 0 to 1.5 wt. %. Cu contributes to strengthening of the alloy. A Cu content of over 1.5 wt. % leads to proeutectic at the melting point, resulting in impossibility to reduce the melting point of the solder.

The other elements should have a content within a range of from 0 to 1.0 wt. %. Sn, Cd and Pb used as the other elements have a function of reducing the melting point of the alloy. These elements should be inhibited as far as possible because of the risk of leading to serious intergranular corrosion.

Now, the manufacturing method of the zinc alloy will be described below in detail.

The manufacturing method comprises the steps of first weighing high-purity Zn metal (a purity of at least 99.99%) and pure Al metal (a purity of at least 99.9%) at prescribed ratios; heating these metals to a temperature near the melting point of Al (about 660° C.) to melt a Zn—Al alloy; then after the melt temperature decreases to near about 450° C., adding and melting a pure Mg lump, a third element (purity: 99.99%) in this melt, holding the molten mixture at this temperature for about 30 minutes, tapping the melt into an ingot case, thereby obtaining a target ingot of zinc alloy solder. When adding Cu, an Al—Cu alloy and pure Al are used in place of the above-mentioned pure Al, weighed in target composition, and melted in the same manner as above.

Figure 13:
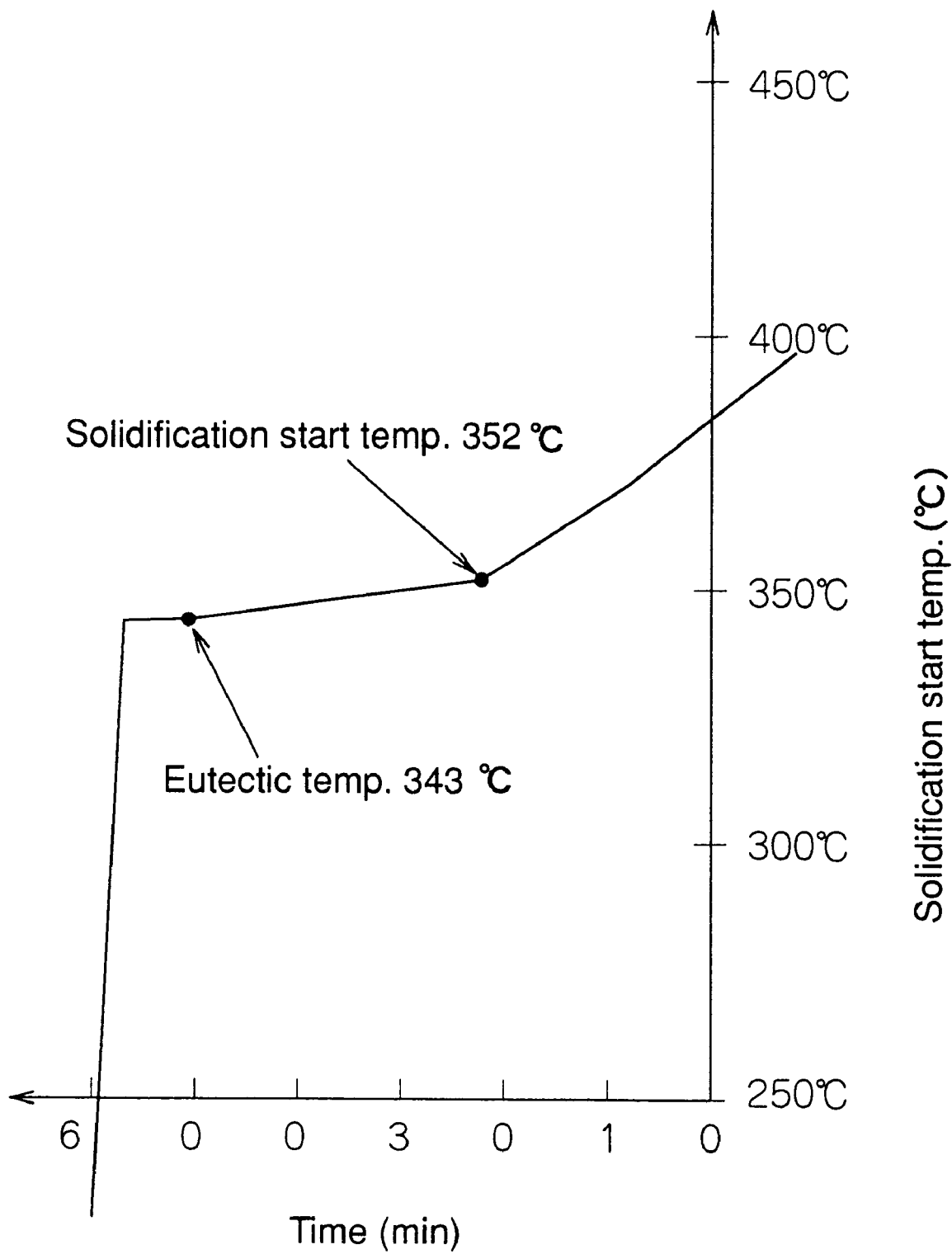
FIG. 13 illustrates a solidification curve of a Zn-3.6 Al-1.8 Mg (in weight %) alloy.
Figure 1:
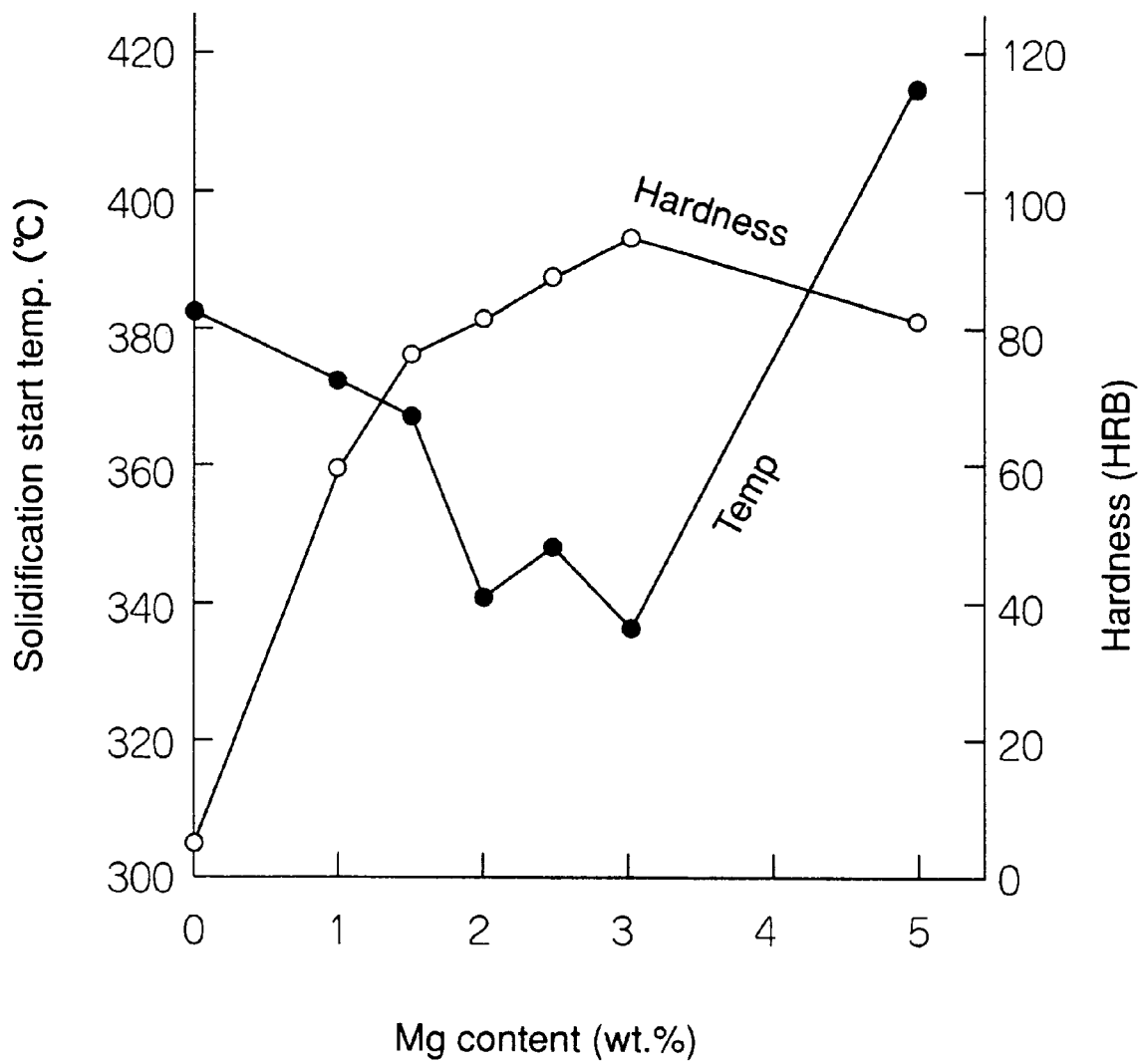
Figure 15:
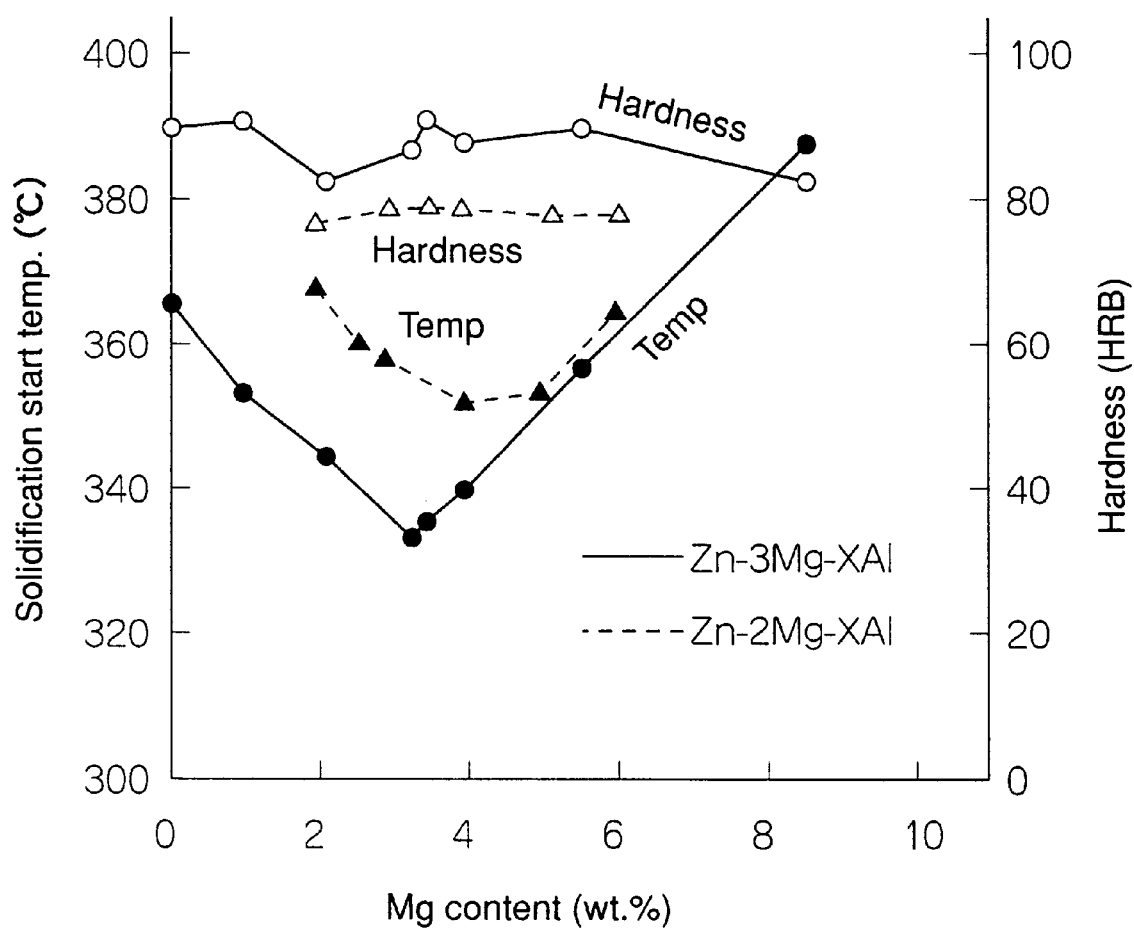
FIG. 15 is a graph in which solid lines represent solidification start temperature (° C.) and hardness (HRB) of an alloy comprising 3 wt. % Mg, Al in wt. % shown on the abscissa and the balance Zn, and dotted lines represent solidification start temperature (° C.) and hardness (HRB) of an alloy comprising 2 wt. % Mg, Al in wt. % shown on the abscissa and the balance Zn.

The Zn-3.5 Al-1.8 Mg (in weight %) alloy has physical properties including a solidification start temperature of 352° C. (see FIG. 13), a hardness of HRB80 (corresponding to HB131), and a tensile strength of about 270 N/mm$^2$.

The foregoing zinc alloy can be used as a press die or a low-melting-point metal core.

Because ultrasonic soldering can be accomplished at a preheating temperature of the bath and the work within a range of from about 350 to 370° C., it is applicable to bonding of die-cast aluminum castings. Upon bonding, it is possible not only to inhibit occurrence of blisters, but also to minimize the decrease in strength caused by heating of aluminum castings. When the Al content is within a range of the present invention, it is not necessary to give attention to the occurrence of intergranular corrosion resulting from mixing of Sn, Pb or Cd, bringing about easier handling. The high strength of solder leads to a higher bonding strength.

Because of the excellent wear resistance, the zinc alloy of the present invention is applicable as a material for simple-shaped dies (limited however to press dies and plastic dies). Since it has a low melting point, when used as a metal core for casting, it is easier to strip off the core by melting after casting.

The zinc alloy described above is applicable also in the following embodiments.

Now, a second embodiment of the present invention will be described below with reference to drawings.

Figure 16:
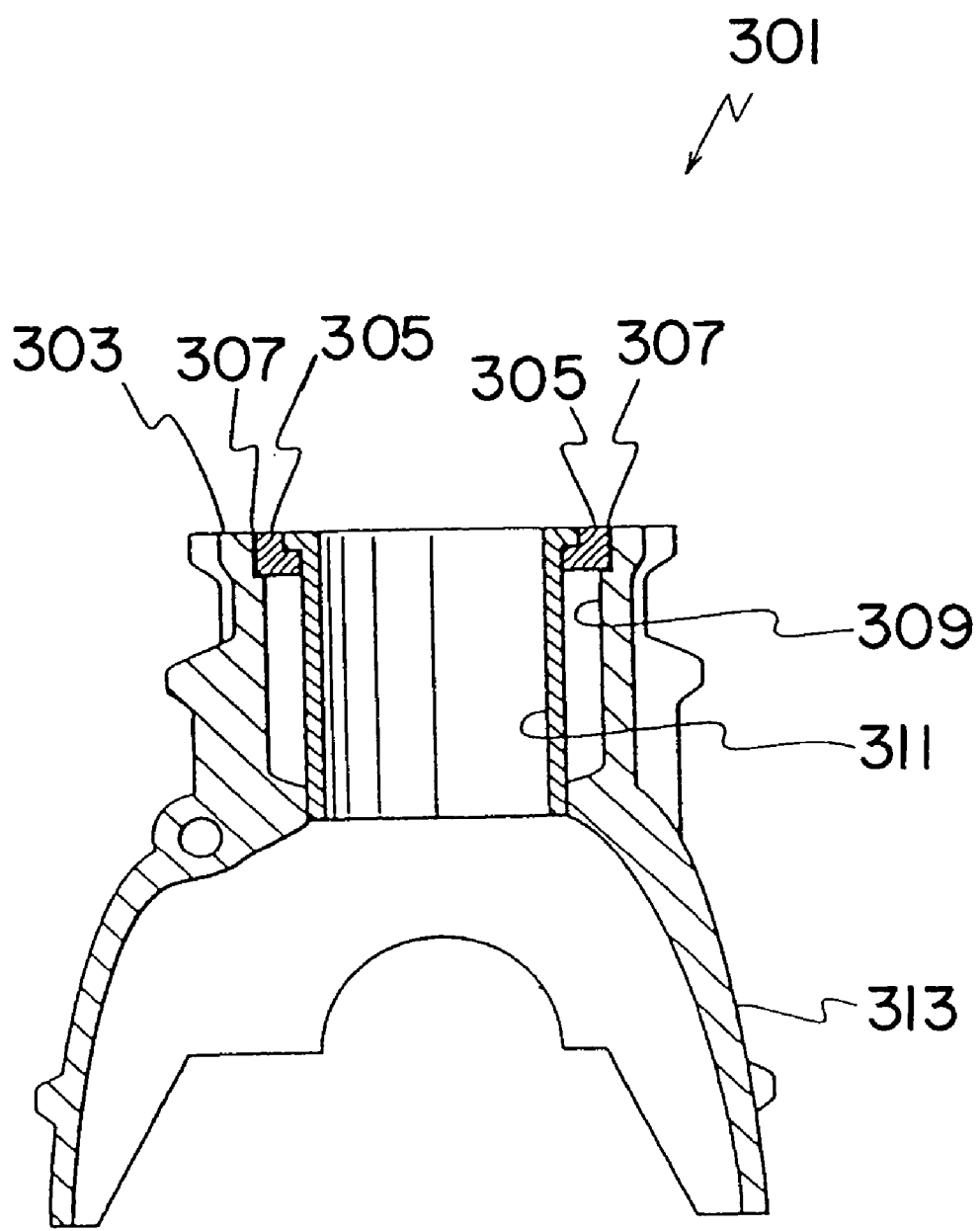
FIG. 16 is a side sectional view illustrating a second embodiment of the present invention.

FIG. 16 illustrates a finished product cylinder block 301:303 is a cylinder block body of an engine (not shown); 305 is a sealing member; and 307 is a bonding portion formed with ultrasonic vibration. The cylinder block 301 in this embodiment comprises a cylinder block body 303 having a recess 309 formed as a cooling water channel with an inside diameter larger than the outside diameter of a cylinder liner 311, around the cylinder liner 311, a sealing member 305 which comprises channel walls forming the recess 309, engages with an end region 309a (see FIG. 17) on the side where a cylinder head is arranged, and seals this recess 309, and a liner through-hole 310 formed on the reverse side of the end region 309a of the recess 309 of the cylinder block body 303.

The cylinder block body 303 and the sealing member 305 are made of aluminum castings. Ultrasonic vibration is applied to at least any of the end region 309a of the cylinder block body 303 and the sealing member 305, and a zinc alloy soldering layer is formed on the surface. Then, the sealing member 305 is engaged with, and bonded to, the end region 309a of the recess 309, and subsequently, the sealing member 305 and the liner through-hole 310 are processed into a size almost equal to the outside diameter of the cylinder liner 311. The cylinder liner 311 is pressure-inserted into a liner supporting hole 306 and the liner through-hole 310. At this point, the liner through-hole 310 is machined after casting as described later. The diameter thereof differs slightly between the stage after casting and the stage after machining. For the convenience of description here, however, both are represented by the same reference numeral 310.

The method for bonding member 305 to the end region 309a of the cylinder block body 303 will now be described in detail. Portions of these in contact are individually immersed in a molten zinc alloy soldering bath 315 in a zinc alloy soldering tank 319 (see FIG. 23), and ultrasonic vibration is applied to form a zinc alloy soldering layer on the surface of the portion to be bonded. Thereafter, the sealing member 305 is inserted into the end region 309a with a prescribed pressing force, and ultrasonic vibration is applied for bonding while uniformly heating the periphery of the end region 309a. Upon heating the end region 309a, the high-frequency heating technique is used for uniformly heating the periphery. It is not however limited to this, but low-frequency heating may also be used, or heating with an LPG gas burner may be used. This process may also comprise, after inserting the sealing member 305 into the end region 309a with the prescribed pressing force, heating in a heating furnace not shown, taking out from the heating furnace, and applying ultrasonic vibration to the sealing member 305 or the cylinder block body 303.

Figure 21:
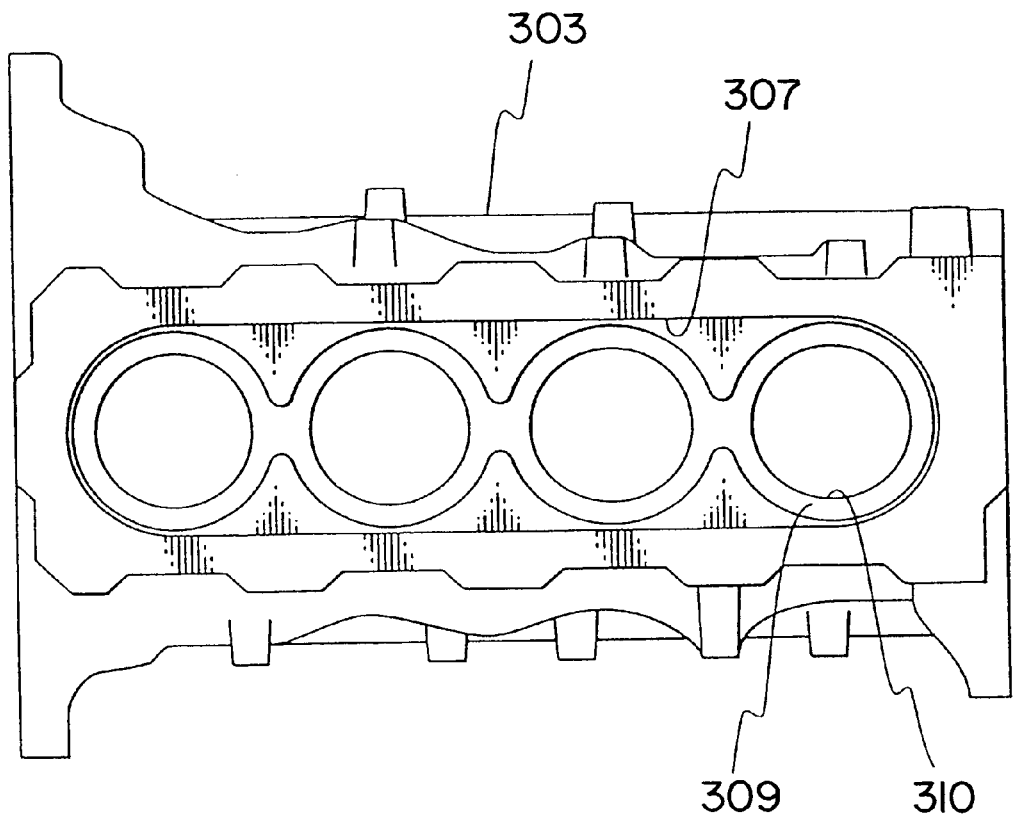
FIG. 21 is a plan view of the cylinder block body shown in FIG. 17.

In this embodiment, as shown in FIG. 21, the cylinder block body 303 is for a four-cylinder engine in which four cylinders are arranged in a row. This cylinder block body 303 comprises a die-cast aluminum casting. The material is ADC10, ADC12 or ADC14 commonly in use.

A prescribed recess 309 serving as a cooling water channel is formed on the entire periphery of the cylinder liner 311. This recess 309 is formed with a depth reaching even the proximity of the lower end region of the cylinder liner 311, as shown in FIG. 16, and before engagement of the sealing member 305, the most part of the end on the cylinder head attaching side is open (see FIGS. 17 to 19). The upper end surface of the cylinder block body 303 is processed flat so as to permit attachment of a cylinder head not shown. The recess 309 serving as the cooling water channel is formed in the shape of glasses (see FIG. 21) so as to surround the periphery of the cylinder liner 311, and the cooling water channels for all the cylinders are mutually connected.

Now, the method for manufacturing the cylinder block 301 in this embodiment will be described below in detail.

Figure 17:
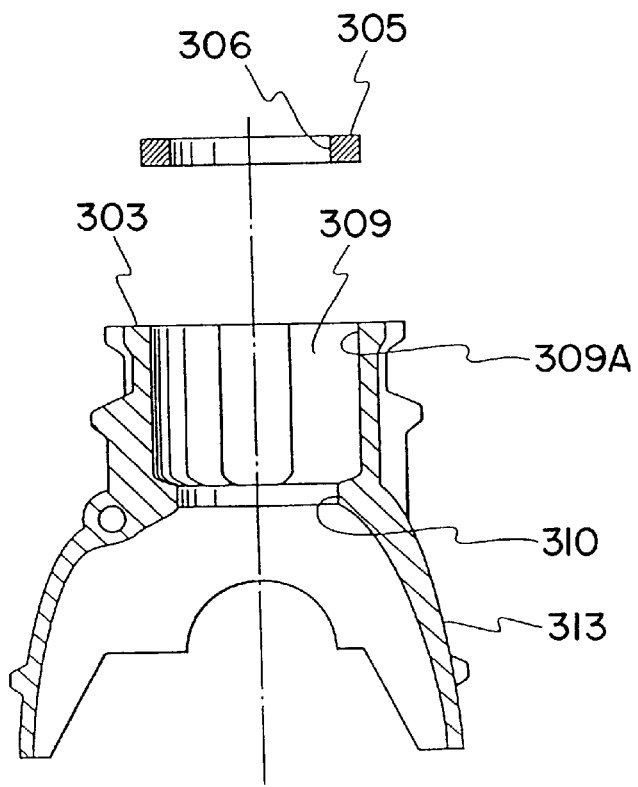
FIG. 17 is a side sectional view illustrating a state before engagement of a sealing member with the cylinder block body.
Figure 18:
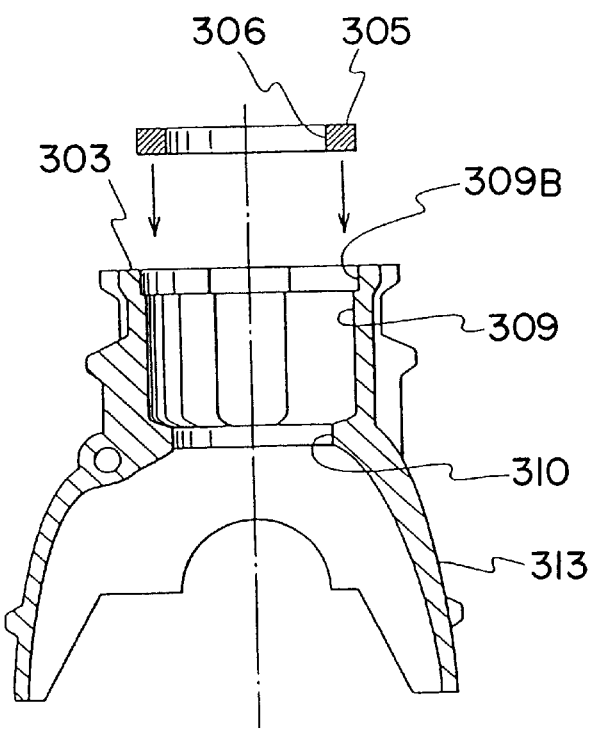
FIG. 18 is a side sectional view illustrating a state of engagement of the sealing member with the cylinder block body.

First, as shown in FIG. 17, an open deck type having the entire upper end portion of the recess 309 open is used. This cylinder block body 303 is manufactured by the casting process (die casting) as described above (S1 in FIG. 25), and then, subjected to a prescribed machining (S2 in FIG. 25). As shown in FIG. 18, this machining forms an engagement portion 309b corresponding in shape and size to the sealing member 305 for the engagement of the sealing member 305 with the end region 309a of the recess 309. When processing this engagement portion 309b, end mill processing is used. As a result of this machining, the engagement portion 309b is formed, and at the same time, the oxide film formed on the surface by casting is removed, whereby an active metal surface is exposed. At this point, the engagement portion 309b has an oval shape so as to allow engagement of the sealing member 305 as described later.

After the foregoing machining, the engagement portion 309b is preheated to up to 350° C. (S3 in FIG. 25). Thereafter, the engagement portion 309b to engage the sealing member 305 is immersed in a molten zinc alloy soldering bath 315 (see FIG. 23), and a zinc alloy soldering layer is formed on the engagement portion 309b (S4 in FIG. 25).

Figure 23:
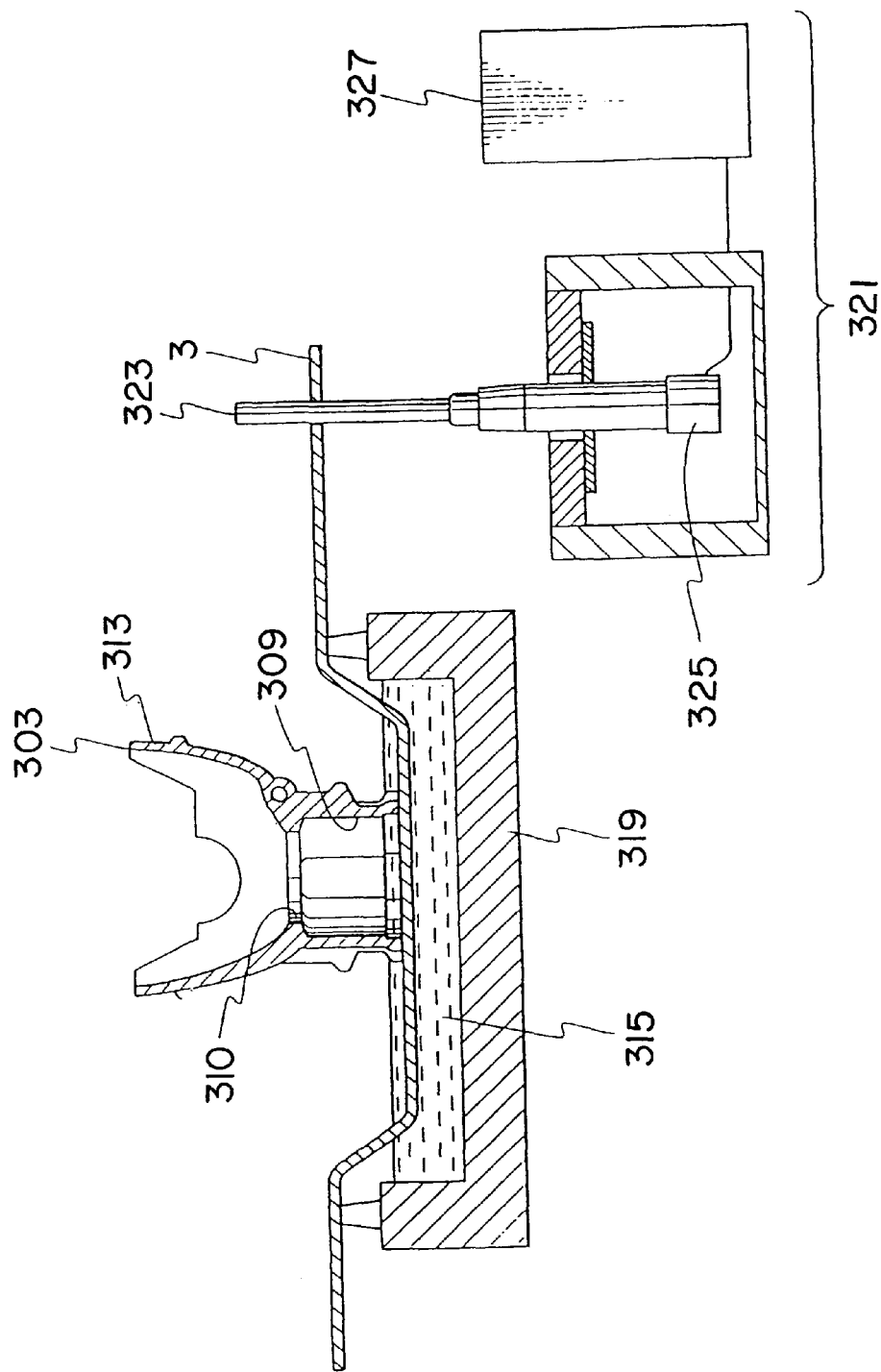
FIG. 23 is a schematic descriptive view of an apparatus illustrating a case where the cylinder block body is ultrasonic-soldered.

The above-mentioned forming process of the zinc alloy soldering layer will be described below in detail. As shown in FIG. 23, upon bonding of this cylinder block body 303 and the sealing member 305, zinc alloy soldering layers are previously formed by the application of ultrasonic vibration on prescribed positions of the both. The zinc alloy soldering layer is formed only on the engagement portion 309b of the recess 309 for the cylinder block body 303, and more specifically, the formed zinc alloy soldering layer covers an area of about 30 mm from the upper end surface on the cylinder head attaching side. In this case, a material for the zinc alloy solder should have, for example, a melting point of about 382° C. The foregoing engagement portion 309b is immersed in a molten zinc alloy soldering bath 315 formed by melting this zinc alloy solder and keeping a temperature within a range of from 410 to 430° C., and ultrasonic vibration is applied.

The frequency of ultrasonic vibration is set within a range of from about 18 to 20 kHz, and the oscillator output for application should be within a range of from 100 to 1,000 W. Specifically, ultrasonic vibration is applied for several seconds. A prescribed zinc alloy soldering layer is thus formed on the engagement portion 309b of the cylinder block body 303.

Now, the apparatus for applying ultrasonic vibration to the cylinder block body 303 will be described below in detail. The cylinder block body 303 is carried on a prescribed plate as 317 as shown in FIG. 23, and the above-mentioned engagement portion 309b is immersed in the molten zinc alloy soldering bath 315. This molten zinc alloy soldering bath 315 is held in a soldering tank 319 with a heater which maintains temperature of the molten zinc alloy soldering bath 315 at the above-mentioned prescribed value. An ultrasonic oscillator 321 is engaged with the vibration plate 317 so as to permit communication of ultrasonic vibration. This ultrasonic oscillator 321 comprises a horn 323 imparting vibration to the above-mentioned vibration plate 317, a vibrator 325 transmitting vibration to the horn 323, and an oscillator 327 communicating an oscillation signal to the vibrator 325.

Figure 22:
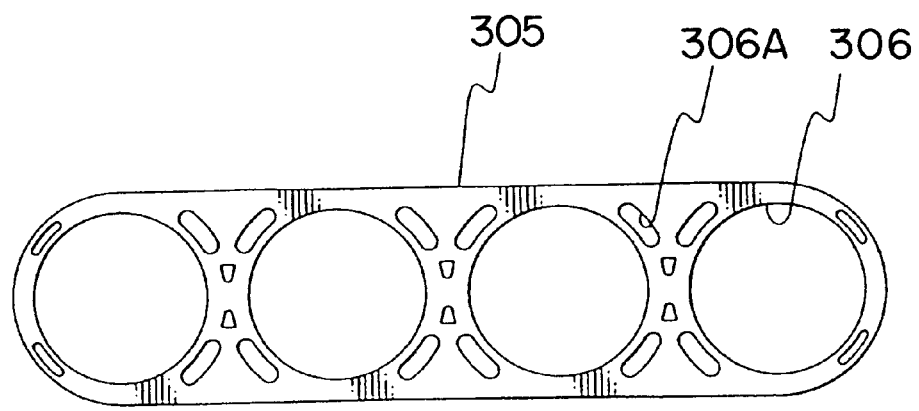
FIG. 22 is a plan view of the sealing member.
Figure 25:
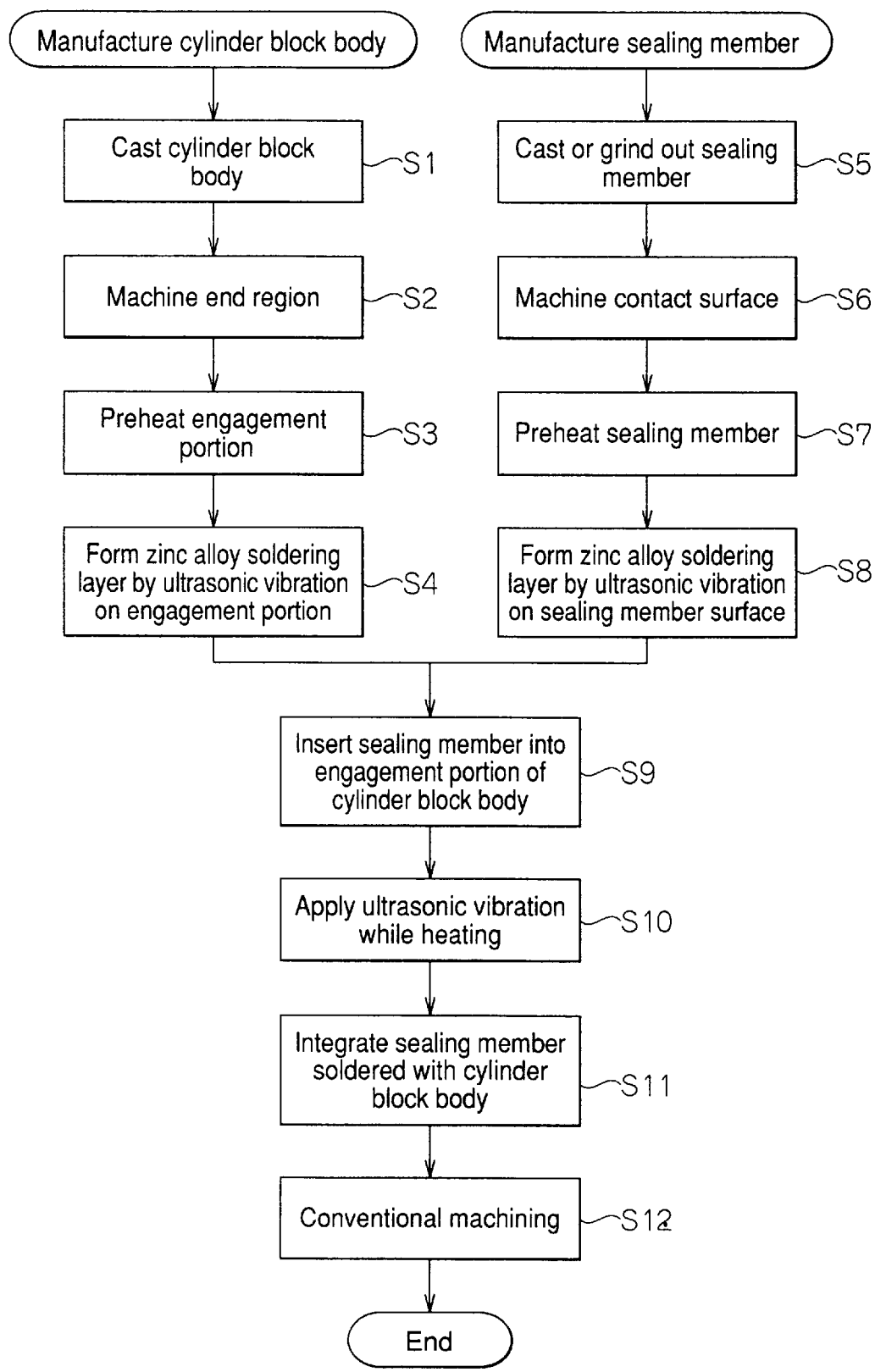
FIG. 25 is a flowchart of the manufacture of the cylinder block.

When manufacturing the sealing member 305, on the other hand, as shown in FIG. 22, the member is formed into such a shape and a size by die casting as to allow insertion into the foregoing engagement portion 309b (S5 in FIG. 25). However, the manufacturing method is not limited to die casting, but the sealing member 305 may be manufactured by any other casting process or by grinding out a prescribed shape from a rolled material. The shape of the sealing member 305 is such that, as shown in FIG. 22, four liner supporting holes 6 for insertion of cylinder liners 311 are arranged in a row, and the plan shape there is a semi-circle known as oval. That is, the sealing member 305 can integrally support a plurality of cylinder liners 311.

A plurality of cooling water passing holes 306a are formed around each liner supporting holes 306. These cooling water passing holes 306a are for passage and circulation of cooling water to and from the cylinder head side not shown.

The side of the sealing member 305 coming into contact with the cylinder block body 303 is subjected to a prescribed machining. This is to achieve firmer bonding of the sealing member 305 and the cylinder block body 303.

After machining, the sealing member 305 is preheated to up to about 350° C. as in the case of the cylinder block body 303, immersed in the molten zinc alloy soldering bath 315 and applied with ultrasonic vibration. The forming conditions of the zinc alloy soldering layer are substantially the same as those of the cylinder block body 303 described above. The zinc alloy soldering layer is thus formed on the surface of the sealing member 305. Immersion of the sealing member 305 in the zinc alloy soldering bath 315 causes formation of the zinc alloy soldering layer on the entire surface of the sealing member 305, and this poses no problem in the manufacture. Operations for forming the zinc alloy soldering layer on the sealing member 305 are not described in FIG. 23, but are similar to those for the cylinder block body 303.

Figure 19:
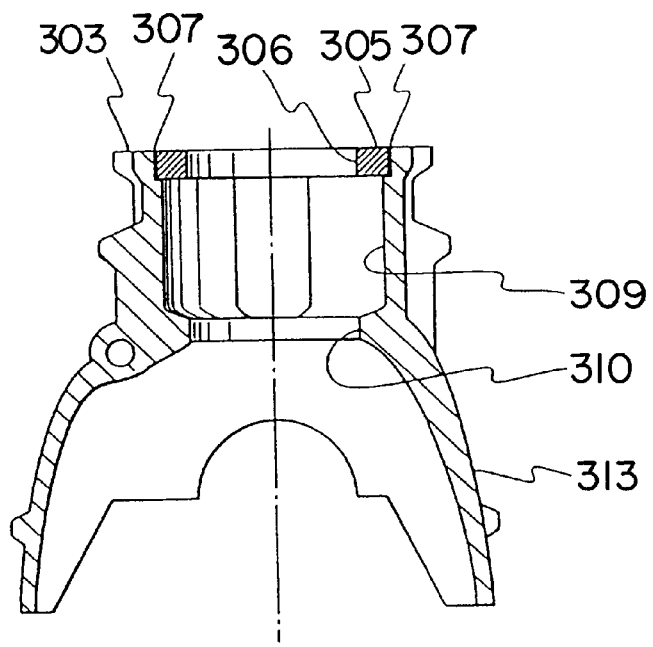
FIG. 19 is a side sectional view illustrating a state after engagement of the sealing member with the cylinder block body.

Then, the step of accomplishing bonding by inserting the sealing member 305 into the cylinder block body 303 will be described below. As described above, zinc alloy soldering layers are formed on the cylinder block body 303 and the sealing member 305, respectively, and as shown in FIGS. 18 and 19, the sealing member 305 is inserted into the prescribed engagement portion 309b at the end region of the cylinder block body 303.

Figure 24:
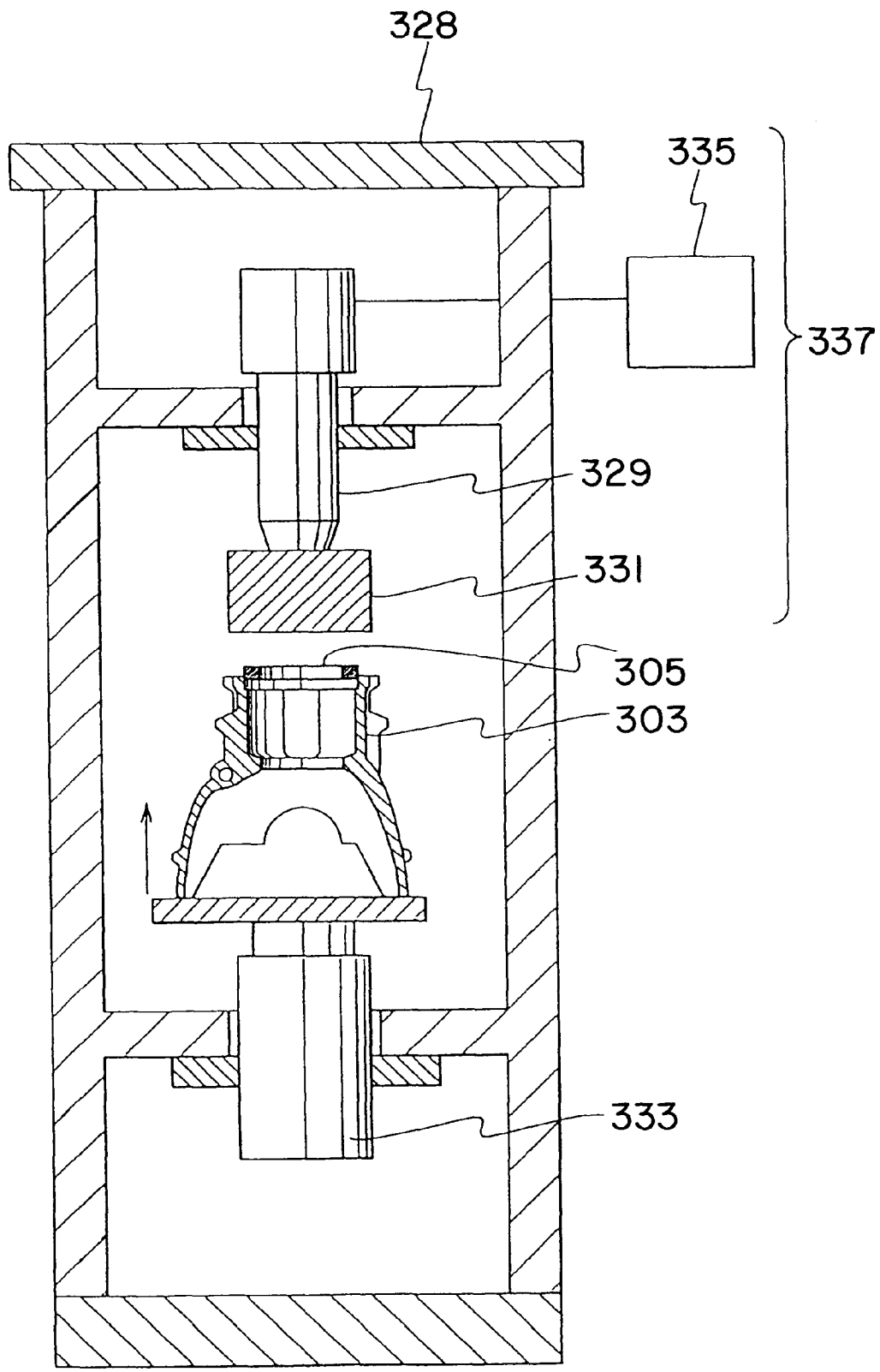
FIG. 24 is a descriptive view illustrating a case where ultrasonic vibration is applied to the bonding portion after insertion of the sealing member into the cylinder bock body.

Then, the cylinder block body 303 having the sealing member 305 inserted into the engagement portion 309b is charged into an ultrasonic bonding apparatus 328 (see FIG. 24) provided separately. This ultrasonic bonding apparatus 328 carries the cylinder block body 303, and is provided with an air cylinder 333 for bringing the sealing member 305 into contact with the horn 331 bonded to the ultrasonic vibrator 329 described later. A prescribed oscillator 337 is arranged above the air cylinder 333. This ultrasonic oscillator 337 comprises a horn 331 directly giving ultrasonic vibration to the sealing member 305, a vibrator 329 communicating vibration to this horn 331, and an oscillator 335 imparting an oscillation signal to this vibrator 329.

A prescribed heater (not shown) is provided near the above-mentioned horn 331. This heater is for preheating the bonding portions of the cylinder block body 303 and the sealing member 305, and comprises a high-frequency heater. The heater is not however limited to this, but it may be, for example, a gas burner using LPG gas.

The cylinder block body 303 carried on the air cylinder 333 is moved up by the action of the air cylinder 333 and comes into contact with the horn 331 arranged thereabove. More correctly, it is inserted into the engagement portion 309b, and the sealing member 305 still projecting from the cylinder block body 303 comes into contact with the horn 331. Subsequently, the bonding portion 307 is heated by the above-mentioned heater, and ultrasonic vibration is applied by the horn 331 to the sealing member 305. Since the air cylinder 333 always presses the cylinder block body 303 against the horn 331 under a prescribed pressure, the zinc alloy soldering layer is melted along with the application of ultrasonic vibration, and the sealing member 305 is gradually inserted into the engagement portion 309b of the cylinder block body 303.

Figure 20:
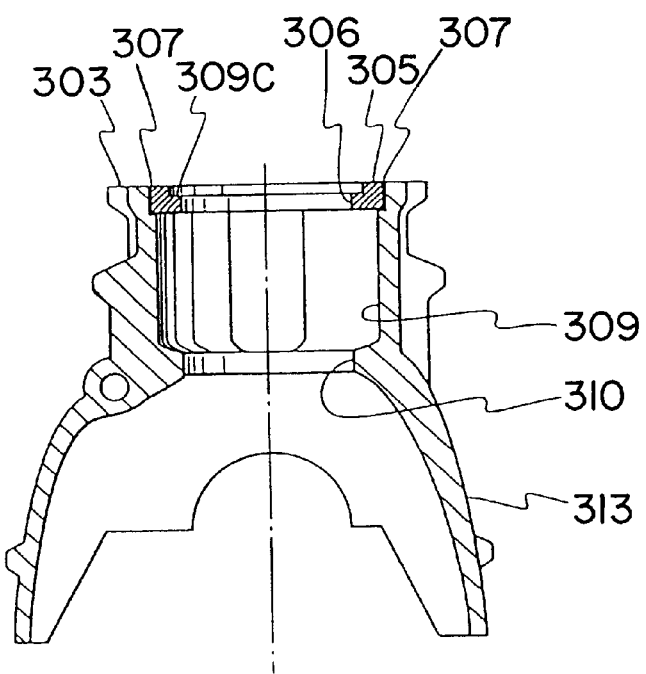
FIG. 20 is a side sectional view illustrating a formed liner engagement portion for engaging a cylinder liner with the upper surface of the sealing member.

These steps integrate the cylinder block body 303 and the sealing member 305. As a result of a series of subsequent machining steps, the sealing member 305 and the upper end surface of the cylinder block body 303 become flush. The liner supporting hole 306 and the liner through-hole 310 of the sealing member 305 are processed to have substantially the same bore size as the outside diameter of the cylinder liner 311. Furthermore, as shown in FIG. 20, a liner engagement portion 309c having an inside diameter larger than the liner supporting hole 306 is processed around the liner supporting hole 306 on the upper surface of the sealing member 305. This liner engagement portion 309c is for engagement of a flange of the cylinder liner 311 upon pressure-insertion of the cylinder liner 311 into the cylinder block body 303.

Finally, the cylinder liner 311 is pressure-inserted into the liner supporting hole 306 of the sealing member 305 and the above-mentioned liner through-hole 310. As a result, as shown in FIG. 16, the cylinder liner 311, the recess 309 of the cylinder block body 303 and the sealing member 305 form a cooling water channel on the entire periphery of the cylinder liner 311, and at the same time, a wet-liner type closed deck cylinder block 1 is thus substantially completed.

Upon fixing the sealing member 305 to the cylinder block body 303, fixing may be accomplished by applying a pressure onto the proximity of the bonding portions 307 of the both while heating to a temperature higher than the melting point of the zinc alloy solder, in place of step S10 in FIG. 25, without applying ultrasonic vibration.

In the present invention, in which the sealing member is ultrasonic-soldered to the open deck type cylinder block body, it is possible to manufacture the cylinder block body at a low cost by using the die casting process, and to solder the sealing member to the cylinder block body through ultrasonic soldering. This makes it possible to form a cooling water channel surrounded by the sealing member and the cylinder block body, and to manufacture block having a high mechanical strength as in the closed type excellent in mechanical strength.

Since it is possible to manufacture a closed deck type cylinder block by die casting, the present invention brings about an excellent effect of permitting achievement of a considerable reduction of manufacturing cost along with improvement of productivity as compared with the product of low-pressure casting.

The present invention, in which the plurality of cylinder liners are supported by the integrally formed sealing member, provides an excellent effect of permitting manufacture of cylinder block having a high rigidity.

In the present invention, the zinc alloy soldering layer is formed only in the end region of the cylinder block body, i.e., in the end region on the cylinder head attaching side. There is therefore provided an excellent effect of preventing formation of an unnecessary zinc alloy soldering layer in any other region.

In the present invention, the bonding member is bonded to the cylinder block body by heating the bonding portion to a temperature higher than the melting point of the zinc alloy solder. An excellent effect of making it possible to form a zinc alloy soldering layer between the members and thus firmly bond them is provided.

In the present invention, ultrasonic vibration is applied upon bonding the cylinder block body and the bonding member. There is therefore available an excellent effect of efficiently heating the members to be bonded and of forming a firm zinc alloy soldering layer.

Now, a third embodiment of the present invention will be described with reference to the drawings.

Figure 26:
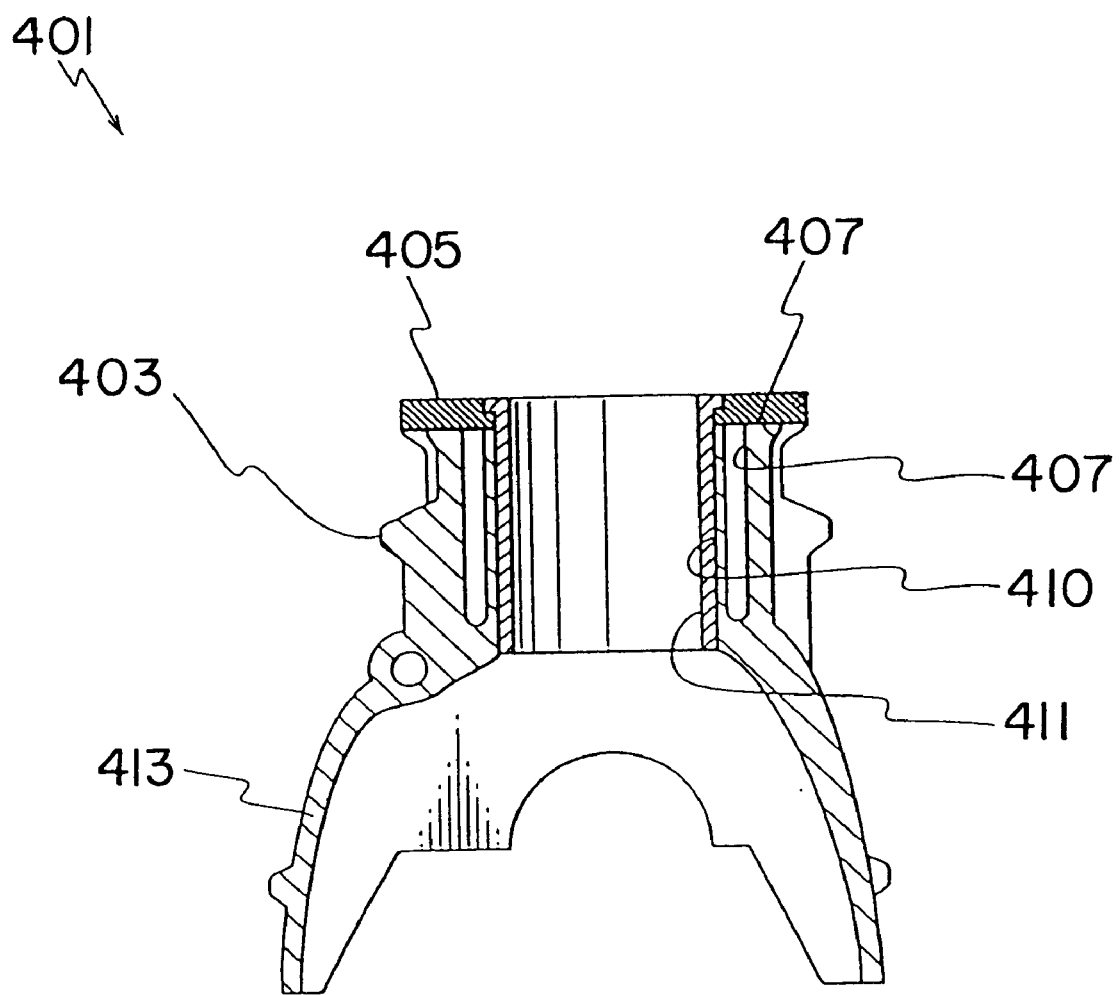
FIG. 26 is a side sectional view illustrating a third embodiment of the present invention.

FIG. 26 illustrates a cylinder block 401 of a finished product manufactured by the manufacturing method in this embodiment: 403 is a cylinder block body of an engine (not shown), 405 is a sealing member, and 407 is a bonding portion based on ultrasonic vibration. The cylinder block 401 in this embodiment comprises, as shown in FIG. 26, a cylinder block body 403 having a recess 409 formed as a cooling water channel around a cylinder liner 411, and the sealing member 405 for sealing the foregoing recess 409 from the side on which a cylinder head not shown is arranged.

Figure 28A:
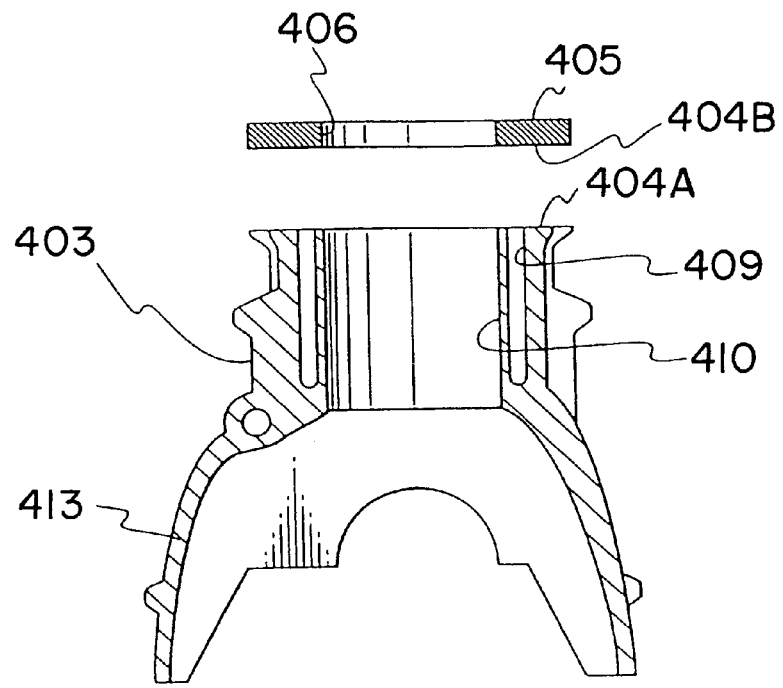
FIGS. 28(A) and 28(B) are side sectional views illustrating bonding of the sealing member to the cylinder block body.

The cylinder block body 403 and the sealing member 405 are made of aluminum (alloy) castings, and have such shape that opposed bonding portions 404a and 404b (see FIG. 28(A)) of the cylinder block body 403 and the sealing member 405 can come into contact with each other in alignment. Further, ultrasonic vibration is applied to at least any one of the bonding portion 404a of the cylinder block body 403 and the bonding portion 404b of the sealing member 405 to form a zinc alloy soldering layer on the surface thereof, and then, the cylinder block body 403 and the sealing member 405 are bonded. Finally, the cylinder liner 411 is pressure-inserted into the cylinder block body 403, thus completing the cylinder block 401.

Figure 27A:
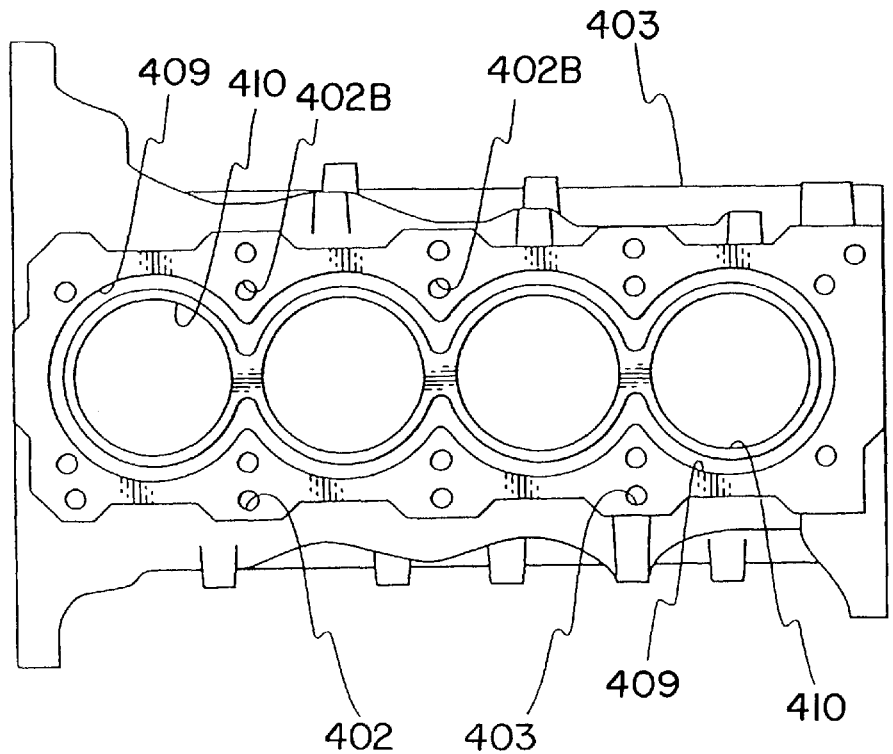
FIGS. 27(A) and 27(B) are plan views illustrating the cylinder block body and the sealing member shown in FIG. 26.

In this embodiment, as shown in FIG. 27(A), four cylinders are arranged in a row, forming a cylinder block body 403 for an engine known as a four-cylinder engine. This cylinder block body 403 is a die-cast aluminum casting. The material thereof is ADC10, ADC12 or ADC14 used commonly.

Figure 27B:
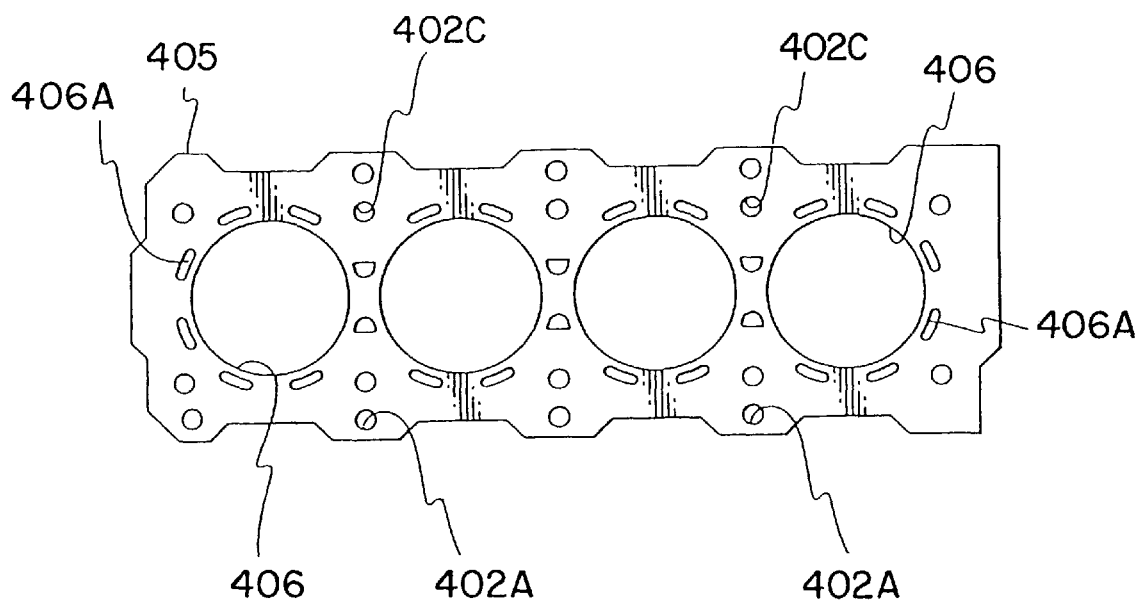

A prescribed recess 409 serving as a cooling water channel as shown in FIGS. 26 and 27(A) is formed in a region corresponding to the periphery of the cylinder liner 411. This recess 409 is formed with a depth reaching even the proximity of the lower end region of the cylinder liner 411, as shown in FIG. 26, and before bonding of the sealing member 405, the upper end is open (see FIGS. 26 to 28). The bonding portion 404a of the cylinder block body 403 is processed flat so as to allow attachment of the sealing member 405 of the shape as shown in FIG. 27(B). However, the bonding portion 404a suffices to be of such a shape permitting close contact with the bonding portion 404b of the sealing member 405 in alignment. The bonding portions 404a and 404b may therefore have corresponding surface irregularities.

The recess 409 serving as the cooling water channel is formed into a shape of glasses so as to surround each cylinder liner 411 (see FIG. 27(A)), and cooling water channels for all the cylinders are mutually connected. In addition, a plurality of bolt holes 402b for securing the cylinder head not shown are formed in the bonding portion 404a of the cylinder block body 403.

Now, the method for manufacturing the cylinder block 401 will be described. As shown in FIGS. 27(A) and 28, an open deck type cylinder block body 403 in which the top end of the recess 409 is open is used. After manufacture by the casting method (aluminum die casting) (S1 in FIG. 34), this cylinder block body 403 is subjected as required to a prescribed machining (S2 in FIG. 34). This machining comprises processing the surface flat for ensuring bonding of the sealing member 405 to the bonding portion 404a of the cylinder block body 403, and is accomplished through milling, for example.

Figure 34:
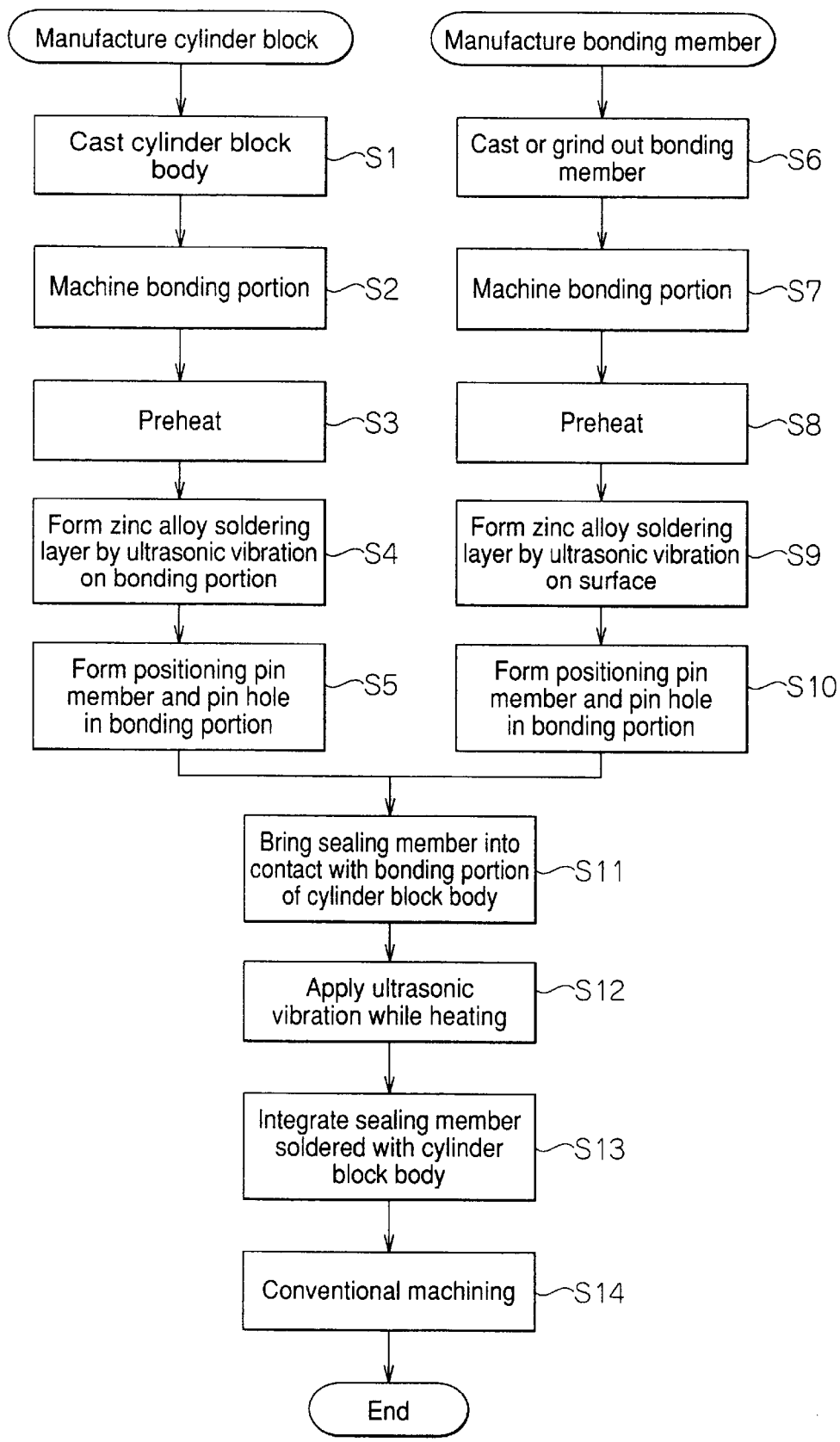
FIG. 34 is a flowchart of the manufacture of the cylinder block.

After the foregoing machining, the bonding portion 404a is preheated to a temperature near the melting point of the zinc alloy solder (S3 in FIG. 34). Thereafter, the bonding portion 404a is immersed in a molten zinc alloy soldering bath 415 (see FIG. 32), and a zinc alloy soldering layer is formed on the surface of the bonding portion 404a (S4 in FIG. 34). Then, a positioning pin member and a pin hole for accurate relative positioning with the sealing member 405 are formed in the bonding portion 404a (S5 in FIG. 34). The positioning member is not limited to a pin member, but corresponding surface irregularities may be formed on the bonding portion 404a in response to the shape of the bonding portion 404b of the sealing member 405. However, these positioning p i n member and the pin hole or the surface irregularities are not always necessary, but the bonding portions may be left flat so far as accurate positioning is ensured.

Figure 32:
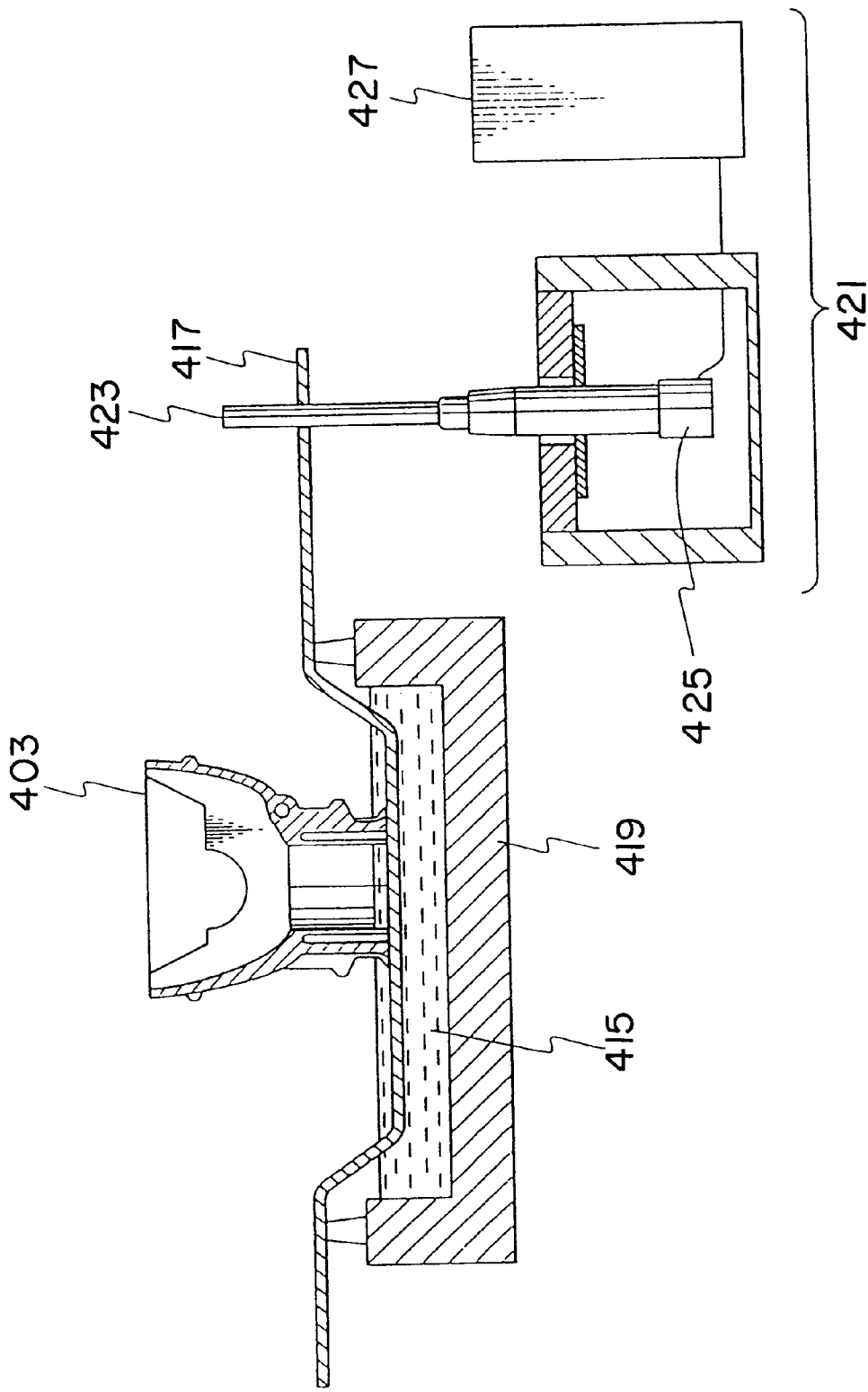
FIG. 32 is a schematic descriptive view of an apparatus illustrating a case where a zinc alloy soldering layer is formed on the bonding portion of the cylinder block body.

The forming process of the zinc alloy soldering layer will be described below further in detail. As shown in FIG. 32, upon bonding of this cylinder block body 403 and the sealing member 405, zinc alloy soldering layers are previously formed by the application of ultrasonic vibration on the bonding portions thereof 404a and 404b. The zinc alloy soldering layer is formed only in the proximity of the bonding portion 404a of the cylinder block body 403, and more specifically, the formed zinc alloy soldering layer covers an area of about 30 mm from the bonding portion 404a. In this case, a material for the zinc alloy solder should be, for example, a Zn—Al alloy having a melting point lower than about 390° C. The foregoing bonding portion 404a is immersed in a molten zinc alloy soldering bath 415 formed by melting this zinc alloy solder and held within a range of from the melting point of the zinc alloy solder to melting point +50° C., and ultrasonic vibration is applied.

The frequency of ultrasonic vibration is set to about 20 kHz, and the oscillator output for application should be within a range of from 150 to 1,000 W. Specifically, ultrasonic vibration is applied for 3 to 10 seconds. A prescribed zinc alloy soldering layer is thus formed on the bonding portion 404a of the cylinder block body 403.

Now, the apparatus for applying ultrasonic vibration to the cylinder block body 403 upon forming the zinc alloy soldering layer will be described below in detail. The cylinder block body 403 is carried on a prescribed vibration plate 417 as shown in FIG. 32, and the above-mentioned bonding portion 404a is immersed in the molten zinc alloy soldering bath 415. This molten zinc alloy soldering bath 415 is held in a soldering tank 419 with a heater which maintains temperature of the molten zinc alloy soldering bath 415 at the above-mentioned prescribed value. An ultrasonic oscillator 421 is engaged with the vibration plate 417 so as to permit communication of ultrasonic vibration. This ultrasonic oscillator 421 comprises a horn 423 imparting vibration to the above-mentioned vibration plate 417, a vibrator 425 transmitting vibration to the horn 423, and an oscillator 427 communicating an oscillation signal to the vibrator 425.

The manufacturing method of the sealing member 405 will now be described below. As shown in FIG. 27(B), the sealing member 405 is formed into such a shape and a size by die casting as to allow bonding thereof to the foregoing bonding portion 404a of the cylinder block body 403 (S6 in FIG. 34). However, the manufacturing method is not limited to die casting, but the sealing member 405 may be manufactured by an other casting process or by grinding out a prescribed shape from a rolled material. The sealing member 405 has, as shown in FIGS. 27(B) and 28(A), a substantially rectangular plan shape and is formed into a plate shape. Four liner supporting holes 406 for the insertion of cylinder liners 411 described later are independently formed in a row in the sealing member 405.

A plurality of cooling water passing holes 406a are formed around each liner supporting holes 406. These cooling water passing holes 406a are for passage and circulation of water between the cylinder head side not shown and the cylinder block body 403. These cooling water passing holes 406a are therefore formed at positions corresponding to the recess 409 of the cylinder block body 403. A bolt through-hole 402c corresponding to the bolt hole 402b of the cylinder block body 403 is formed in the sealing member 405. In addition, oil removing holes 402a for direction lubricant oil dropping from the cylinder head through the cylinder block body to the crank case are provided at a plurality of positions of the sealing member 405.

The bonding portion 404b of the side of the sealing member 405 to be bonded to the cylinder block body 403 is subjected to a prescribed machining (S7 in FIG. 34). This is to achieve firmer bonding of the sealing member 405 and the cylinder block body 403, and bonding is accomplished by milling or the like as in the case of the cylinder block body 403.

After machining, the sealing member 405 is preheated to a temperature near the melting point of solder as in the case of the cylinder block body 403 (S8 in FIG. 34), immersed in the molten zinc alloy soldering bath 415 and applied with ultrasonic vibration. The forming conditions of the zinc alloy soldering layer are substantially the same as those of the cylinder block body 403 described above. The zinc alloy soldering layer is thus formed on the surface of the sealing member 405 (S9 in FIG. 34). Immersion of the sealing member 405 in the zinc alloy soldering bath 415 causes formation of the zinc alloy soldering layer on the entire surface of the sealing member 405, and this poses no problem in the manufacture. Operations for forming the zinc alloy soldering layer on the sealing member 405 are not described in FIG. 32, but are similar to those for the cylinder block body 403.

Figure 28B:
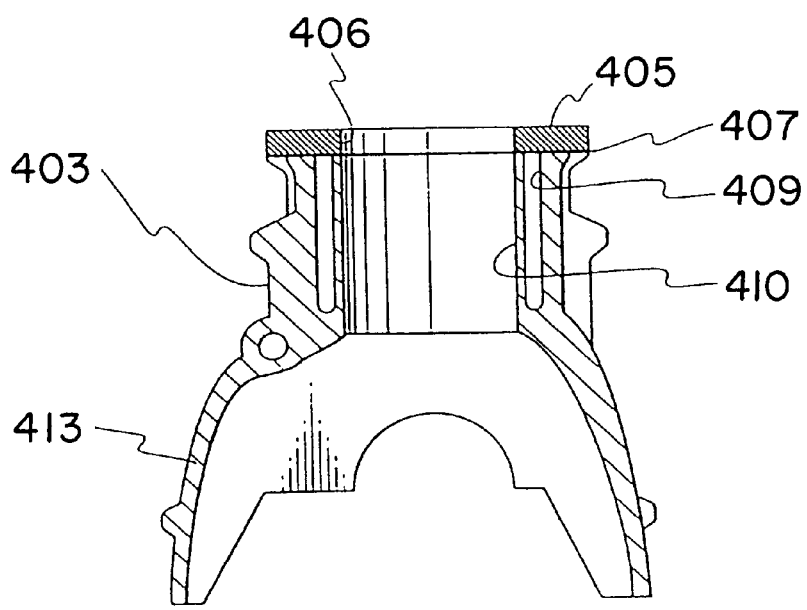

Then, the step of accomplishing bonding of the sealing member 405 with the cylinder block body 403 will be described below. As described above, zinc alloy soldering layers are formed on the cylinder block body 403 and the sealing member 405, respectively, and as shown in FIG. 28(B), the sealing member 405 is brought into contact with the bonding portion 404a of the cylinder block body 403. At this point, upon bonding the cylinder block 403 and the sealing member 405, mutually corresponding positioning pin members and pin holes are provided in the bonding portions thereof 404a and 404b (S10 in FIG. 34). The sealing member 405 is thus accurately positioned at a prescribed position for contact with the cylinder block body 403 (S11 in FIG. 34).

Figure 33:
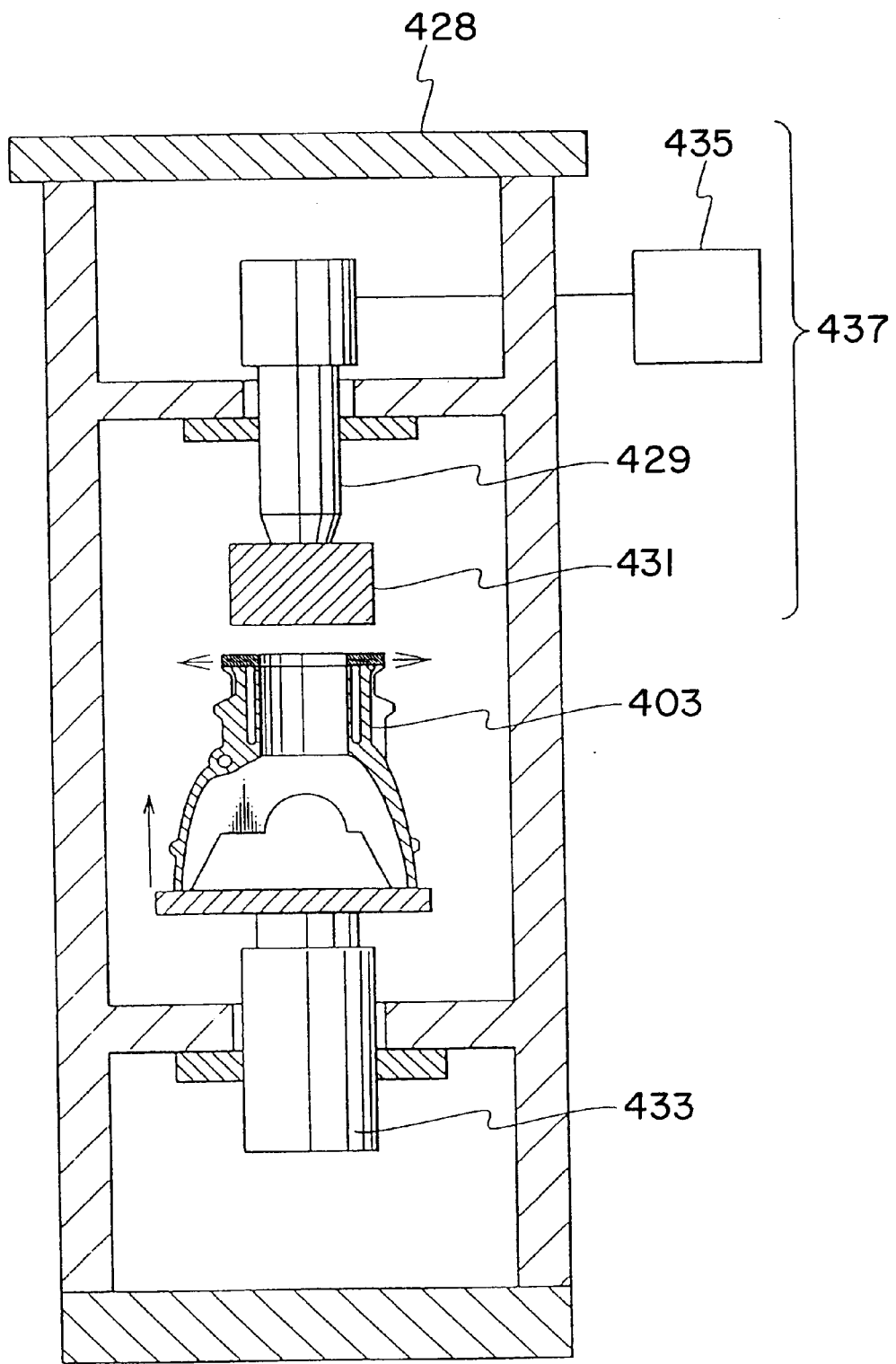
FIG. 33 is a descriptive view illustrating a case where ultrasonic vibration is applied after bringing the sealing member into contact with the cylinder block body.

Then, the cylinder block body 403 having the sealing member 405 brought into contact with the bonding portion 404a thereof is charged into an ultrasonic bonding apparatus 428 (see FIG. 33) provided separately. This ultrasonic bonding apparatus 428 carries the cylinder block body 403, and is provided with an air cylinder 433 for bringing the upper surface of the sealing member 405 into contact with the horn 431 engaged with the ultrasonic vibrator 429 described later. This ultrasonic oscillator 437 comprises a horn 431 directly giving ultrasonic vibration to the sealing member 405, a vibrator 429 communicating vibration to this horn 431, and an oscillator 435 imparting an oscillation signal to this vibrator 429.

A prescribed heater (not shown) is provided near the above-mentioned horn 431. This heater is for preheating the bonding portions 407 of the cylinder block body 403 and the sealing member 405, and comprises a high-frequency heater. The heater is not however limited to this, but it may be, for example, a gas burner using LPG gas. This may comprise the steps of heating the cylinder block body 403 and the sealing member 405 in a heating furnace (not shown), taking out them from the heating furnace, and applying ultrasonic vibration.

The cylinder block body 403 carried on the air cylinder 433 and the sealing member 405 are moved up by the action of the air cylinder 433 and comes into contact with the horn 431 arranged thereabove. More correctly, the sealing member 405 in contact with the bonding portion 404a of the cylinder block body 403 comes into direct contact with the horn 431. Subsequently, the bonding portion 407 is heated by the above-mentioned heater to a temperature near the melting point of solder, and ultrasonic vibration is applied by the horn 431 to the sealing member 405 (S12 in FIG. 34). Since the air cylinder 433 always presses the cylinder block body 403 against the horn 431 under a prescribed pressure, the zinc alloy soldering layer of the bonding portion 407 is melted along with the application of ultrasonic vibration, and the sealing member 405 comes into contact with the cylinder block body 403 through the zinc alloy soldering layer. The apparatus for applying ultrasonic vibration to the cylinder block body 403 may have a structure in which the up/down relationship of the ultrasonic oscillator 437 and the air cylinder 433 is reverse.

These steps integrate the cylinder block body 403 and the sealing member 405 (S13 in FIG. 34). The liner supporting hole 406 and the liner through-hole 410 of the sealing member 405 are processed to have an inside diameter slightly smaller than the outside diameter of the cylinder liner 411 (S14 in FIG. 34). Finally, the cylinder liner 411 is pressure-inserted into the liner supporting hole 406 of the sealing member 405 and the above-mentioned through-hole 410. As a result, as shown in FIG. 26, the cylinder liner 411, the recess 409 of the cylinder block body 403 and the sealing member 405 form a cooling channel around the entire periphery of the cylinder liner 411, thus substantially completing the closed deck type cylinder block 401.

This cylinder block 401 is a dry-liner type one in which the cylinder liner 411 does not come into direct contact with cooling water. However, the present invention is applicable to a cylinder block of any type, including a wet-liner type cylinder block in which the outer periphery of the cylinder liner 411 forms a cooling water channel.

The above description has covered a case where ultrasonic vibration is applied upon fixing the sealing member 405 to the cylinder block body 403 to melt the zinc alloy soldering layer for bonding. However, in place of S12 in FIG. 34, after bringing the sealing member 405 into contact with the cylinder block body 403, the proximity of the bonding portions of the both may be heated to a temperature higher than the melting point of the zinc alloy solder, for example, a temperature higher by at least 20° C. than the melting point, while applying a pressure the both, thereby once melting the zinc alloy solder for bonding. Heating is accomplished by induction heating or by means of a gas burner. By discontinuing heating, therefore, the zinc alloy soldering layers firmly fix the both.

Figure 29A:
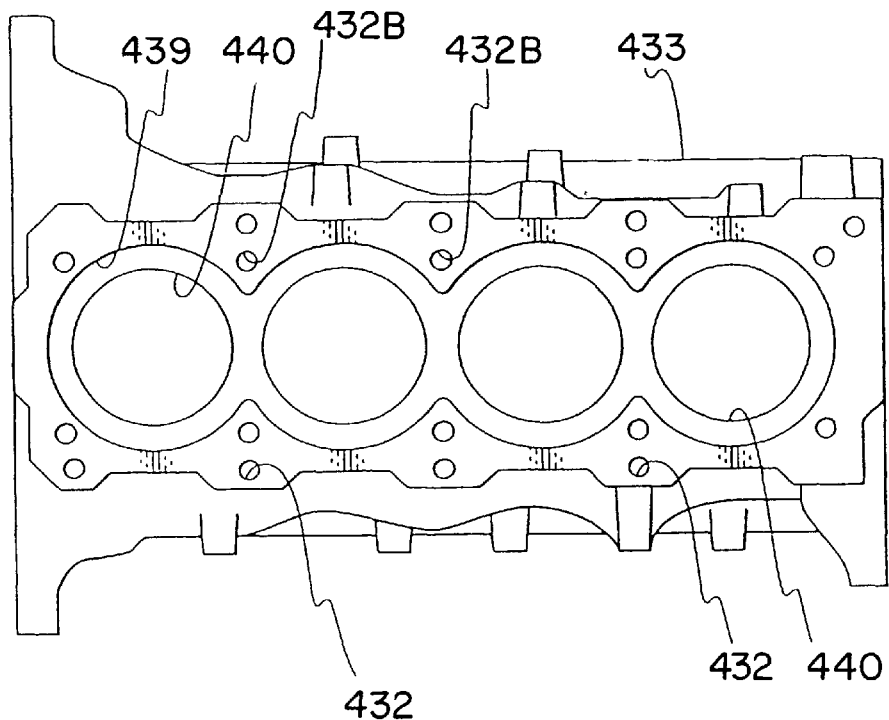
FIGS. 29(A) and 29(B) are plan views illustrating another embodiments of the cylinder block body and the sealing member.
Figure 29B:
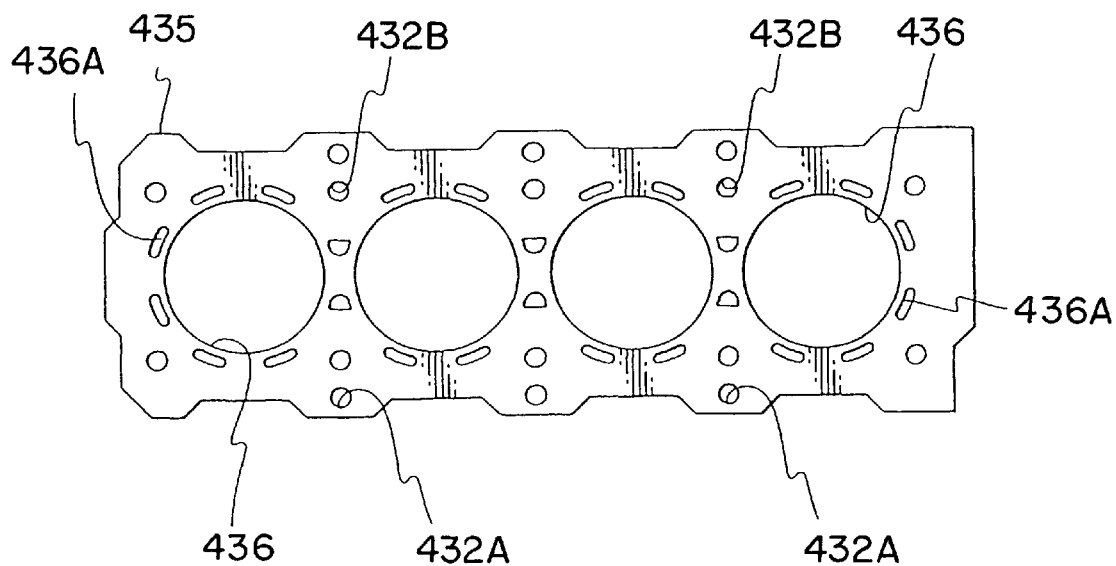
Figure 30A:
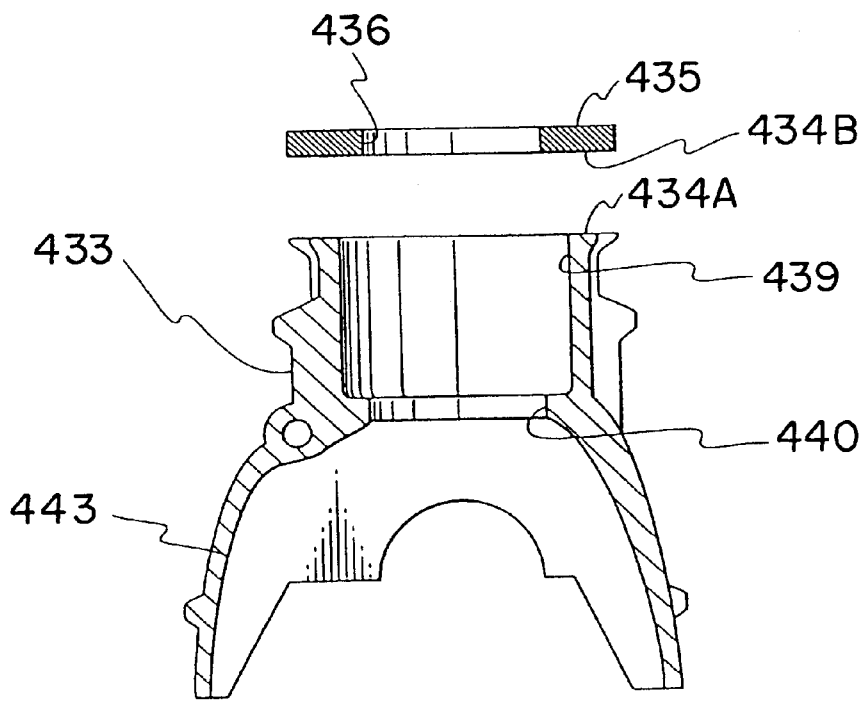
FIGS. 30(A) and 30(B) are side sectional view illustrating the states of bonding of the sealing member to the cylinder block body shown in FIG. 29.

FIGS. 29 and 30 illustrate a cylinder block in a variation of this embodiment. In this variation, the recess 439 of the cylinder block body 433 is formed into the shape of a cylinder having a prescribed inside diameter, and at the stage of completion, the outer periphery of the cylinder liner also serve to form part of the cooling water channel. This cylinder block 433 is commonly called the wet liner type as described above.

In this variation, the cylinder block body 433 suffices to form a simple-shaped recess as described above. It is therefore possible to use a simple-shaped casting die, thereby permitting improvement of the yield in the casting step.

Figure 30B:
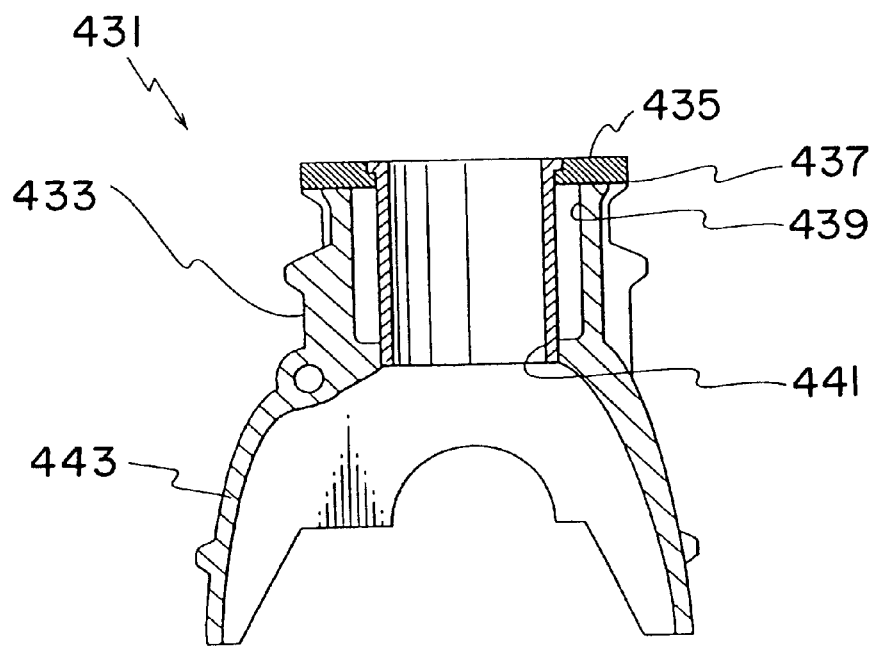

Thus, the closed deck type cylinder block 431 is completed by bonding the sealing member 435 to the bonding portion 434a of the cylinder block body 433 and pressure-inserting the cylinder liner 441 (see FIG. 30(B)). Since this wet liner type cylinder block 431 has a construction in which cooling water removes heat directly from the cylinder liner 441, a high cooling efficiency is available.

Figure 31:
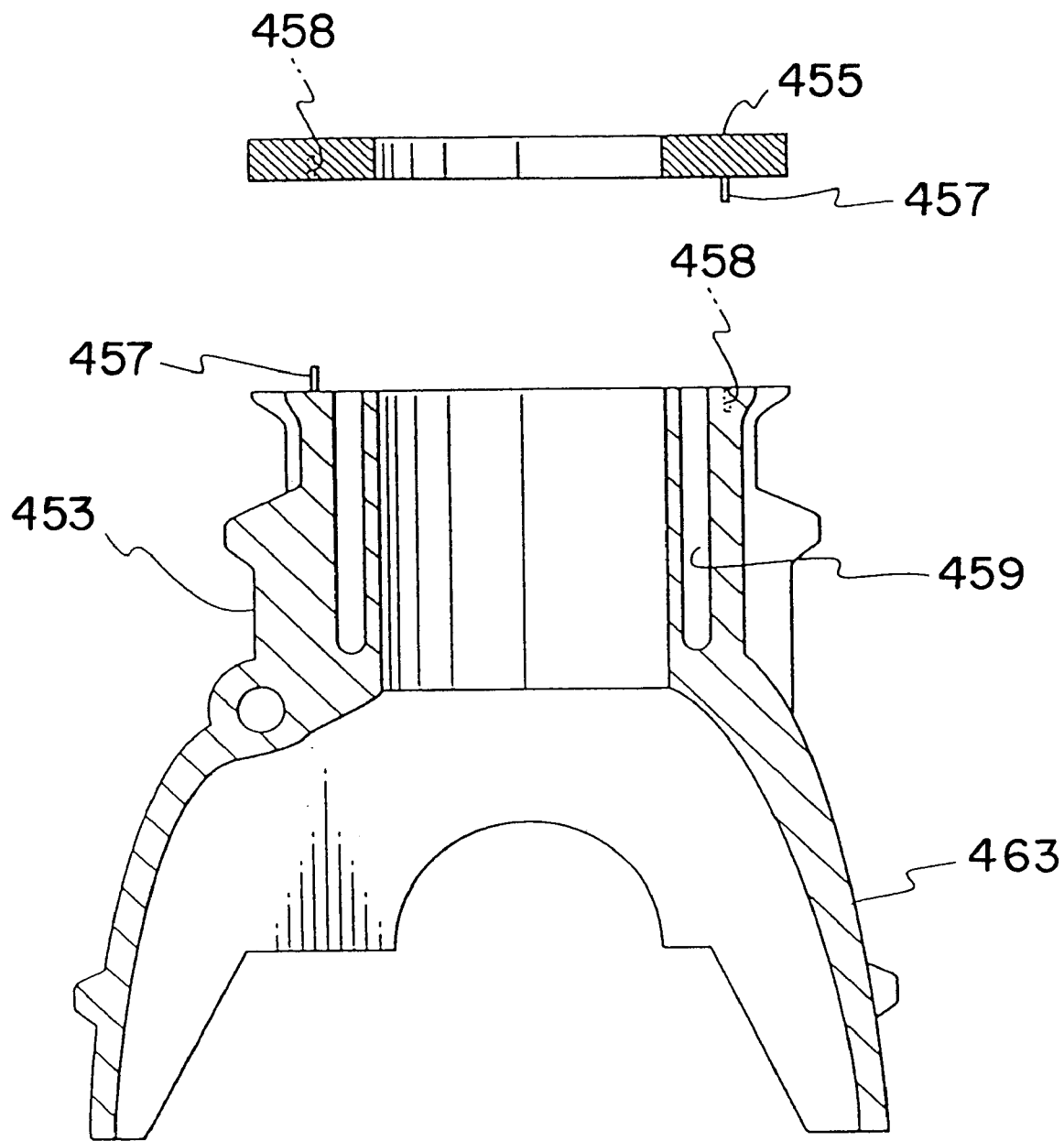
FIG. 31 is a side sectional view illustrating a case where pin members and pin holes for positioning are arranged on the bonding portion of the cylinder block body and the bonding portion of the sealing member.

When bonding the sealing member to the cylinder block body, it is necessary to conduct accurate positioning. As shown in FIG. 31, in this case, it is effective to provide prescribed pin members 457 and pin holes 458 in the bonding portions of the cylinder block body 453 and the sealing member 455. More particularly, when bonding the sealing member 455 to the cylinder block body 453, the individual pin members 457 and the pin holes 458 in alignment are brought into contact under a pressure. In the state in which the both are in contact, ultrasonic vibration is applied to the cylinder block body 453 or the sealing member 455 to fix the same. According to this variation, it is possible to perform accurate positioning of the both by only aligning the pin members 457 and the pin holes 458, thus improving productivity.

In the present invention, in which the sealing member to the open deck type cylinder block body are bonded through zinc alloy soldering layers, it is possible to manufacture the cylinder block body by die casting or the like, and thus to reduce the manufacturing cost as compared with those based o n low-pressure casting. This makes it possible to form a cooling water channel surrounded by the cylinder liner, the sealing member and the cylinder block body, and at the same time, to manufacture a cylinder block having a strength similar to that of a closed deck type cylinder block excellent in mechanical strength.

In the present invention, in which positioning surface irregularities corresponding to the bonding portion of the cylinder block body and the bonding portion of the sealing member, respectively, accurate relative positioning is ensured upon bonding the same. As a result, the assembly accuracy can be improved.

In the present invention, the zinc alloy soldering layer for the cylinder block body is formed only in the proximity of the bonding portion. There is therefore available an excellent effect of preventing formation of an unnecessary zinc alloy soldering layer in any other region.

In the present invention, the bonding member is bonded to the cylinder block body by heating the bonding portion to a temperature higher than the melting point of the zinc alloy solder. A zinc alloy soldering layer is therefore formed between them which are firmly bonded. In this case, it is not necessary to apply ultrasonic vibration upon bonding them, thus inhibiting the cost for equipment and improving operation efficiency.

In the present invention, ultrasonic vibration is applied upon bonding the cylinder block body and the bonding member. There is therefore available an excellent effect of more efficiently heating them, and forming a firm zinc alloy soldering layer, resulting in the manufacture of a cylinder block excellent in mechanical strength.

Now, a fourth embodiment of the present invention will be described below with reference to the drawings.

Figure 35:
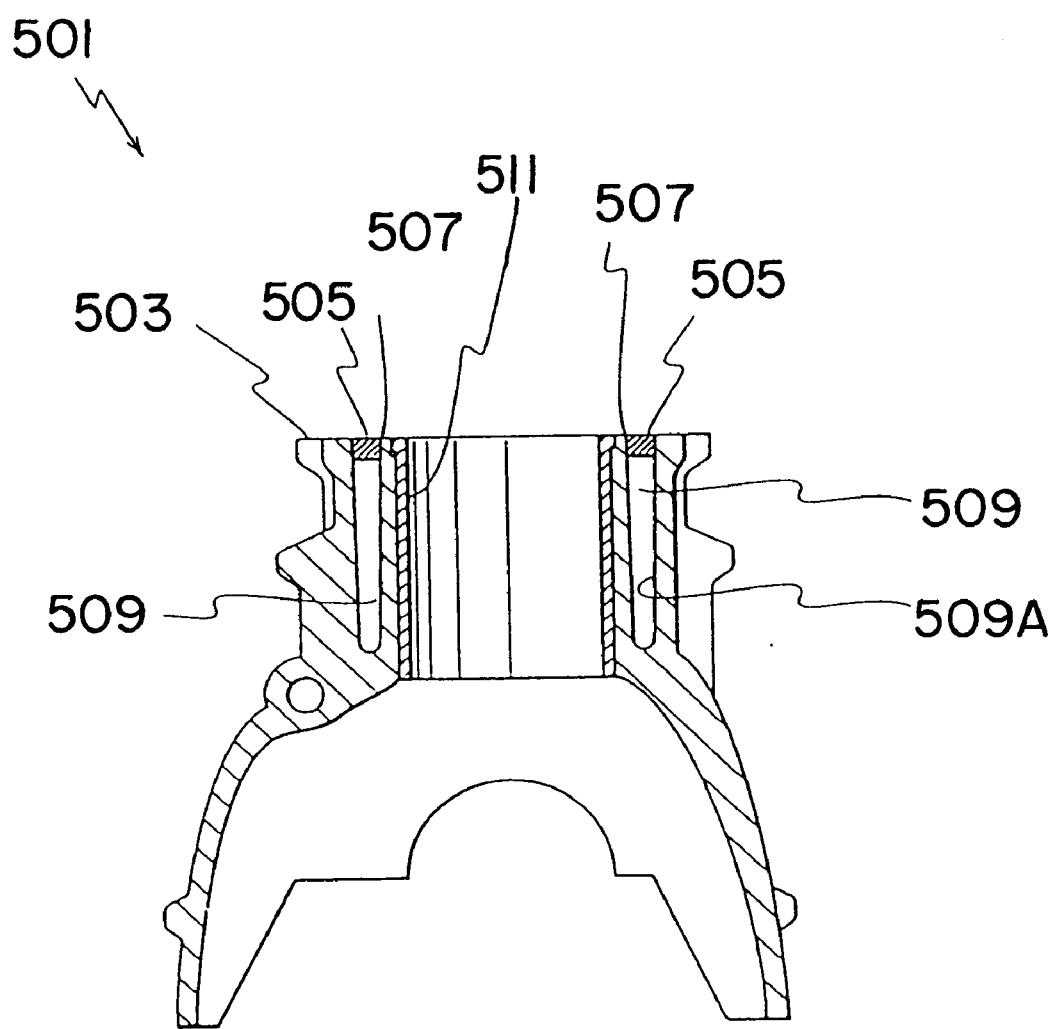
FIG. 35 is a sectional view illustrating the cylinder block in a fourth embodiment of the present invention.

In FIG. 35, 503 is a cylinder block body of an engine, 505 is a plug member, and 507 is a bonding portion based on application of ultrasonic vibration. FIG. 35 illustrates a dry-liner type cylinder block in which a cylinder sleeve does not come into direct contact with cooling water. It is also applicable to a half-wet liner type or wet liner type cylinder block.

The cylinder block body 503 is formed by an aluminum (alloy) casting, and the plug members 505 are individually formed by an aluminum alloy. The plurality of plug members 505 are inserted into channel walls 509a of a cooling water channel 509 through a zinc alloy soldering layer. That is, the plug members are bonded between the channel walls 509a of the cooling water channel 509 open at the top end of the cylinder block body 503.

Figure 36:
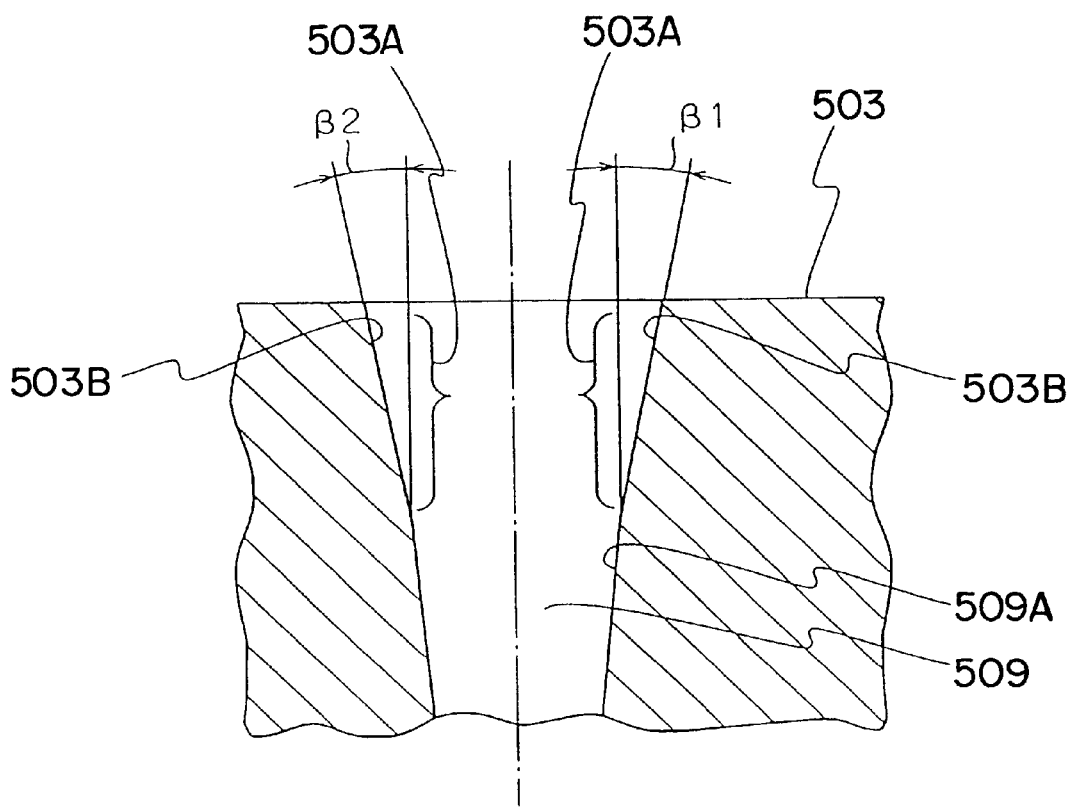
FIG. 36 is an enlarged sectional view of the bonding surface slant of the cylinder block shown in FIG. 35.

In this case, as shown in FIG. 36, a bonding surface slant 503b having a prescribed angle to the channel wall 509a is formed in the bonding portion of the channel 509a. At the same time, a prescribed plug member slant 505b corresponding to the bonding surface slant 503b is formed in the plug member 505, and the extent of the inclination angle $\beta 1$ of the bonding surface slant 503b is set at a value larger than the inclination angle $\alpha 1$ of the plug member slant 505b. Ultrasonic vibration is applied to at least one of the plug member 505 and the bonding portion 507 of the cylinder block body 503 to previously form a zinc alloy soldering layer on the surface thereof, and then, the plug member 505 is bonded to the bonding surface 503a of the cylinder block body 503.

This cylinder block body 503 is a die-cast aluminum casting. The material thereof is ADC10, ADC12 or ADC14 used commonly. The cooling water channel 509 is formed over the entire periphery of the cylinder sleeve 511.

The top end of the cooling water channel 509 is open before the insertion of the plug member 505. The top end of the cylinder block body 503 is processed flat so as to allow attachment of a cylinder head not shown. The cooling water channel 509 is formed so as to surround each cylinder.

Now, the method for manufacturing the cylinder block 501 of this embodiment will be described. FIG. 36 is an enlarged view illustrating the bonding surface 503a at the top end of the cylinder block body 503. In this embodiment, as is known from FIG. 36, there is used an open deck type cylinder block body 503 in which the entire top end of the cooling channel 509 is open. The bonding surface 503a of the cylinder block body 503 takes a form in which the cross-section of the cooling water channel 509 expands upward, and is formed as the bonding surface slant 503b. The bonding surface slant 503b may be formed directly by casting, or may be formed by machining after casting.

On the other hand, the plug member 505 is formed into such a shape and size as to permit insertion into the channel wall 509a of the cooling water channel 509 by die casting.

More specifically, it is formed into substantially a trapezoidal cross-section, and the both sides are formed as the plug member slants 505b. The plug member slant 505b may be formed by casting as described above, or may be formed by making a cube by casting and then subjecting it to a prescribed machining. The casting method is not limited to die casting, but for example, a prescribed shape may be ground out from a rolled material.

Figure 37:
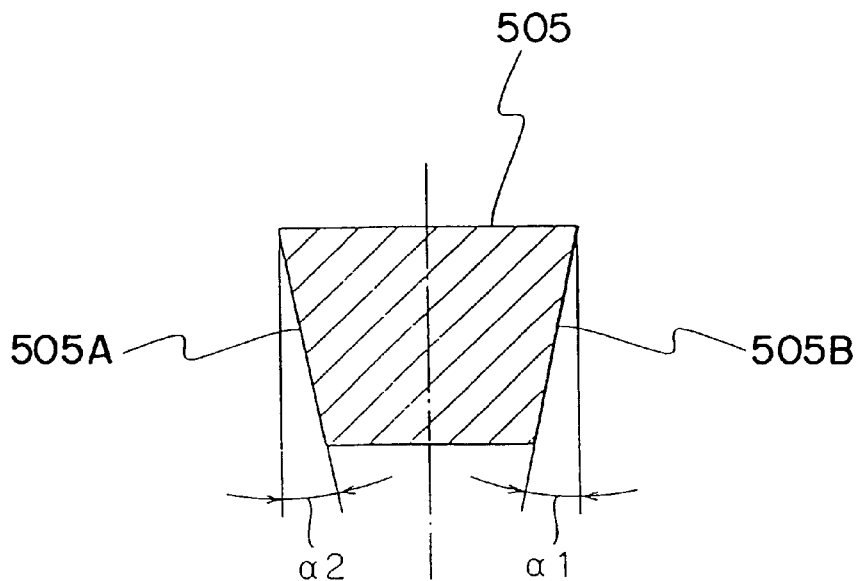
FIG. 37 is an enlarged sectional view of the plug member shown in FIG. 35.

When the bonding surface slants 503b have inclination angles of $\beta 1$ and $\beta 2$, respectively, as shown in FIG. 36, and the plug member slants 505b have inclination angles $\alpha 1$ and $\alpha 2$, respectively, as shown in FIG. 37, there are relationships as expressed by the following formulae (1) to (3) between angles $\alpha 1$ and $\beta 1$ on the right side of each graph:

$$0.1° < \alpha 1 < 15° \tag{1}$$

$$0.1° < \beta 1 < 15° \tag{2}$$

$$\alpha 1 + 1° \leq \beta 1 \tag{3}$$

There are the following relationship as expressed by the following formulae (4) to (6) between angles $\alpha 2$ and $\beta 2$ on the left side of the graph:

$$0.1° < \alpha 2 < 15° \tag{4}$$

$$0.1° < \beta 2 < 15° \tag{5}$$

$$\alpha 2 + 1° \leq \beta 2 \tag{6}$$

Figure 38:
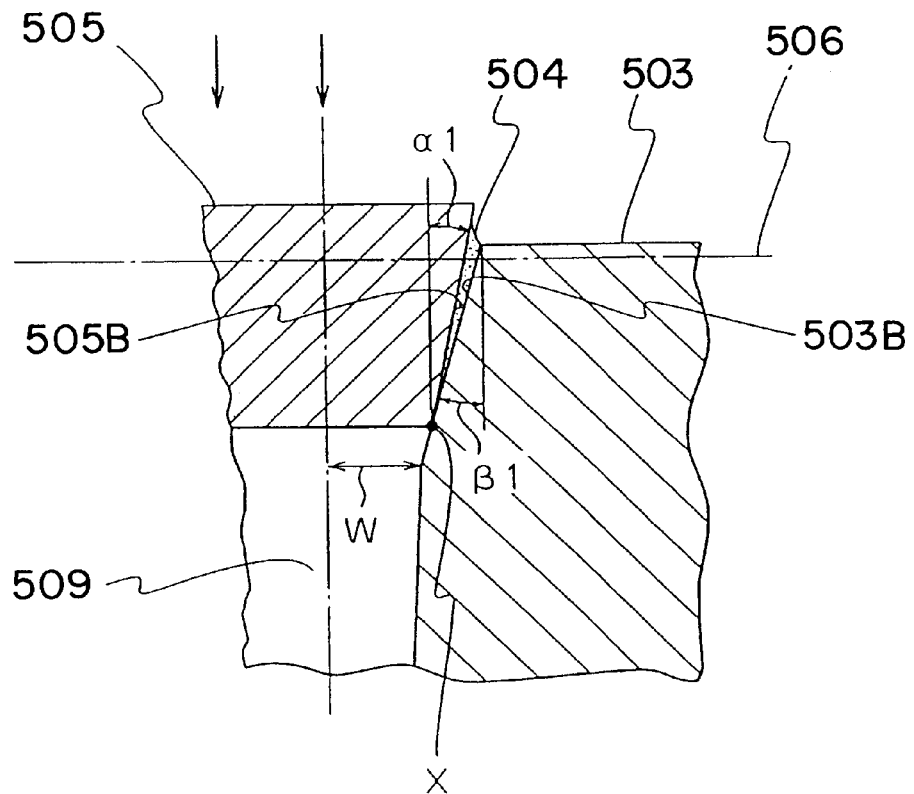
FIG. 38 is an enlarged sectional view illustrating the state of bonding of the plug member to the cylinder block body.

Now, bonding of the bonding surface slants 503b and the plug member slants 505b satisfying the foregoing conditions will be described below in detail. First, FIG. 38 illustrates a case satisfying the condition $\alpha 1 < \beta 1$, i.e., a case where the inclination angle $\beta 1$ of the bonding surface slant 503b of the cylinder block body 503 is larger than the inclination angle $\alpha 1$ of the plug member slant 505b. In this case, the lower end of the plug member 505 is formed so as to have a width wide than that (2 W) at a prescribed position of the cooling water channel 509.

Upon bonding the cylinder block body 503 and the plug member 505, zinc alloy soldering layers are formed by the application of ultrasonic vibration on the bonding surface slant 503b of the cylinder block body 503 and the plug member slant 505b of the plug member 505. The zinc alloy soldering layer is formed for the cylinder block body 503 only in the end region on the side where a cylinder head (not shown), or specifically, the zinc alloy soldering layer is formed over an area of about 30 mm from the upper end. In this case, a zinc alloy solder having, for example, a melting point of about 382° C. is used. The foregoing bonding surface slant 503b is immersed in a molten zinc alloy soldering bath formed by melting this zinc alloy solder and keeping a temperature within a range of from 410 to 430° C., and ultrasonic vibration is applied.

The frequency of ultrasonic vibration is set within a range of from about 18 to 20 kHz, and the oscillator output for application should be within a range of from 100 to 500 W. Specifically, ultrasonic vibration is applied for several seconds. A prescribed zinc alloy soldering layer is thus formed on the bonding surface slant 503b of the cylinder block body 503.

Figure 45:
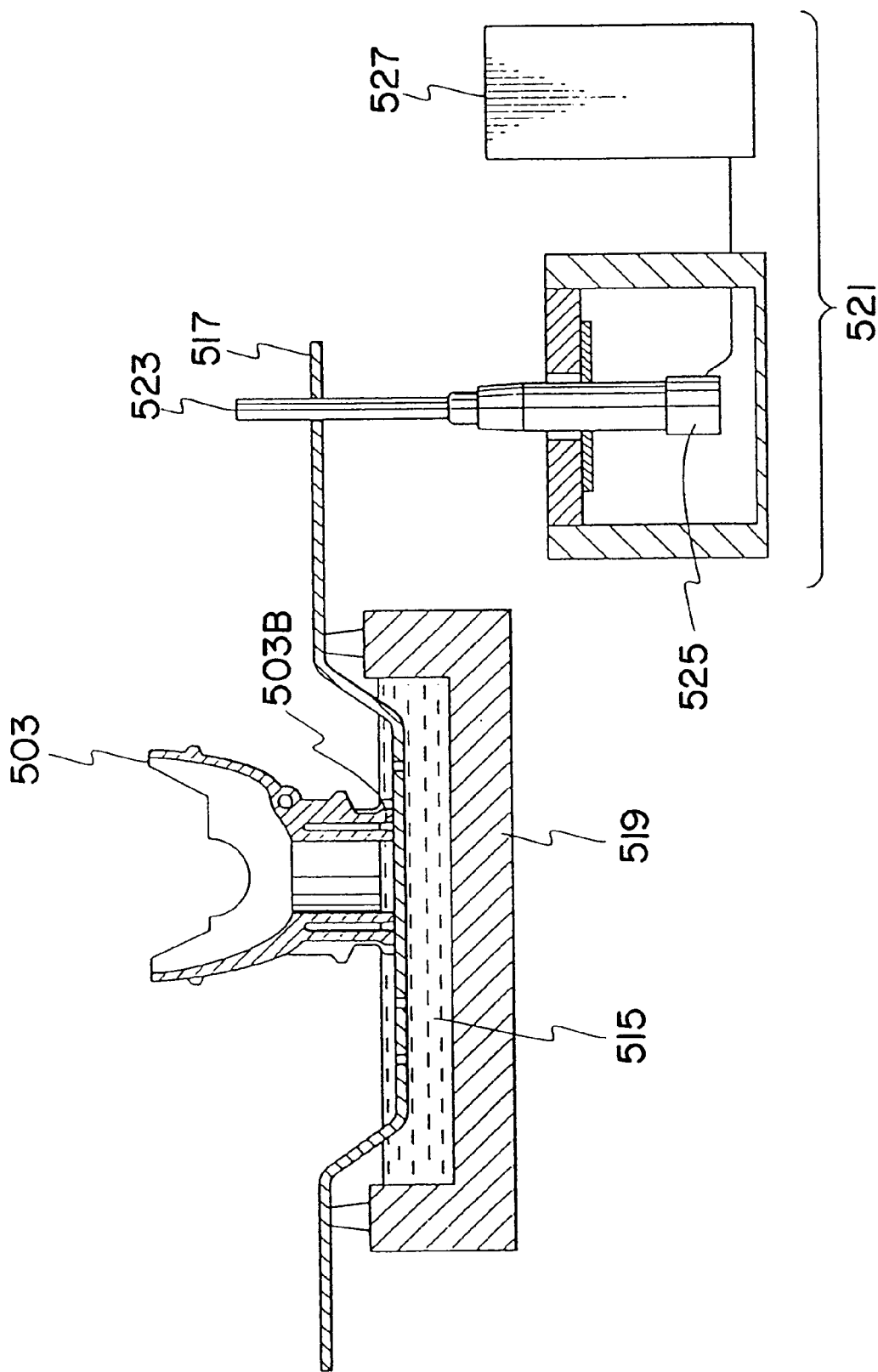
FIG. 45 is a sectional view illustrating a soldering layer forming apparatus for forming the zinc alloy soldering layer by applying ultrasonic vibration to the cylinder block body.

Now, the apparatus for applying ultrasonic vibration to the cylinder block body 503 will be described below in detail. The cylinder block body 503 is carried on a prescribed vibration plate 517 as shown in FIG. 45, and the above-mentioned bonding surface slant 503b of the cylinder block body 503 is immersed in the molten alloy soldering bath 515. This molten zinc alloy soldering bath 515 is held in a soldering tank 519 with a heater which maintains temperature of the molten zinc alloy solder at the above-mentioned prescribed value. An ultrasonic oscillator 521 is engaged with the vibration plate 517 so as to permit communication of ultrasonic vibration. This ultrasonic oscillator 521 comprises a horn 523 imparting vibration to the above-mentioned vibration plate 517, a vibrator 525 transmitting vibration to the horn 523, and an oscillator 527 communicating an oscillation signal to the vibrator 525.

As in the case of the cylinder block body 503, the plug member 505 is preheated to up to about 380° C., immersed in the molten zinc alloy soldering bath 515 and applied with ultrasonic vibration. However, the application time of ultrasonic vibration to the plug member 505 is limited within a range of from about 2 to 5 seconds. The zinc alloy soldering layer is thus formed on the surface of the plug member 505. Immersion of the plug member 505 in the zinc alloy soldering bath 515 forms a zinc alloy soldering layer on the entire surface of the plug member 505, but this poses no problem in the manufacture.

Then, the process of accomplishing bonding by inserting the plug member 505 into the cylinder block body 503 will be described below. As described above, zinc alloy soldering layers are formed on the cylinder block body 503 and the plug member 505, respectively, and as shown in FIG. 38, the plug member 505 is inserted into the bonding surface slant 503b of the cooling water channel 509 at the top end of the cylinder block body 503.

Figure 46:
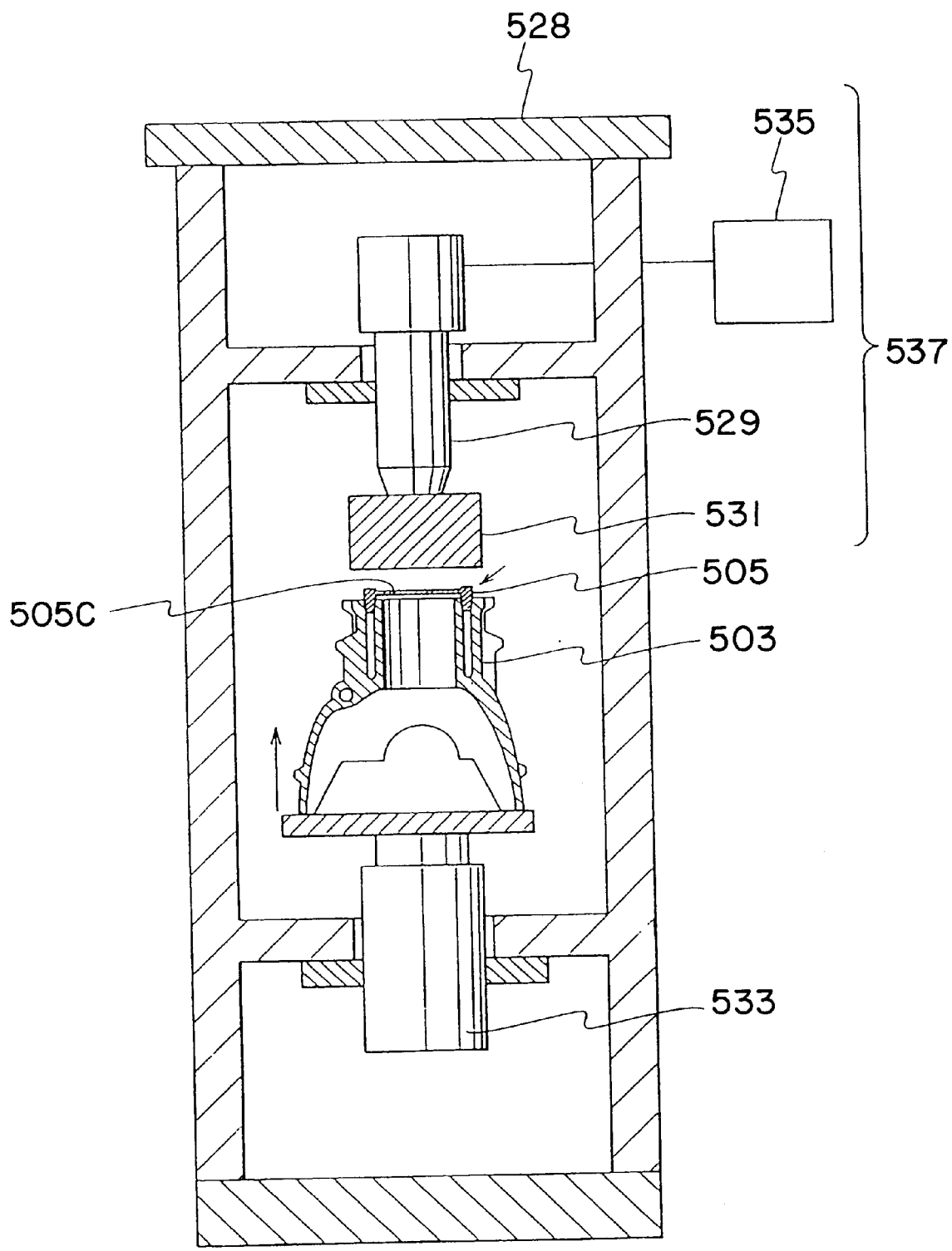
FIG. 46 is a sectional view illustrating an ultrasonic bonding apparatus for bonding the cylinder block body and the plug member integrated together.

Then, the cylinder block body 503 having the plug member 505 inserted into the channel walls 509a thereof is placed in an ultrasonic bonding apparatus 528 provided separately as shown in FIG. 46. This ultrasonic bonding apparatus 528 carries the cylinder block body 503, and is provided with an air cylinder 533 for bringing the cylinder block body 503 into contact with the horn 531 bonded to the ultrasonic vibrator 529 described later. A prescribed oscillator 537 is arranged above the air cylinder 533. This ultrasonic oscillator 537 comprises, as shown in FIG. 46, a horn 531 directly giving ultrasonic vibration to the plug member 505, a vibrator 529 communicating vibration to this horn 531, and an oscillator 535 imparting an oscillation signal to the vibrator 529.

A prescribed heater (not shown) is provided near the above-mentioned horn 531. This heater is for preheating the bonding portions of the cylinder block body 503 and the plug member 505, and comprises a high-frequency heater. The heater is not however limited to this, but it may be, for example, a gas burner using LPG gas.

The cylinder block body 503 carried on the air cylinder 533 is moved up by the action of the air cylinder 533 and comes into contact with the horn 531 arranged thereabove. More correctly, it is inserted into the channel walls 509a, and the plug member 505 still projecting upward comes into contact with the horn 531. Subsequently, the bonding portion is heated by the above-mentioned heater, and ultrasonic vibration is applied. Since the air cylinder 533 always presses the cylinder block body 503 against the horn 531 under a prescribed pressure, the zinc alloy soldering layer is melted along with heating and the application of ultrasonic vibration, and the plug member 505 is gradually inserted into the cylinder block body 503.

These steps integrate the cylinder block body 503 and the plug member 505 as shown in FIG. 38. Since there is a relationship $\alpha1<\beta1$ as described above, a feature at this point is that pressing the plug member 505 against the cylinder block body 503 causes an increase in the surface pressure for the entire bonding surface slant 503b.

Finally, a prescribed machining is applied to complete the cylinder block 501. The final machining is accomplished by excising the upper portion from the deck surface processing position 506 shown in FIG. 38 through milling or the like. Even after machining, therefore, the point X where the pressing force is the largest (bonding strength is also large) remains as it is, whereby strength of the cylinder block 501 itself is kept at a high level. between the bonding surface slant 503b and the plug member slant 505b, filling of the zinc alloy solder is improved, permitting formation of an appropriate zinc alloy soldering layer 504. Because the plug member 505 is firmly bonded with the bonding surface slant 503b at the lowermost portion of the plug member 505, leakage of the molten zinc alloy solder into the cooling water channel 509 can be prevented.

Figure 39:
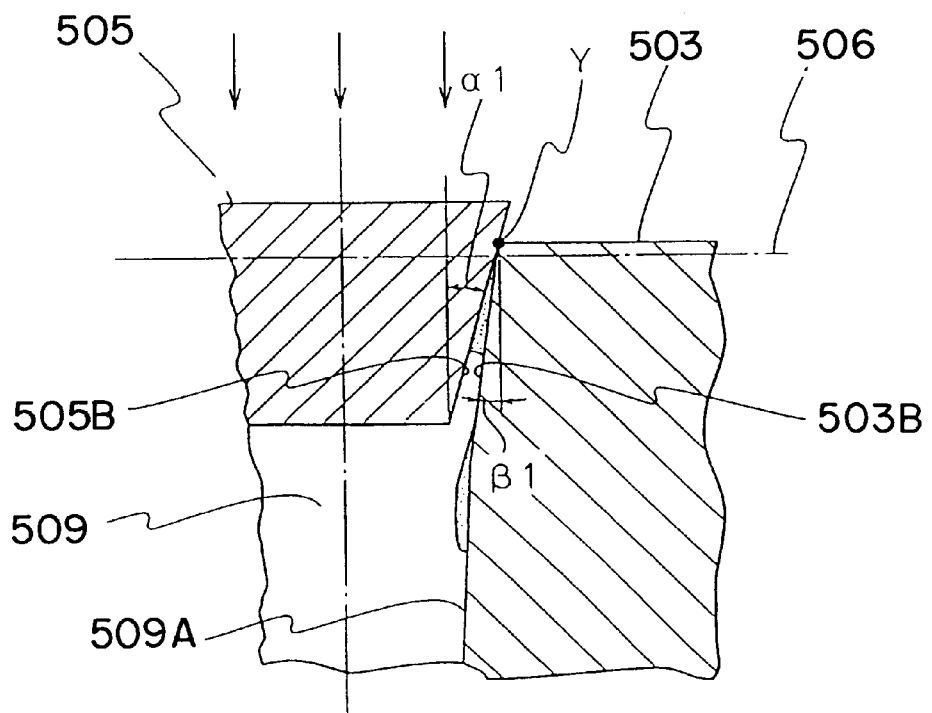
FIG. 39 is an enlarged sectional view illustrating a defective example shown for comparison with the embodiment shown in FIG. 38.

In contrast to the bonding of the cylinder block body and the plug member described above, the case of $\alpha1>\beta1$ will be described below with reference to FIG. 39. As is clear from FIG. 39, because the inclination angle $\beta1$ of the bonding surface slant 503b is set to a value smaller than the inclination angle $\alpha1$ of the plug member slant 505b, the bonding surface slant 503b and the plug member slant 505b are most firmly bonded at the upper end point Y of the bonding surface slant 503b. Pressing the plug member 505 against the cylinder block body 503 can therefore increase the surface pressure only locally. Application of machining to the upper end surface (deck surface) after bonding excises the point Y as well, thus making it impossible to increase mechanical bonding strength. In addition, as shown in FIG. 39, there occurs an inconvenience of leakage of the molten zinc alloy solder into the cooling water channel 509.

Figure 40:
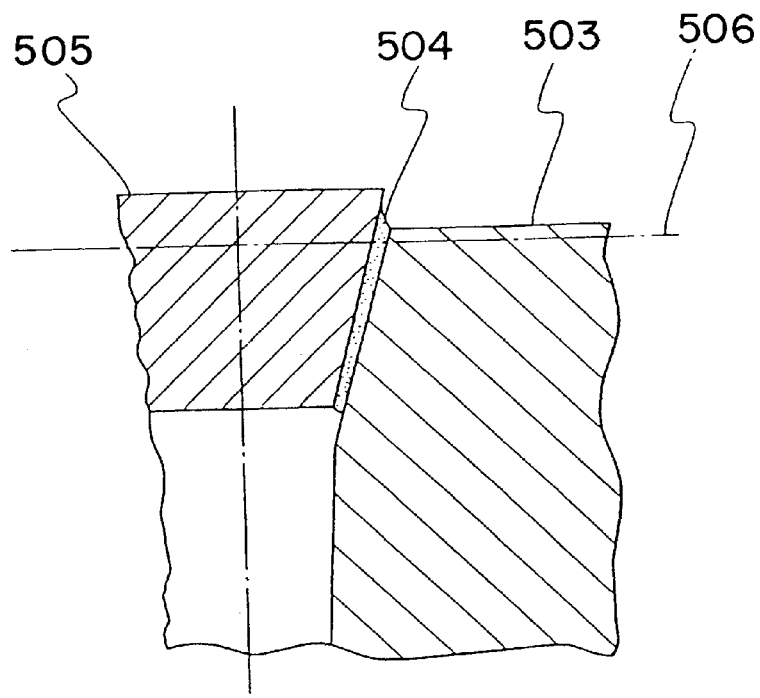
FIG. 40 is an enlarged sectional view illustrating a case where the bonding surface slant and the plug member slant satisfy optimum conditions.

FIG. 40 is a graph illustrating a case where the inclination angle of the bonding surface slant 503b is equal to the inclination angle of the plug member slant 505b. In this configuration, a uniform surface pressure is achieved over the entire surfaces of the bonding surface slant 503b and the plug member slant 505b, and the formed zinc alloy soldering layer has a uniform thickness. it is thus possible to manufacture a cylinder block excellent in air-tightness and bonding strength.

Figure 41:
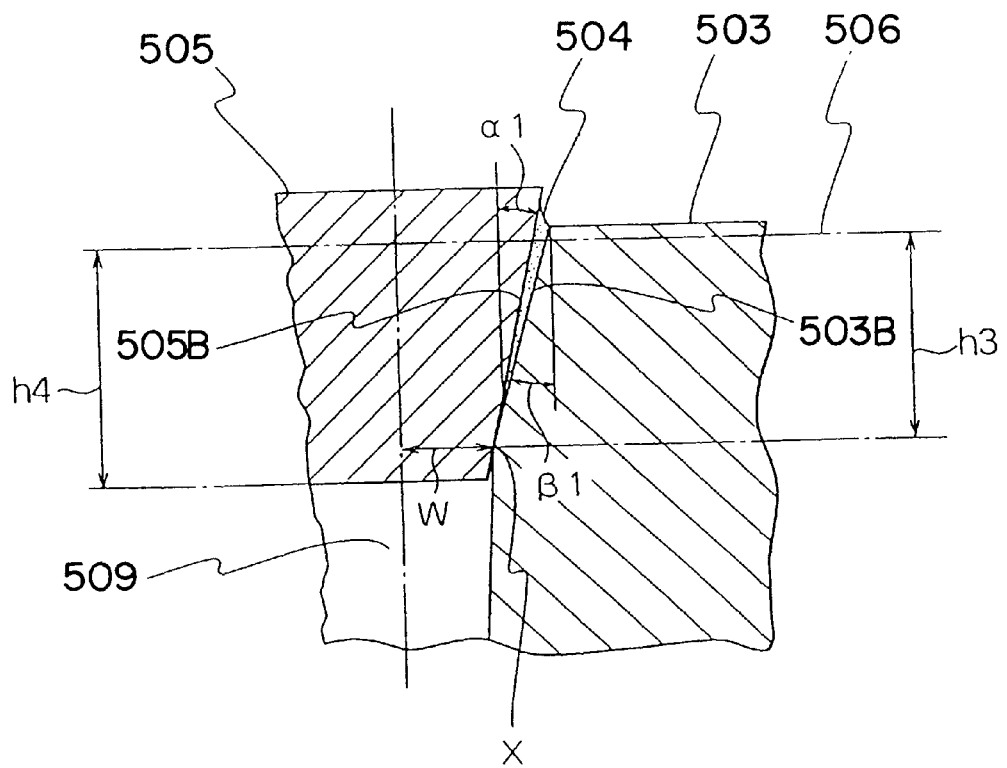
FIG. 41 is an enlarged sectional view illustrating the bonding surface slant and the plug member slant in a variation of the fourth embodiment.

Now, a variation of this embodiment will be described below with reference to FIG. 41. This variation has a configuration in which the height h4 for insertion of the plug member 505 is larger than the height h3 of the bonding surface slant 503b of the cylinder block body 503. Further, the lower end portion of the plug member 505 has a width smaller than the lower end portion of the bonding surface slant 503b (W on one side, and 2 W in total). Therefore, even after application of the same machining as in the above embodiment, the point X with the largest pressing force (with a large bonding strength) remains as it is, and the strength of the cylinder block itself is maintained at a high level. Between the bonding surface slant 503b and the plug member slant 505b, filling of the zinc alloy solder is improved, and an appropriate zinc alloy soldering layer 504 is formed. In addition, because it is bonded firmly to the bonding surface slant 503b at the lowermost end of the plug member 505, and leakage of the molten zinc alloy solder into the cooling water channel 509 can be prevented.

Figure 42:
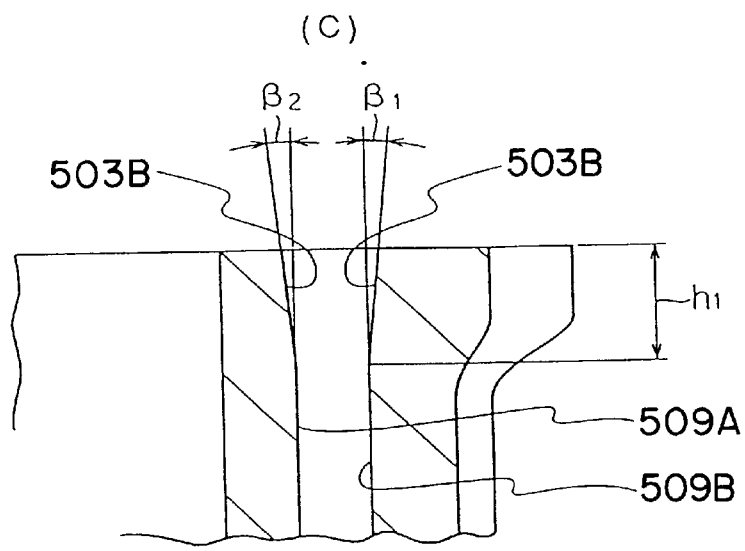
FIG. 42 is an enlarged sectional view illustrating the bonding surface slant of the cylinder block body in another variation of the fourth embodiment.
Figure 43:
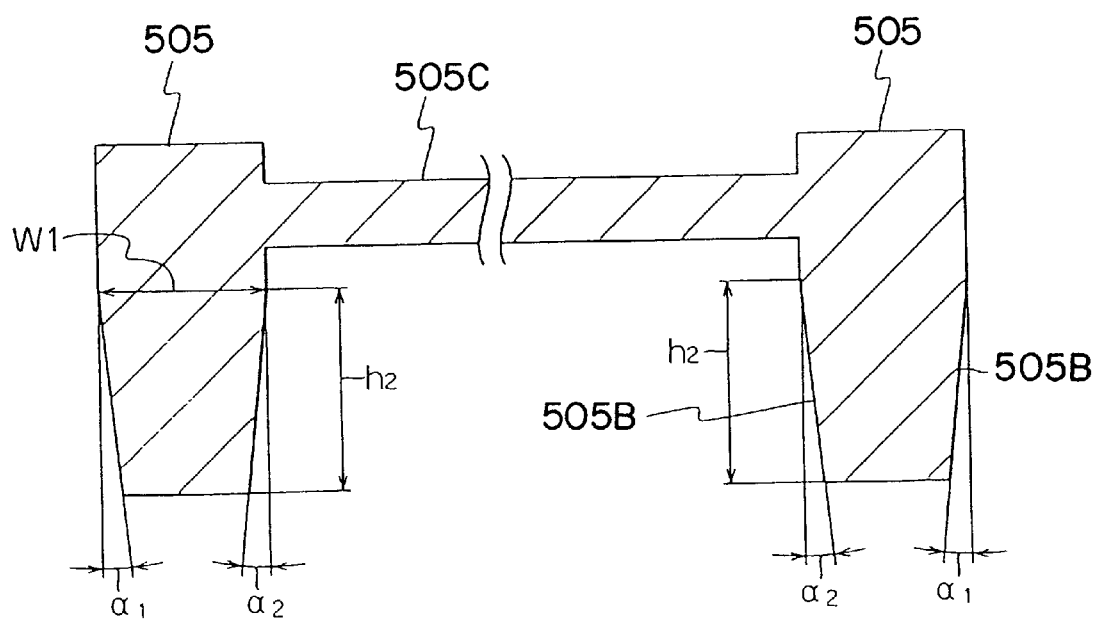
FIG. 43 is a sectional view illustrating the plug member bonded to the bonding surface slant shown in FIG. 42.
Figure 44:
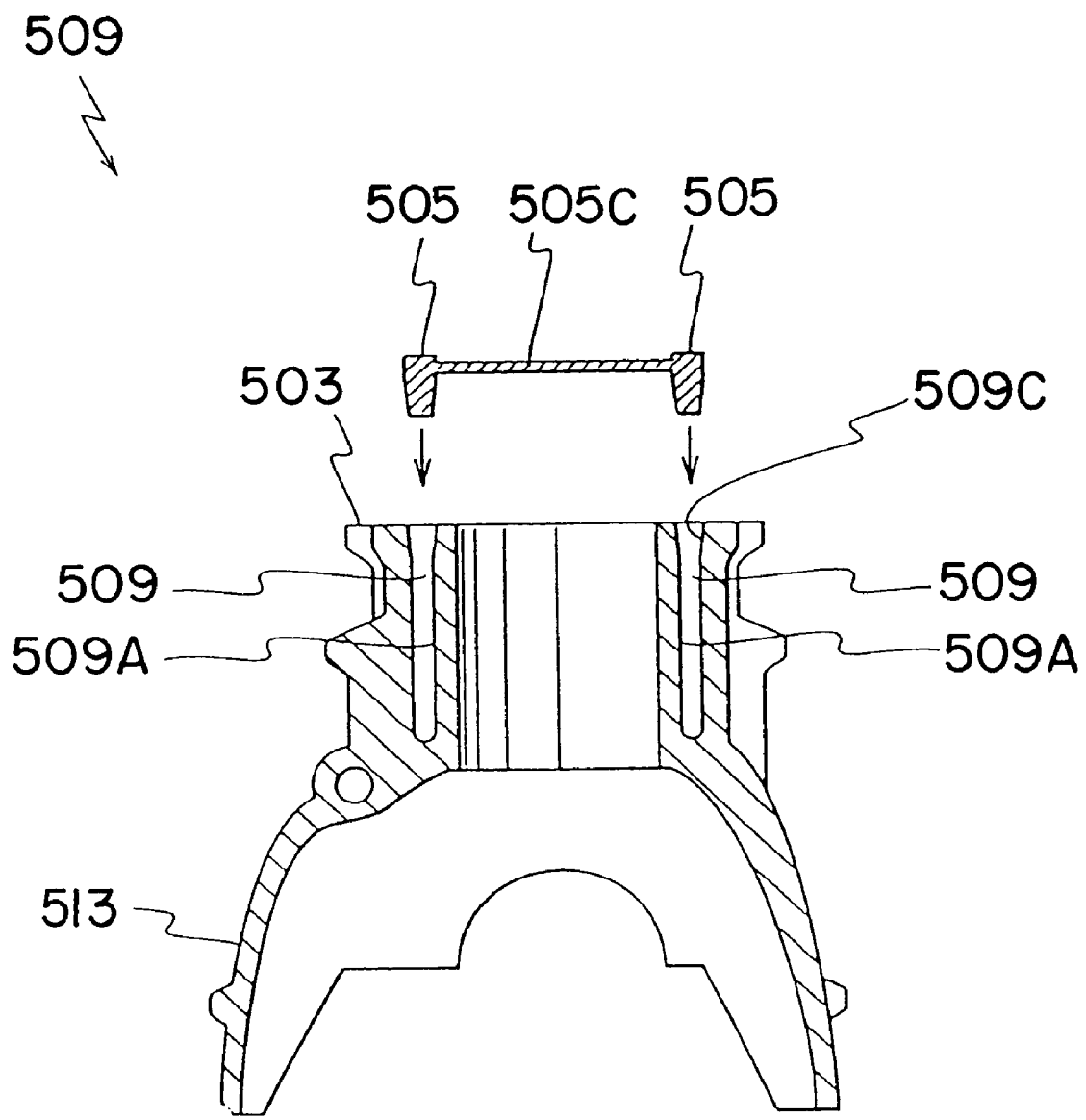
FIG. 44 is a sectional view illustrating the state of insertion of the plug member shown in FIG. 43 into the cylinder block body shown in FIG. 42.

Another variation of the embodiment is illustrated in FIGS. 42 to 44. In this variation, the cylinder block body 503 has almost the same construction as in the embodiment described above. However, the bonding surface slant 503b has inclination angles $\beta1$ and $\beta2$ for a height h1. As shown in FIG. 43, a plurality of plug members 505 are provided, and these plug members 505 are integrally connected by means of arm members 505c. The plug member slant 505 has inclination angles α1 and α2 relative to the height h2, corresponding to the bonding surface slant 503b. In this respect, it is not always necessary that the inclination angle of the bonding surface slant 503b and the inclination angle of the plug member slant 505b should satisfy α1=α2 and β1=β2 (symmetric). When the plurality of plug members 505 are formed integrally, it is possible to accomplish positioning simultaneously for the plurality of bonding surfaces.

Of the cross-section of the plug member 505, the widest width W1 is slightly longer than the maximum mutual distance of the bonding surface slants 503b. This is to stop the plug member 505 at a prescribed position to prevent further penetration thereof when inserting the plug member 505 into the cylinder block body 503. The subsequent steps comprise, as shown in FIG. 44, inserting the plug member 505 integrally formed with the arm member 505c into the cylinder block body 503, pressing the plug member 505 while heating the same in the same manner as in the above embodiment, and applying ultrasonic vibration to bond them together.

In the present invention, in which the plug member is ultrasonic-soldered to the open deck type cylinder block body, it is possible to manufacture the cylinder block body by die casting or the like at a low cost. Since the channel walls of the cooling water channel with the plug member by ultrasonic soldering, it is possible to manufacture a cylinder block having a high strength as in a closed deck type one excellent in mechanical strength. Applicability of die casting leads to a higher productivity.

In the present invention, because the angle of the bonding surface slant is set to a value larger than the angle of the plug member slant, the surface pressure of the entire bonding surfaces increases appropriately when applying ultrasonic vibration while pressing the plug member against the cylinder block body upon bonding. The entire bonding surfaces become resonant more easily, and the zinc alloy solder between the bonding surface slant and the plug member slant sufficiently melt together, thus permitting achievement of satisfactory bonding strength and reliability. Another excellent effect is the certain prevention of leakage of the molten alloy solder into the cooling water channel.

In the present invention, there are portions showing the highest pressing force in the lower regions of the bonding surface slant and the plug member slant. Even by machining after bonding, therefore, these portions remain, thus making it possible to maintain mechanical strength of the cylinder block at a high level.

In the present invention, because the surface pressure between the bonding surface slant and the plug member slant can be appropriately ensured, it is possible to control the oscillator output of ultrasonic vibration upon bonding, and when applying heating alone under the same conditions, ultrasonic vibration may become unnecessary.

In the present invention, a plurality of plug members are provided, and each plug member is formed integrally with an arm member. This provides an excellent effect of permitting installation of all the plug members at prescribed positions in a single run of positioning, thus improving the manufacturing efficiency of the cylinder block.

Figure 47:
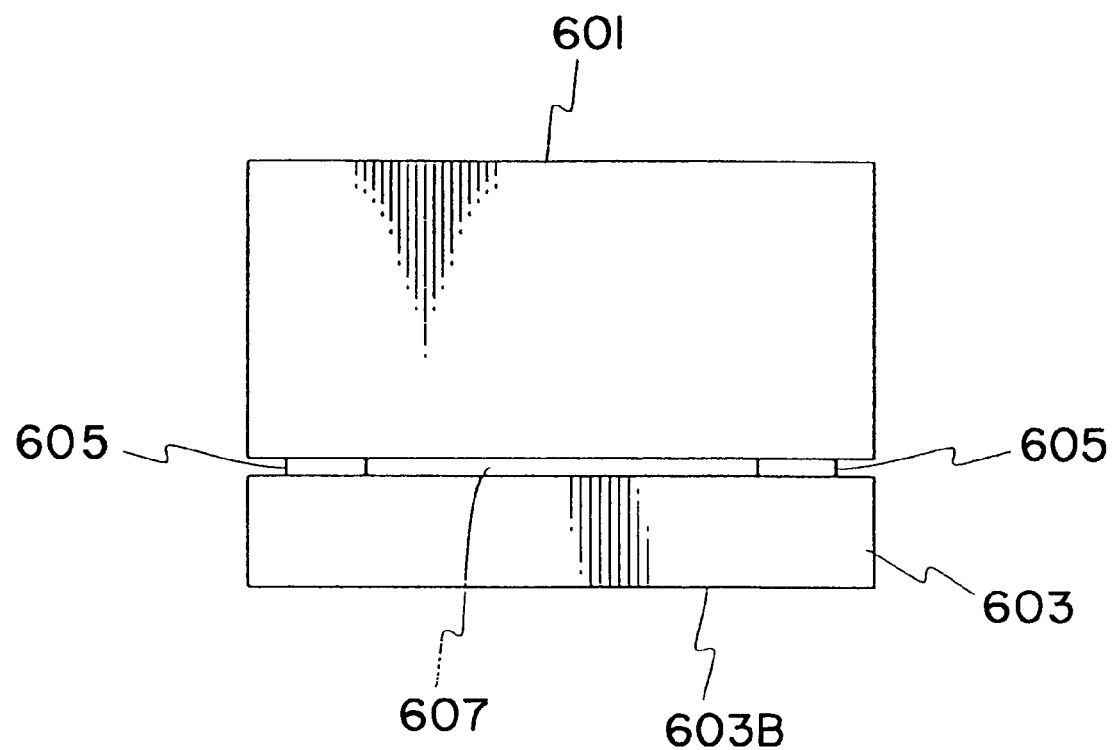
FIG. 47 is a front view illustrating a fifth embodiment of the present invention, showing the state in which the both bonding members are brought into butt contact through a spacer.

Now, a fifth embodiment of the present invention will be described below with reference to FIG. 47. The bonding method of the present embodiment comprises the steps of providing a first bonding member 601 and a second bonding member 603 having respective bonding surfaces previously provided with respective zinc alloy soldering layers, bringing the bonding surfaces 601a and 603a of these bonding members 601 and 603 into butt contact, immersing a gap portion 607 in a molten zinc alloy soldering bath, applying ultrasonic vibration to the proximity of this gap portion 607 to fill the gap portion with molten zinc alloy solder, drawing up the both bonding members 601 and 603 from the molten zinc soldering bath, and then applying a pressure uniformly onto the bonding surfaces 601a and 603a for bonding.

The first bonding member 601 and the second bonding member 603 are blocks made of aluminum, with spacers 605 in between, with a prescribed gap portion 607 provided in between. However, the bonding members 601 and 603 in this embodiment are simply examples, and there is no limitation on the shape thereof. In the aspect of materials of the bonding members 601 and 603, the present invention is applicable even when any of the members is made of iron.

Figure 48A:
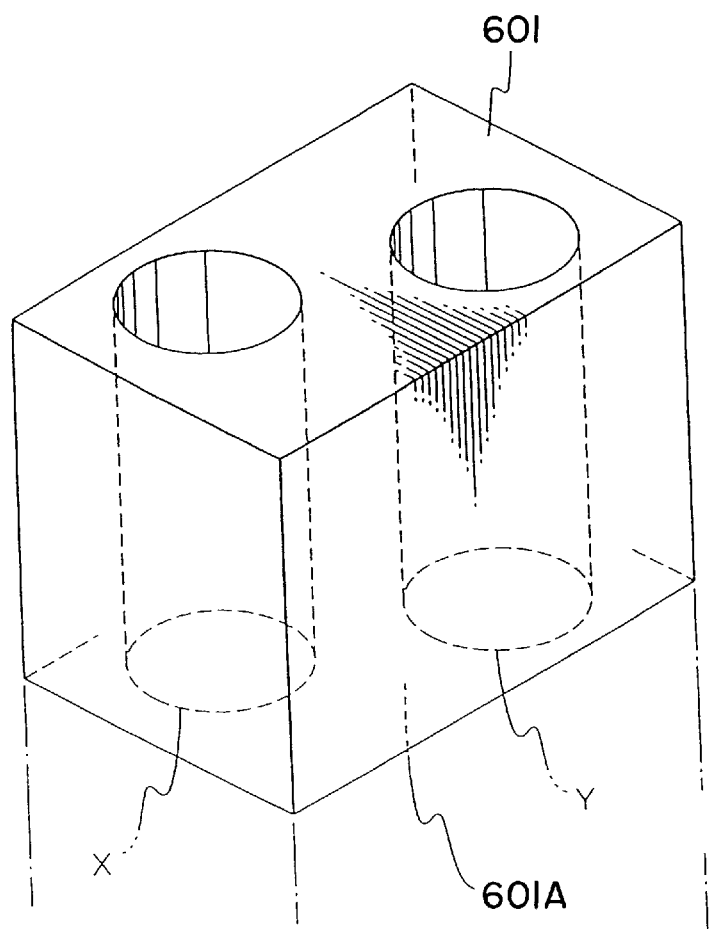
FIGS. 48(A) and 48(B) are perspective views illustrating the concrete shape of the bonding member shown in FIG. 47.
Figure 48B:
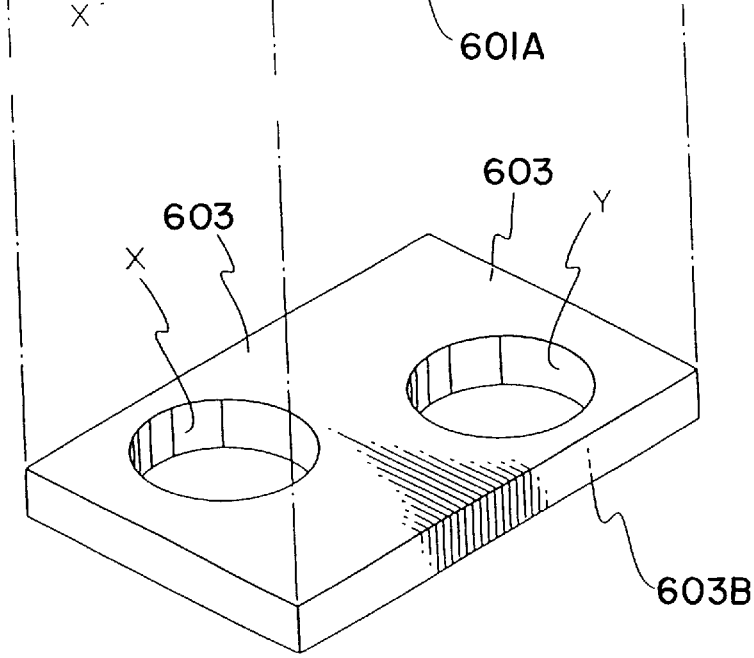

In the interior of each of the bonding members 601 and 603, there are formed a plurality of channels X and Y for passage of a liquid x and a liquid y as shown in FIG. 48. Upon bonding these bonding members 601 and 603, the following requirements should be met. It is necessary not only to ensure a sufficient bonding strength for both the bonding members 601 and 603, but also to keep a perfect air-tightness for the channels X and Y even after bonding. More specifically, the liquid x and the liquid y should not mutually be mixed up, and these liquids x and y should not leak outside.

Zinc alloy soldering layers are previously formed on the bonding surfaces 601a and 603a of the bonding members 601 and 603. These zinc alloy soldering layers are formed by heating the bonding members 601 and 603 to an appropriate temperature, immersing the same in a molten zinc alloy soldering bath, applying ultrasonic vibration through a vibration plate, and coating a zinc alloy soldering layer onto each of the bonding surfaces.

Figure 49:
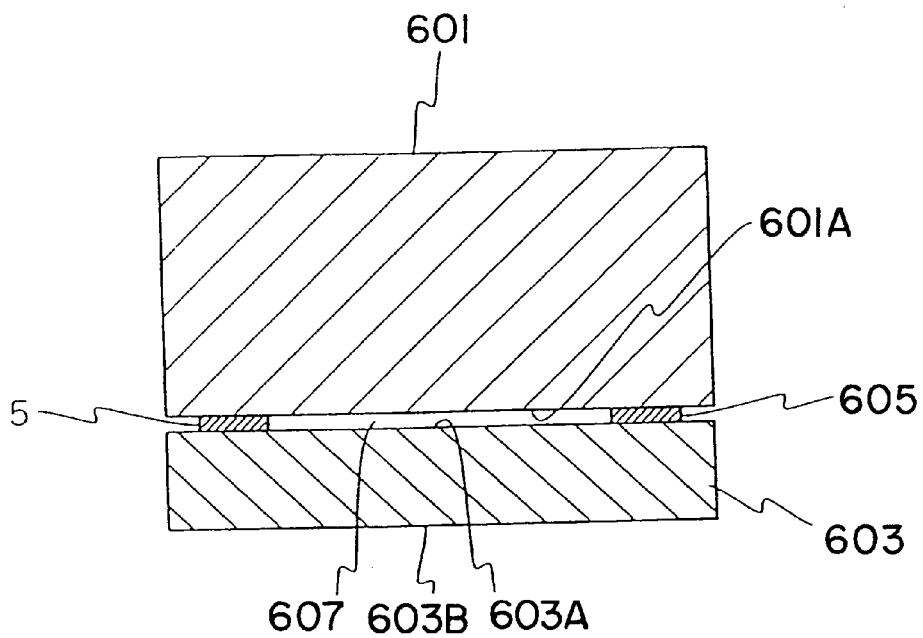
FIG. 49 is a sectional view illustrating the state of formation of a gap between the first bonding member and the second bonding member by placing a space therebetween.

As shown in FIG. 49, a prescribed space 605 is provided between the bonding members 601 and 603. This spacer 605 serves to provide a prescribed gap portion 607 between the bonding surfaces 601a and 603a of the bonding members 601 and 603, and a plurality of such spacers are arranged at a plurality of positions of the bonding surfaces 601a and 603a. There is no particular limitation on the shape of the spacer 605: any one having a thickness corresponding to a desired interval of the gap portion 607 may be used. The material for the spacer 605 may be aluminum, or may also be iron surface-treated with Zn plating or Cu plating.

Figure 50:
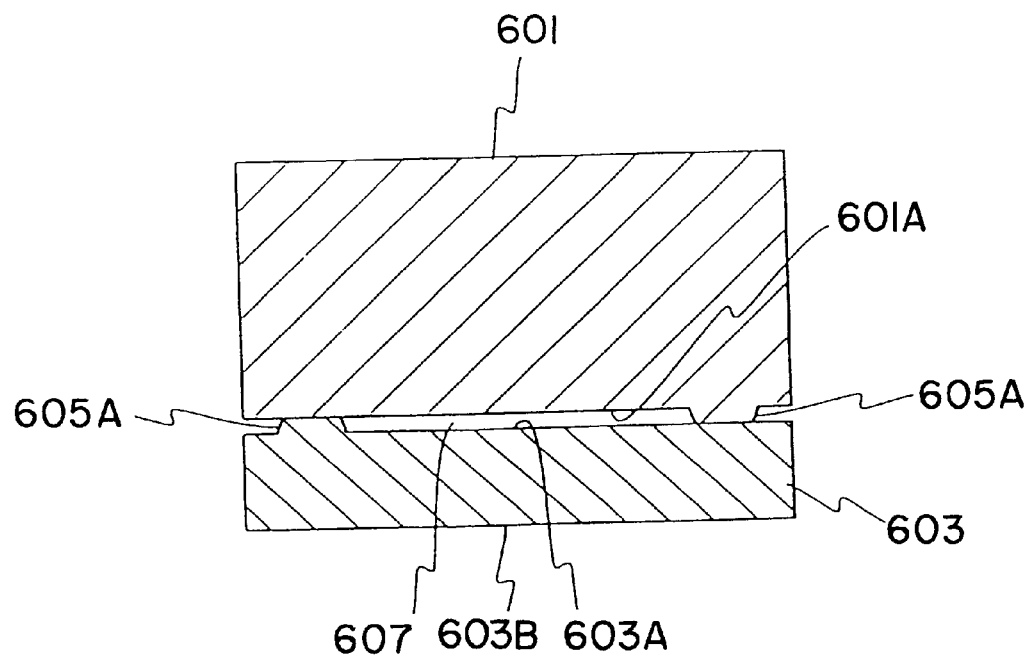
FIG. 50 is a sectional view illustrating the state of forming a gap between the first bonding member and the second bonding member by providing a recesses therein.

The method for forming the bonding surfaces 601a and 603a is not limited to the above-mentioned one using spacers 605. As shown in FIG. 50, prescribed projections 605a may previously be provided on the bonding surfaces 601a and 603a of the bonding members 601 and 603. The projections 605a shown in FIG. 50 represent a case where a projection 605a is provided on each of the first bonding member 601 and the second bonding member 603. The present invention is not however limited to this. For example, a projection 605a may be provided only on the first bonding member 601 side, or conversely, a projection 605a may be provided only on the second bonding member 603 side.

The interval of the gap portion 607 formed by the spacers 605 and 605a is set within a range of from about 0.2 to 1.5 mm. For example, with an interval of the gap portion 607 of under 0.2 mm, the above-mentioned spacer 605 or the projection 605a is melted into the molten zinc alloy soldering bath during the filling operation of molten zinc alloy solder described later, or it is difficult for molten zinc alloy solder to penetrate into a tight gap, thus resulting in impossibility to ensure a sufficient bonding strength. An interval of the gap portion 607 of over 1.5 mm, on the other hand, tends to cause a phenomenon that, after application of ultrasonic vibration and drawup from the molten zinc alloy soldering bath, zinc alloy solder charged in the gap portion 607 flows out under the effect of surface tension.

Figure 51:
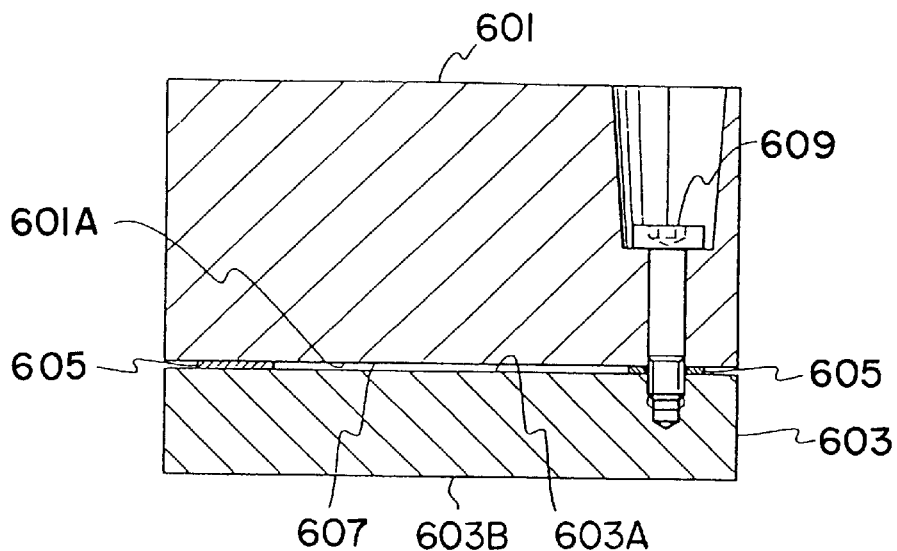
FIG. 51 is a sectional view illustrating the state of the first bonding member and the second bonding member fixed with bolt members.
Figure 52:
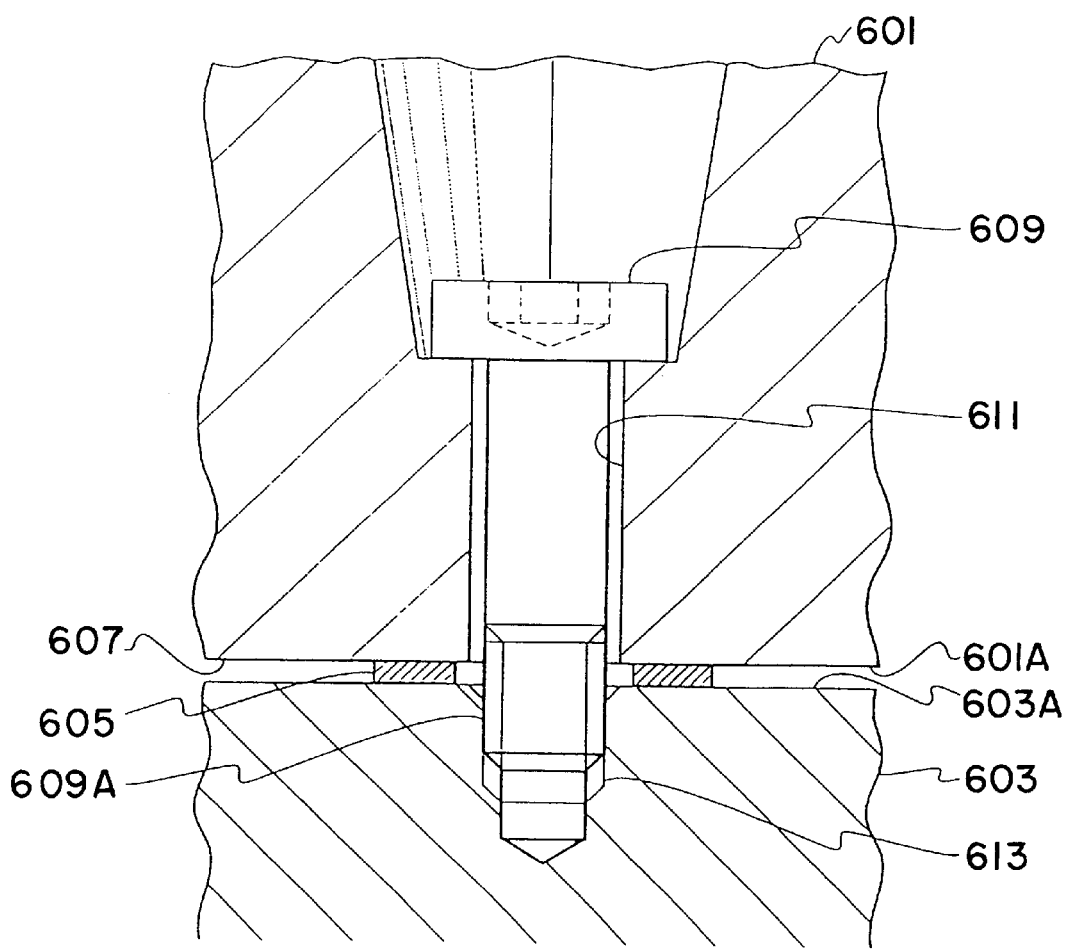
FIG. 52 is an enlarged sectional view illustrating the fixing structure of the bonding members by means of the bolt members shown in FIG. 51.
Figure 53A:
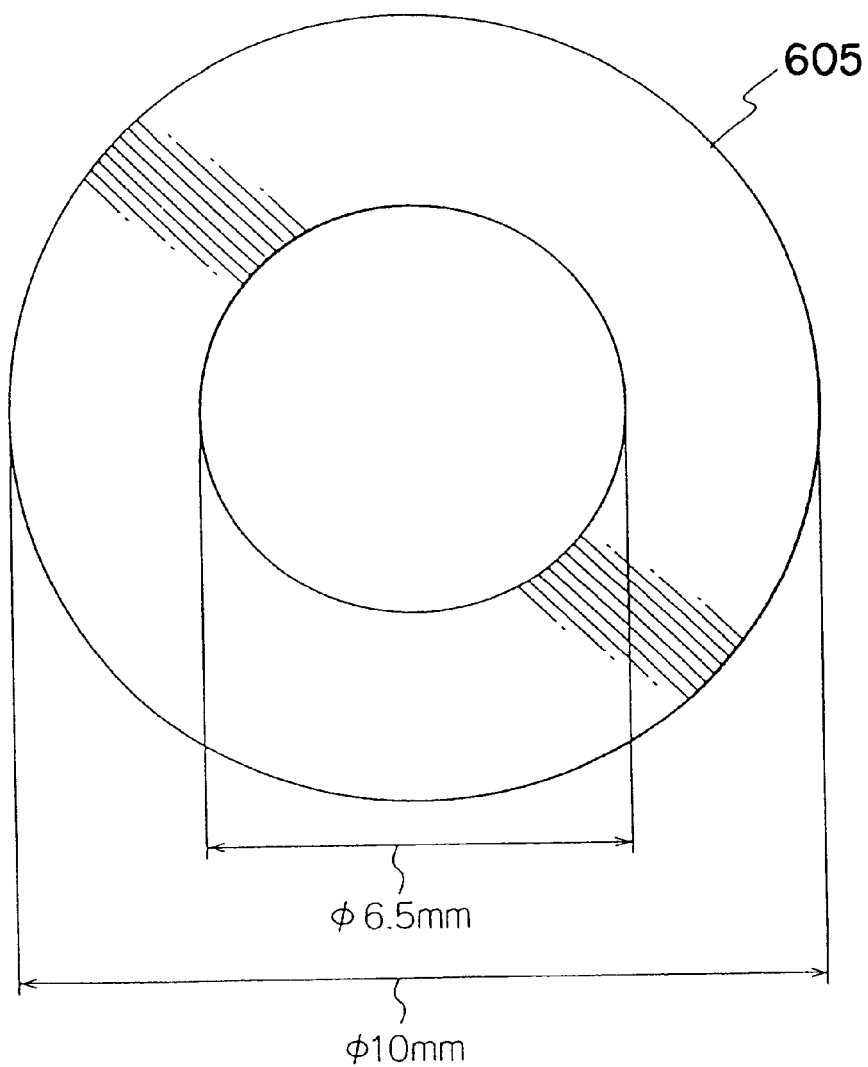
FIGS. 53(A) and 53(B) are views illustrating the spacer used for forming the gap.
Figure 53B:
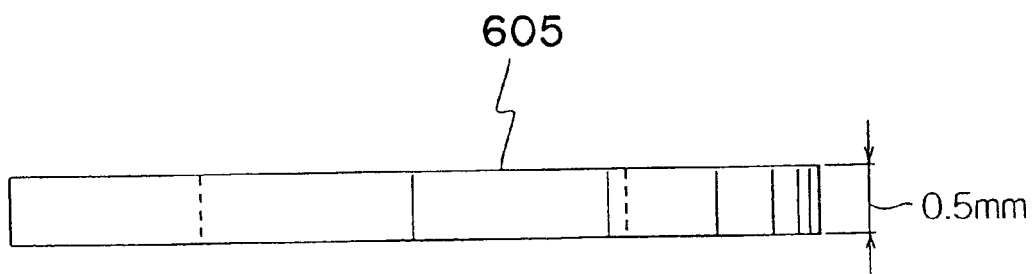
Figure 54:
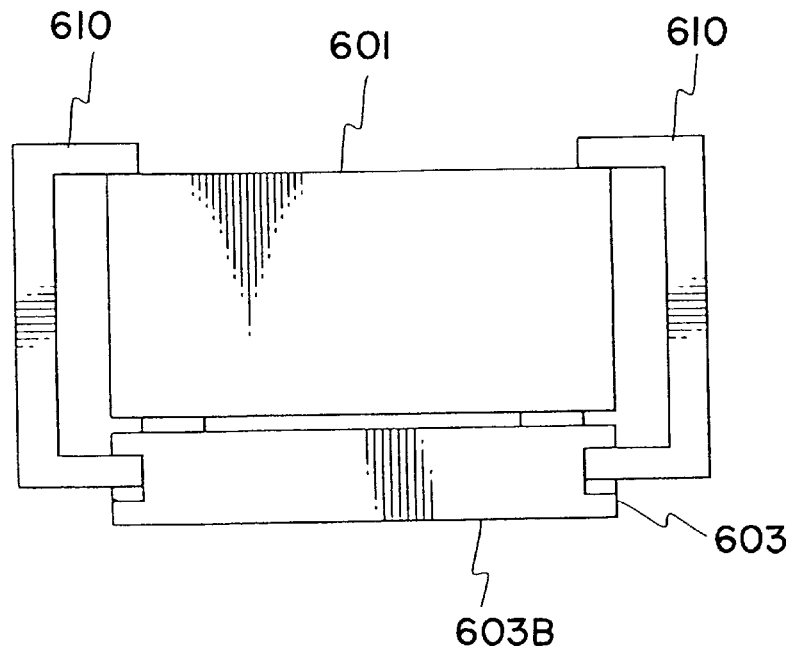
FIG. 54 is a front view illustrating the state of the bonding members fixed together with clamping jigs.

After the prescribed gap portion 607 has been formed and the bonding surfaces 601a and 603a have been brought into butt contact, as shown in FIG. 51, the bonding members 601 and 603 are mutually fixed with prescribed bolt members 609 as means for fixing. More specifically, as shown in FIG. 52, a pass hole 611 having an inside diameter larger than the outer shape of the bolt member 609 is formed on the first bonding member 601 side, and on the second bonding member 603 side, a female screw portion 613 for fixing a screw portion 609a of the bolt member 609 is formed. The spacer 605 has a shape of doughnut as shown in FIG. 53. The fixing means of the bonding members 601 and 603 is not limited to the bolt member 609 as described above. For example, a π-shaped jig 610 as shown in FIG. 54 may be used.

Now, the process of actually bonding the first bonding member 601 and the second bonding member 603 mutually fixed as described above will be described. First, the bonding members 601 and 603 formed integrally as shown in FIG. 51 or 54 are heated to a prescribed temperature. At this point, heating is carried out by charging the bonding members 601 and 603 into an electric furnace (not shown). For heating, however, a gas burner may also be used.

Figure 55:
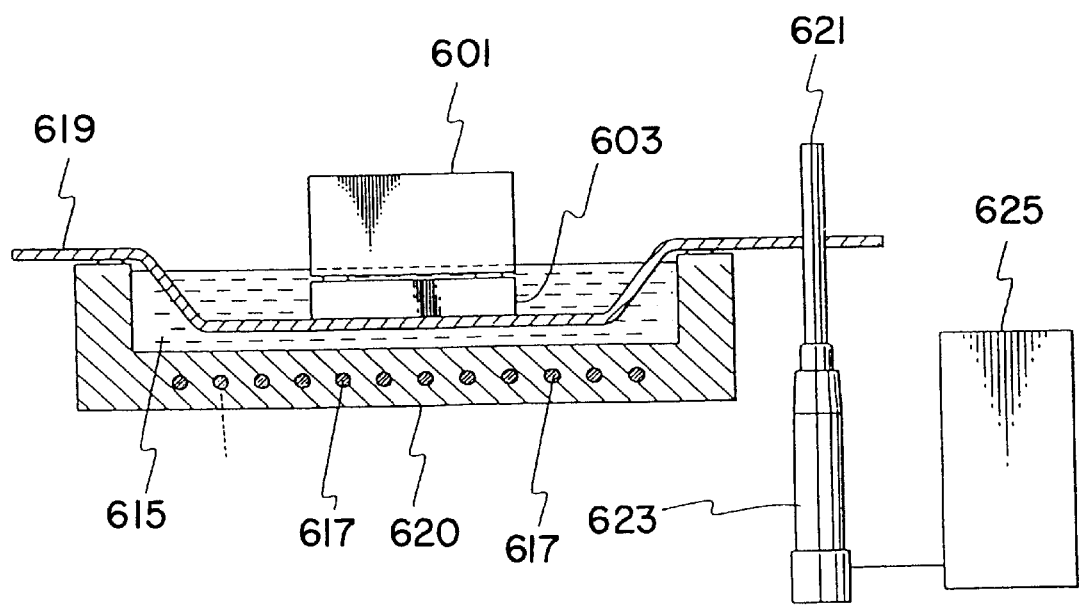
FIG. 55 is a sectional view illustrating the state of filling the gap with molten zinc alloy solder.

After heating the bonding members 601 and 603, as shown in FIG. 55, the bonding members 601 and 603 are placed in the molten zinc alloy soldering bath 615, and the above-mentioned gap portion is immersed in molten zinc alloy solder. In this state, ultrasonic vibration is applied to the proximity of the gap portion 607. As a result of this operation, the thickness of the zinc alloy soldering layers of the bonding surfaces 601a and 603a increases, and at the same time, the gap portion 607 is completely filled with molten zinc alloy solder. An outline of the apparatus for applying ultrasonic vibration is as follows. As shown in FIG. 55, a soldering tank 620 having a built-in heater 617 is filled with molten zinc alloy solder. A prescribed vibration plate 619 is arranged in the molten zinc alloy soldering bath 615, and an ultrasonic horn 621 is engaged with this vibration plate 619. A vibrator 623 is bonded to the ultrasonic horn 621, and generates ultrasonic vibration on the basis of a signal from an oscillator 625.

Then, after the gap portion 607 is filled with zinc alloy solder, the bonding members 601 and 603 are slowly drawn up from the molten zinc alloy soldering bath 615. Drops of zinc alloy solder are removed as required. At this point, it is necessary to slowly handle the bonding members 601 and 603 so as not to cause zinc alloy solder in the gap portion 607 to flow out.

Figure 56:
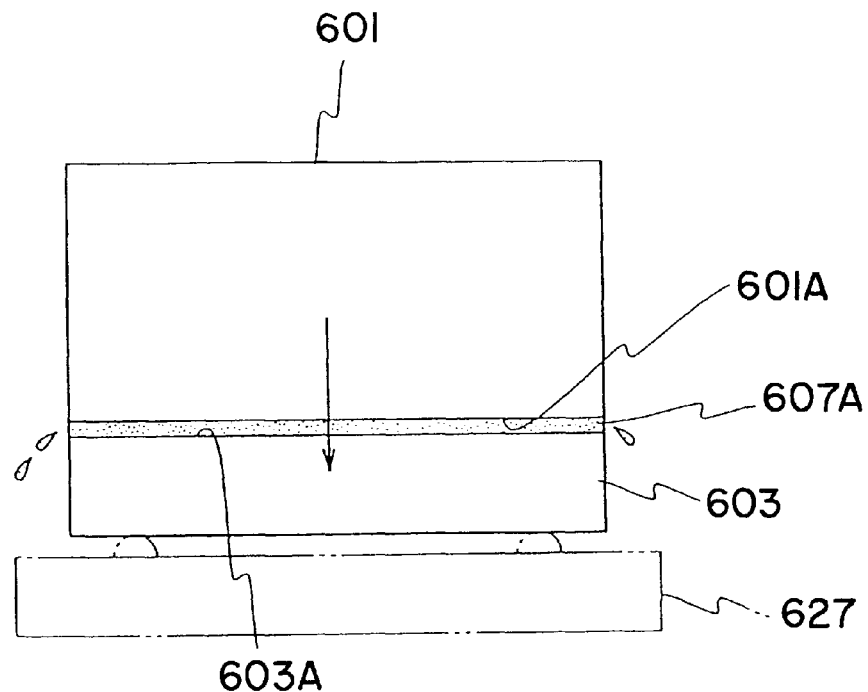
FIG. 56 is a front view illustrating the state of discharging zinc alloy solder in excess after filling the gas with the zinc alloy solder.
Figure 57:
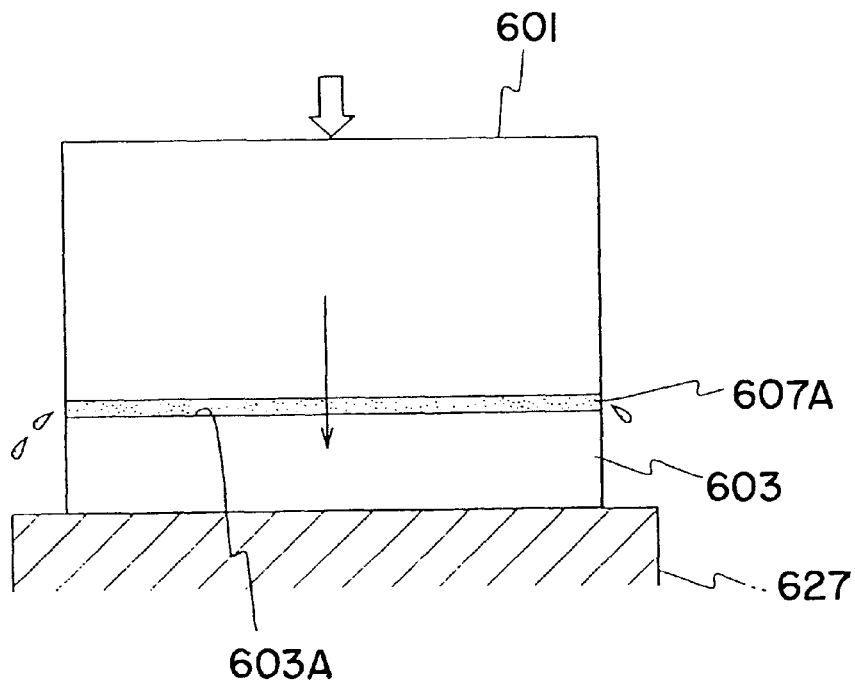
FIG. 57 is a front view illustrating the state of applying a pressing force to discharge the zinc alloy solder in excess.

Before solidification of the molten zinc alloy solder, the bonding members 601 and 603 are placed on a prescribed stand 627 as shown in FIG. 56, in such a manner that the first bonding member 601 is located upon the second bonding member 603. The reason is as follows. The weight of the first bonding member 601 acts on the bonding surfaces 601a and 603a. As a result, an excess portion of the zinc alloy solder filling the gap portion 607 is discharged outside. The bonding surfaces 601a and 603a are therefore uniformly pressed, thus forming a bonding layer 607a having a uniform thickness. When the weight of the first bonding member 601 is insufficient to ensure a necessary load, a prescribed pressure may be applied from above the first bonding member 601 as shown in FIG. 57.

Figure 58:
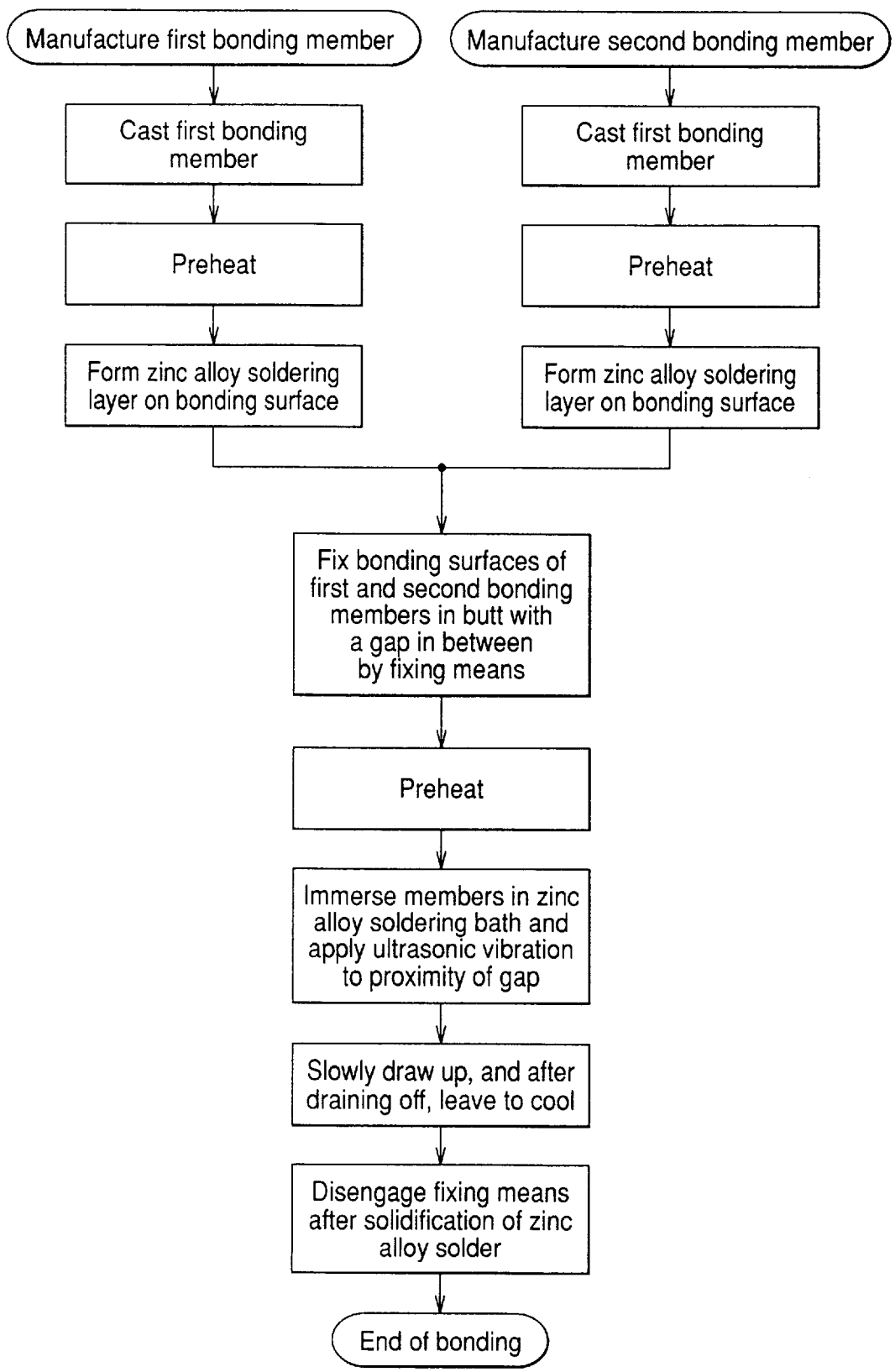
FIG. 58 is a descriptive view illustrating the bonding step of the bonding method of bonding members in the fifth embodiment.

Finally, after solidification of the zinc alloy solder, the bolt member (not shown) serving as the fixing means is removed, completing the bonding operations. FIG. 58 is a process diagram illustrating the bonding process as described above.

Figure 59:
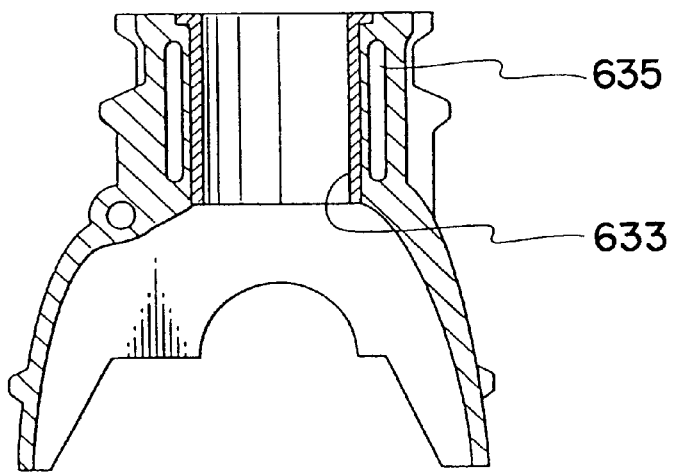
FIG. 59 is a view illustrating a general dry liner type closed deck cylinder block.
Figure 60:
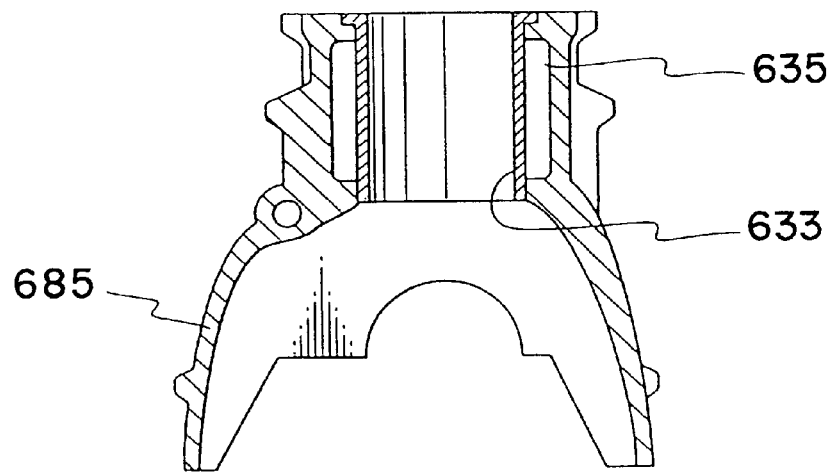
FIG. 60 is a view illustrating a general wet liner type closed deck cylinder bock.

The method for manufacturing a cylinder block for an internal combustion engine using the foregoing bonding method of bonding members will now be described below in detail. First, general forms of cylinder block include those shown in FIGS. 59 and 60. FIG. 59 illustrates a dry liner type cylinder block 631, in which a cylinder liner 633 is not in contact with a cooling water channel 635. On the other hand, FIG. 60 represents one called the wet liner type, in which the outer periphery of a cylinder liner 633 serves as part of a cooling water channel 635. The present invention is applicable for the manufacture of these cylinder blocks 631 and 632.

Figure 61:
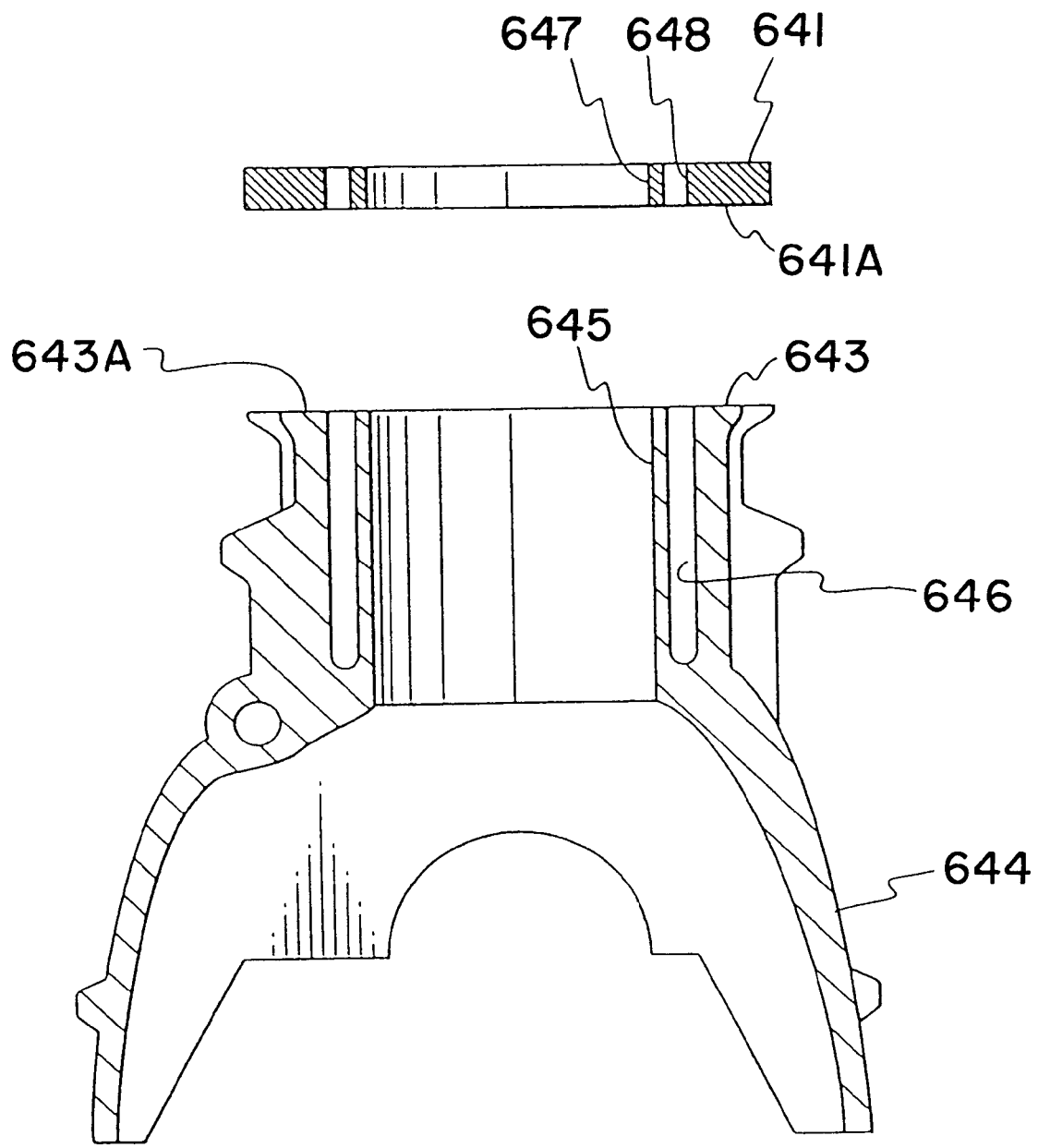
FIG. 61 is a sectional view illustrating the state before bonding of the deck member and the cylinder block body in the fifth embodiment.

As shown in FIG. 61, there are used a deck member 641 supporting a cylinder liner (not shown), and a cylinder block body 643, having a crank journal section 644 and a cylinder section 645, in which a water jacket (cooling water channel) 646 is in the form of an open deck, these components being individually aluminum-die-cast. Referring to FIG. 59 showing the finished state, the position for dividing these components is within the range from the upper end to the lower end of the water jacket 635 to be formed.

Figure 62A:
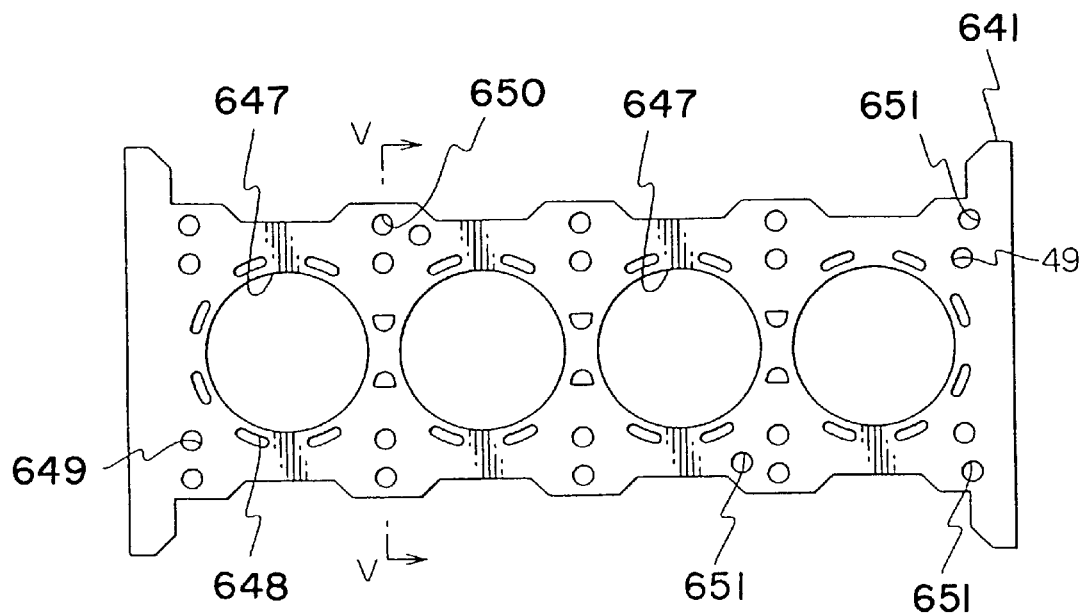
FIGS. 62(A) and 62(B) are plan views illustrating the members shown in FIG. 61.
Figure 62B:
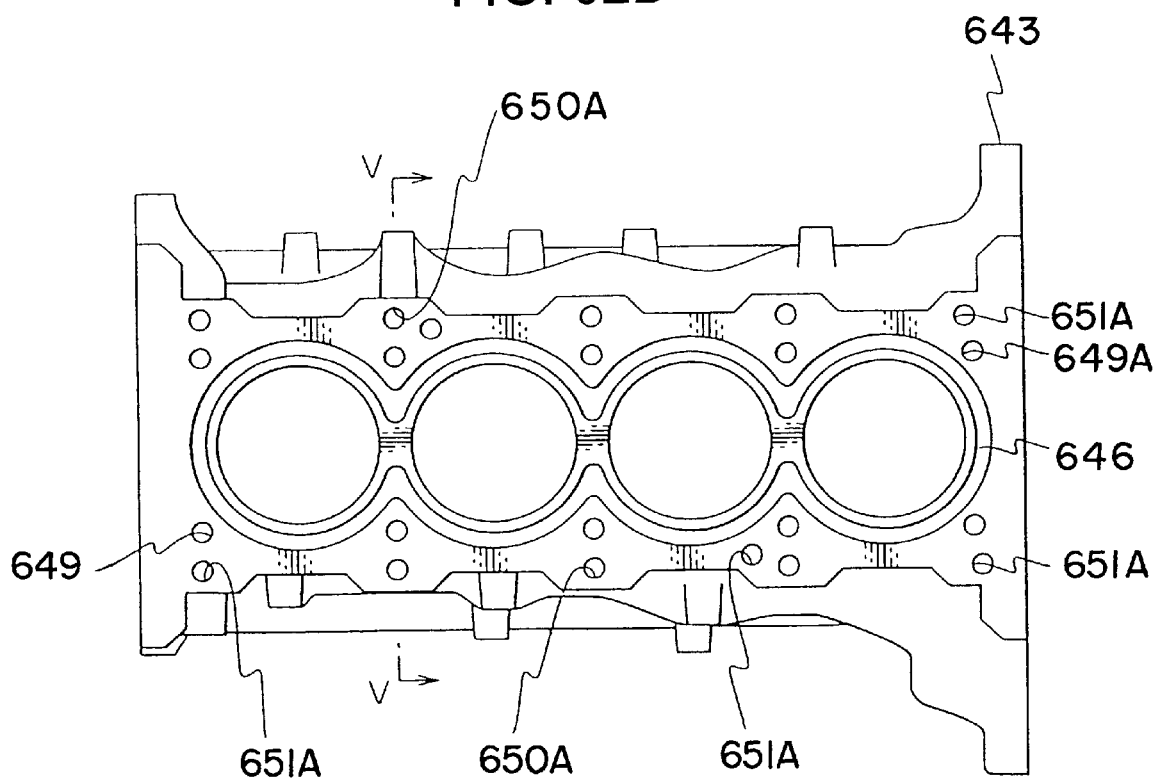

The deck member 641 is provided, as shown in FIG. 62, with a cylinder bore 647 corresponding to the cylinder block body 643, a cooling water communicating hole 648 to the cylinder head (not shown), a stud bolt hole 649 for connecting the cylinder head to the cylinder block body 643 and an oil removing hole 650, which are hole-cast along with aluminum die casting. A pass hole 651 for insertion of the bolt member for fixing the deck member 641 and the cylinder block body 643 is also provided. Particularly, at least two such pass holes 651 are provided to ensure accurate positioning of these members.

The cylinder block body 643 is also manufactured by die casting as described above. Because the water jacket 646 is of the open deck type, the cylinder block body 643 can be easily hole-cast after casting. Similarly to the foregoing deck member 641, a stud bolt hole 649a, an oil removing hole 650, and a screw hole 651a corresponding to the above-mentioned pass hole 651 are formed in the cylinder block body 643.

After casting, bonding surfaces 641a and 643a (see FIG. 61) are first worked out by milling on these deck member 641 and the cylinder block body 643. This is to appropriately coat the bonding surfaces 641a and 643a with zinc alloy solder during the subsequent soldering process by the application of ultrasonic vibration.

Figure 63:
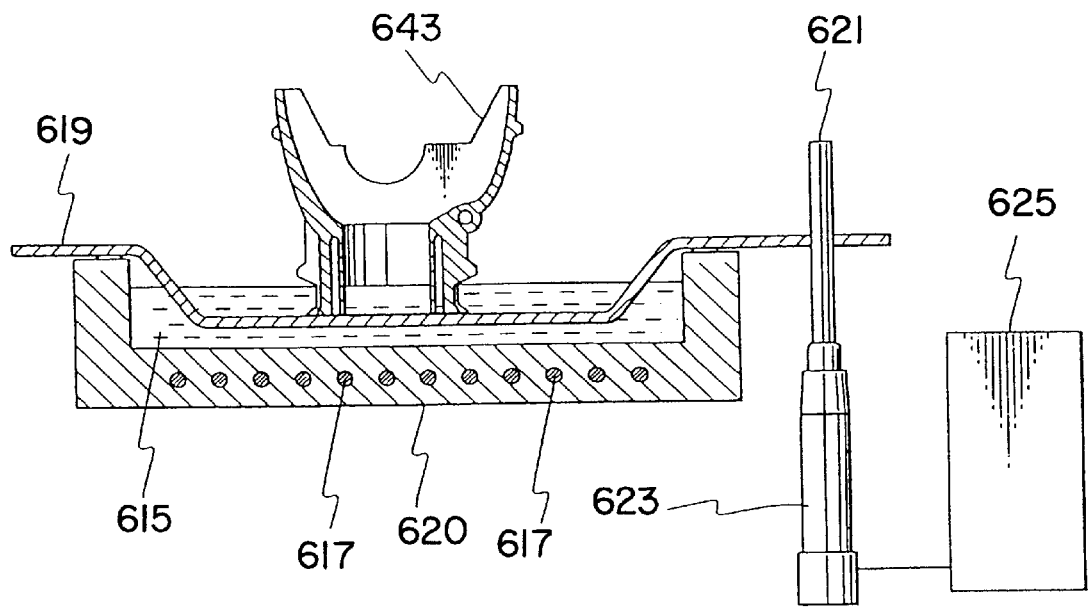
FIG. 63 is a sectional view illustrating the state of coating the zinc alloy soldering layer on the bonding surface of the cylinder block body.

Then, the milled bonding surfaces 641a and 643a of the deck member 641 and the cylinder block body 643 as the bonding members are placed in a direction counter to a vibration plate 619 of the ultrasonic soldering apparatus, as shown in FIG. 63. In this state, ultrasonic vibration is applied through the vibration plate 619 to the cylinder block body 643, and a zinc alloy solder having a low melting point is applied to the bonding surface 643a. Set conditions for soldering using ultrasonic vibration include an oscillation frequency of about 20 kHz, an oscillator output within a range of from 250 to 500 W, a preheating temperature of the bonding members of 370° C. by furnace heating, and an application time of ultrasonic vibration within a range of from 6 to 10 seconds. A zinc alloy solder having a melting point of under 390° C. is used. A solder having a melting point of over 390° C. causes blisters in die castings.

Screw threading is applied to the post-cast hole of the cylinder block body 643 from among the deck member 641 and the cylinder block body 643 provided with the zinc alloy soldering layers as described above. This is to fix the bolt member 609 as illustrated in detail in FIG. 52. On the other hand, the post-cast hole on the deck member 641 side is left in the state of the pass hole 651 as described above. Screw-threading one member and leaving the other as the pass hole 651 make it possible to uniformly spread the zinc alloy solder in the gap portion by means of the freed deck member 641 upon filling the gap portion with the zinc alloy solder in a subsequent process.

Figure 64:
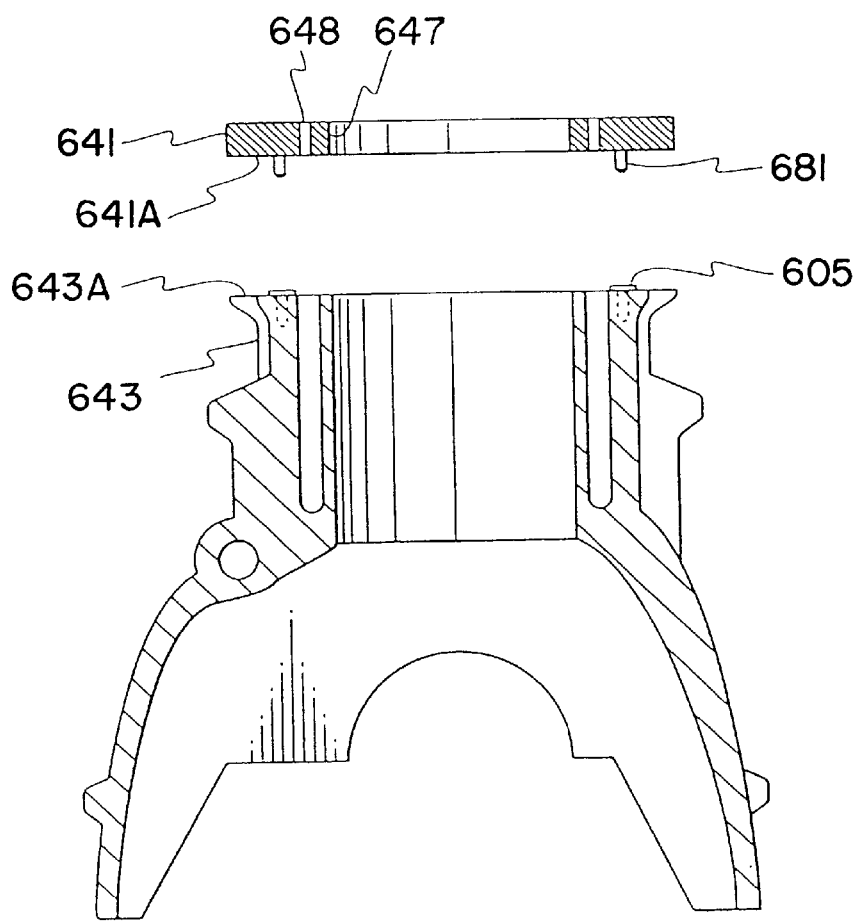
FIG. 64 is a sectional view illustrating the state of bringing the deck member through the spacer into contact with the cylinder block body.
Figure 65:
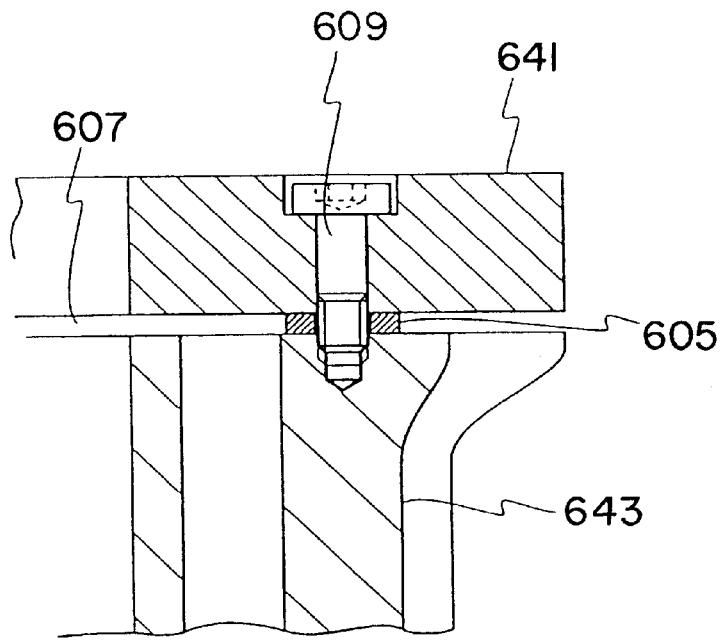
FIG. 65 is an enlarged sectional view illustrating the proximity of the bolt member.

Then, the bonding surfaces 641*a* and 643*a* of the deck member 641 and the cylinder block body 643 are brought into butt contact through doughnut-shaped spaces 605 (see FIG. 53) as shown in FIG. 64. The spacer 605 is made of an aluminum alloy sheet. Upon positioning the deck member 641 and the cylinder block body 643, accurate positioning is ensured by using a pin member 681 or the like. As shown in FIG. 65, a bolt member 609 is inserted through a hole formed at the center of this spacer 605, thereby fixing the deck member 641 and the cylinder block body 643. The surface of the bolt member 609 is previously coated with a prescribed ceramic powder for preventing burn-on or adhesion of zinc alloy solder. Unnecessary adhesion of zinc alloy solder is prevented by filling a hexagonal hole formed at the top of the bolt member 609 with silica heat-insulating wool.

Figure 66:
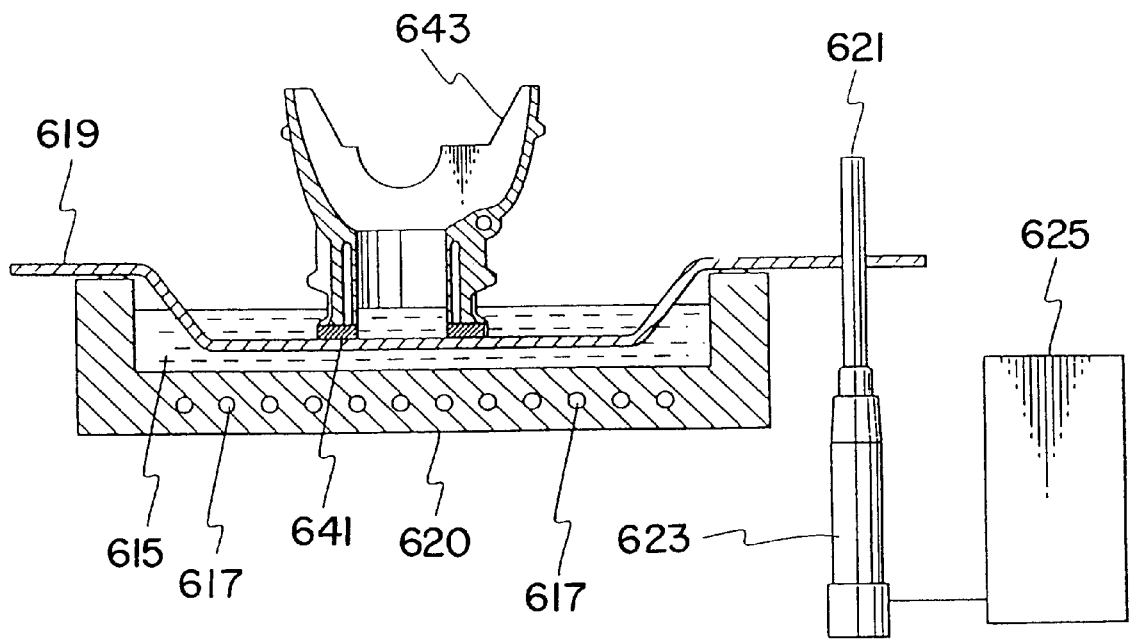
FIG. 66 is a sectional view illustrating the state of filling the gap formed between the deck member and the cylinder block body with molten zinc alloy solder.

Subsequently, the deck member 641 and the cylinder block body 643 are heated again to about 370° C. in a heating furnace (not shown) in the state in which the members are integrally fixed. When temperature of the bonding members reaches a prescribed level, a gap portion 607 formed between the bonding surfaces is immersed in a molten zinc alloy soldering bath 615 as shown in FIG. 66, and ultrasonic vibration is applied by placing the surface opposite to the bonding surface of the deck member 641 onto the vibration plate 619. Conditions for application of ultrasonic vibration are substantially the same as those upon forming the above-mentioned soldering layer.

As a result of the foregoing operations, the thickness of the zinc alloy soldering layer formed on the bonding surface increases, and the entire gap portion is sufficiently filled with molten zinc alloy solder. Thereafter, the cylinder block body 643 and the deck member 641 are slowly drawn up from the molten zinc alloy soldering bath 615, and after removing drops of zinc alloy solder, placed on a prescribed flat stand so that the deck member 641 forms the bottom. The weight of the cylinder block body 643 therefore acts on the bonding surface to cause excessive zinc alloy solder remaining in the gap portion flows out, thus making it possible to obtain a bonding layer having a uniform thickness as a whole.

Figure 67:
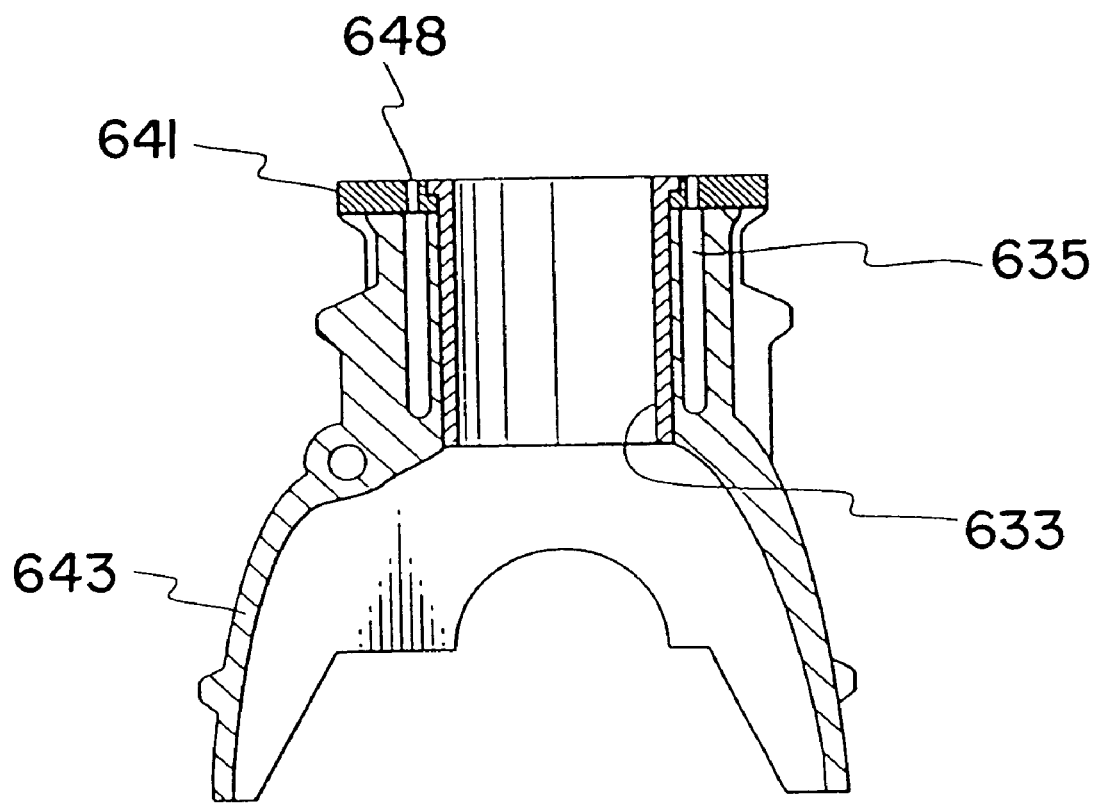
FIG. 67 is a sectional view illustrating the cylinder block after the completion of bonding.

After bonding, the cylinder block body 643 and the deck member 641 are cooled to a prescribed temperature to cause the zinc alloy solder to solidify. Thereafter, the bolt member is removed, a conventional machining such as cutting of the inner peripheral wall of the cylinder bore is applied, and the cylinder liner 633 is pressure-inserted, thereby completing a closed deck type cylinder block 641 made of die-cast aluminum as shown in FIG. 67.

Figure 68A:
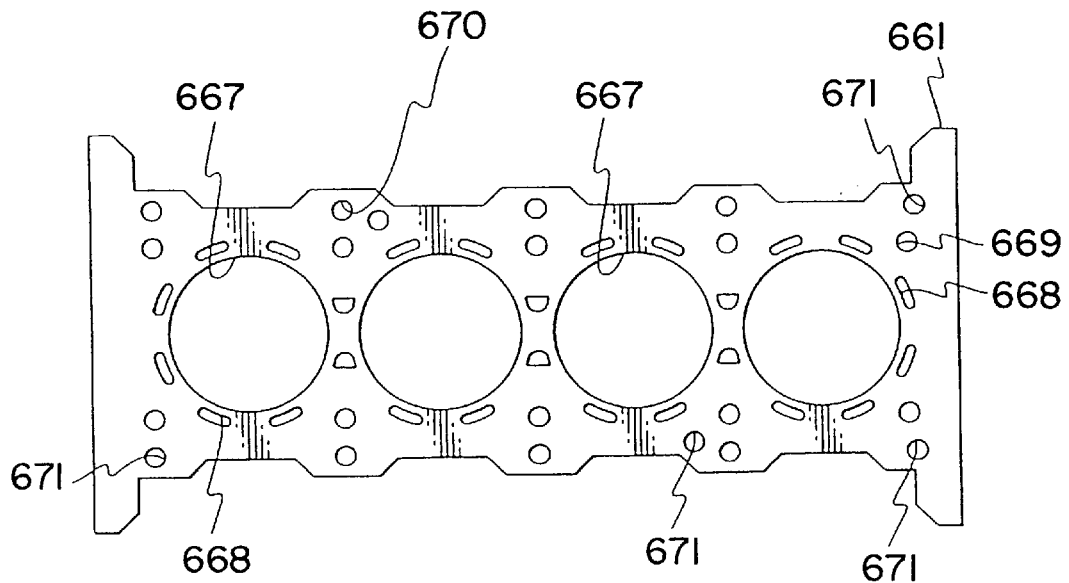
FIGS. 68(A) and 68(B) are plan view illustrating another variation of the fifth embodiment.
Figure 68B:
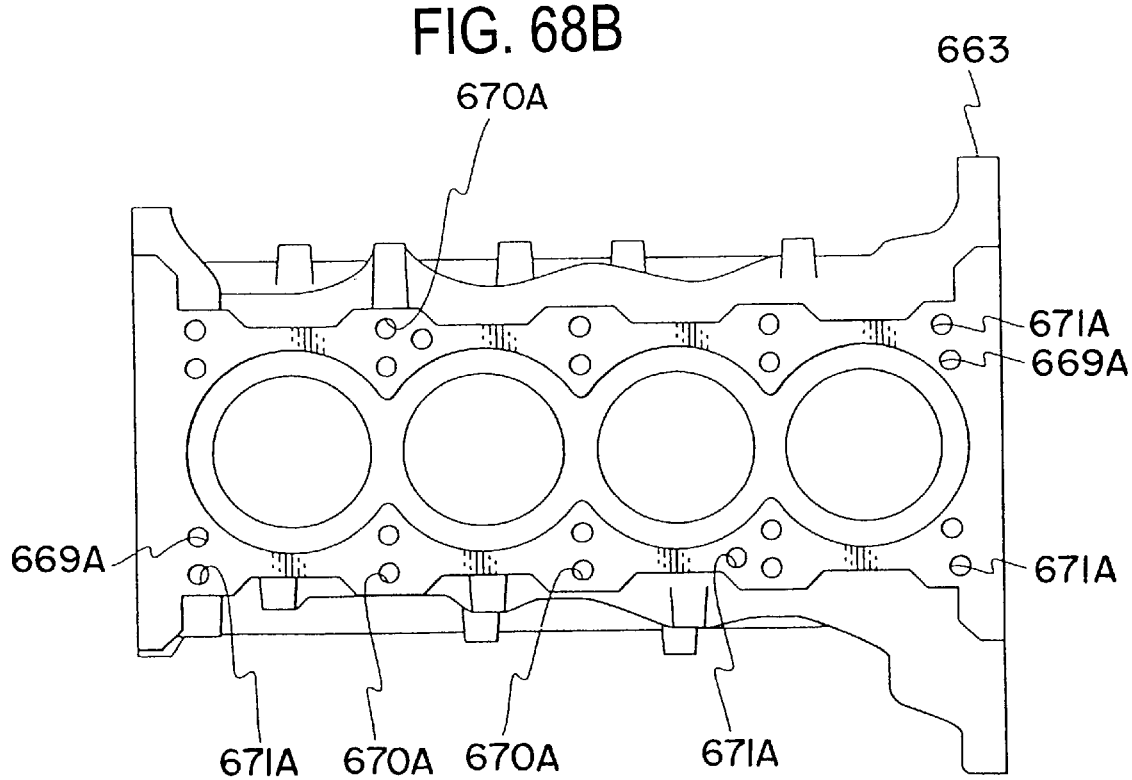

As a variation of this embodiment, the present invention is applied by way of trial to the manufacture of a wet liner type closed deck cylinder block. In this variation of embodiment, as shown in FIG. 68, a deck member 661 supporting a cylinder liner (not shown) and a cylinder block body 663 are individually aluminum-die-cast. The dividing position of the cylinder block body 663 and the deck member 661 is set within a range from the upper end to the lower end of a water jacket of the cylinder block shown in FIG. 60 illustrating a finished product.

As in the case of the foregoing dry liner type, a cylinder bore 667 corresponding to the cylinder block body 663, a cooling water communicating hole 668 to the cylinder head (not shown), a stud bolt hole 669 for connecting the cylinder head to the cylinder block body 663, and an oil removing hole are provided by hole-casting in the deck member 661 during aluminum die casting. The deck member 661 is provided also with a pass hole 671 for the insertion of a bolt member for fixing the deck member 661 and the cylinder block body 663. Particularly, at least two such pass holes 671 are provided to ensure accurate positioning of these members.

The cylinder block body 663 is also manufactured by aluminum die casting as described above. Similarly to the foregoing deck member 661, a stud bolt hole 669*a*, an oil removing hole 670*a*, and a screw hole 671*a* for connection of the bolt member are formed in the cylinder blck body 663.

Figure 69:
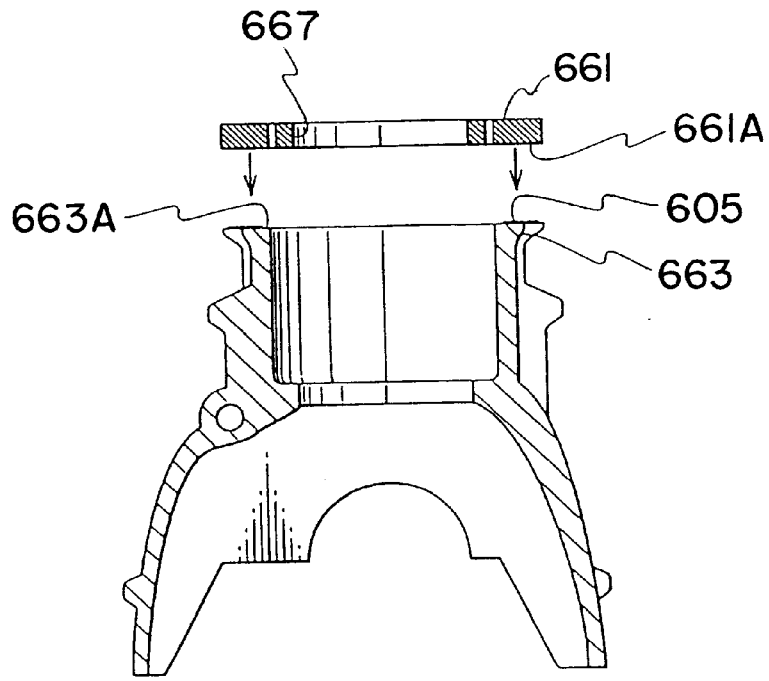
FIG. 69 is a descriptive view illustrating the state of bringing the deck member shown in FIG. 68 into contact with the cylinder block body.

After casting, the deck member 661 and the cylinder block body 663 are subjected to milling, low-melting-point zinc alloy solder is applied to thus milled bonding surfaces 661*a* and 663*a*. Then, as shown in FIG. 69, the bonding surfaces 661*a* and 663*a* of the deck member 661 and the cylinder block body 663 are brought through spacers 607 into butt contact with each other. A gap portion formed between the bonding surfaces 661*a* and 663*a* is immersed in a molten zinc alloy soldering bath.

Figure 70:
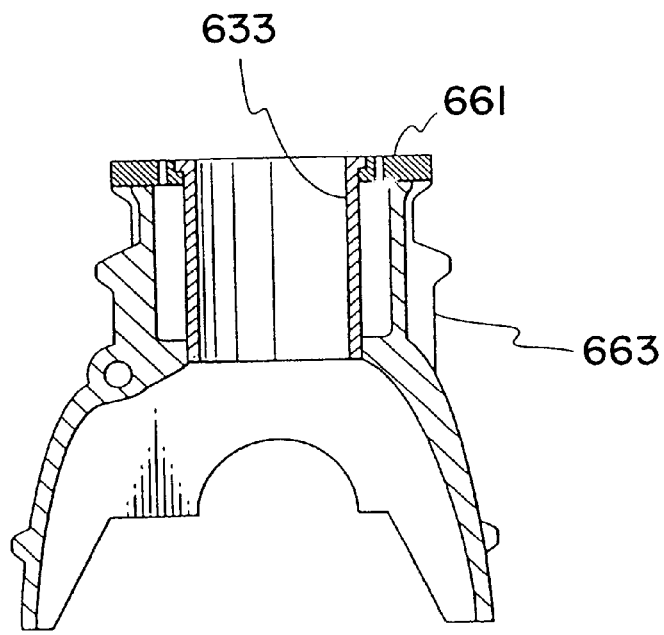
FIG. 70 is a sectional view illustrating the cylinder block after the completion of bonding.
Figure 7:
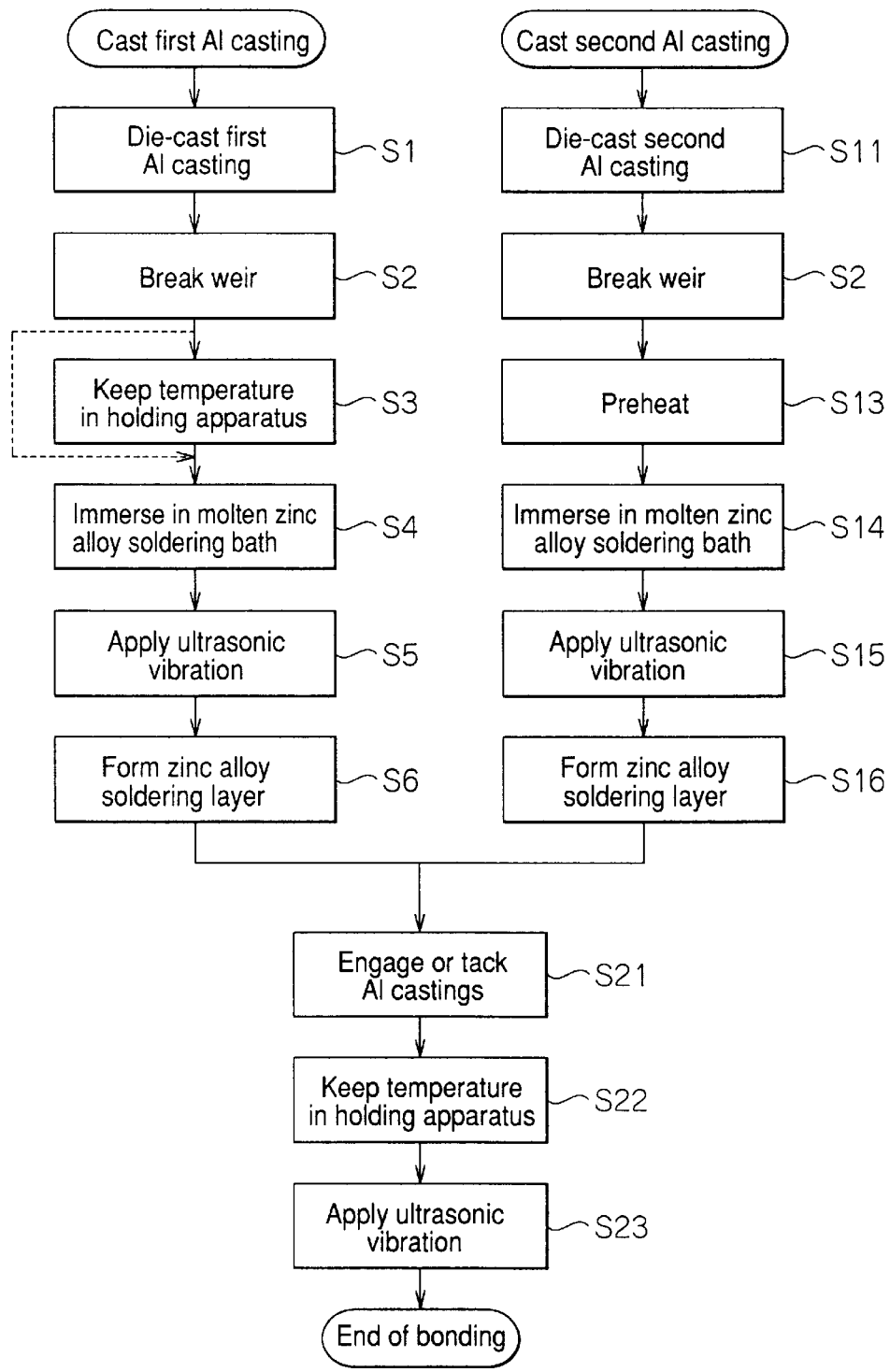

Finally, a closed deck type wet liner cylinder block made by aluminum die casting as shown in FIG. 70 is completed by applying conventional machining such as cutting of the inner peripheral wall of the cylinder bore 667, and pressure-inserting the cylinder liner 633.

In the present invention, a gap portion is provided between bonding surfaces, and the bonding surfaces are bonded by filling this gap portion with a molten zinc alloy solder while applying ultrasonic vibration . This provides an excellent effect of permitting formation of a bonding layer having a uniform thickness over the entire bonding surfaces. Consequently, even when channels for the flow of a liquid or the like are provided on the bonding members, it is possible to ensure sufficient pressure resistance and airtightness of the channels after bonding.

After the bonding members are brought into butt contact, in the present invention, a special ultrasonic bonding apparatus for bonding is not required. There is therefore available an excellent effect of permitting cutting of the equipment cost, and improving manufacturing efficiency in terms of the period of time as a result of simplification of the operating process.

In the present invention, the gap portion is provided by the use of a simple-shaped spacer or projections directly formed on the bonding members. This gives an excellent effect of permitting formation of a desired gap portion without the necessity of a special complicated equipment or members.

In the present invention, furthermore, the interval of the gap portion is set within a range of from 0.2 to 1.5 mm. This permits certain prevention of melting of the spacers or the projections resulting from a tight interval, and certain filling of the gap portion with the zinc alloy solder. Setting of the gap portion interval to under 1.5 mm, on the other hand, ensures prevention of outflow of the zinc alloy solder charged in the gap portion under the effect of surface tension.

A sixth embodiment of the present invention will now be described with reference to FIGS. 71 to 77. The bonding method of aluminum members of this embodiment comprises the steps of providing, as shown in FIG. 71, a first aluminum casting formed from an aluminum material and a second aluminum casting to be bonded with this first aluminum casting; forming a zinc alloy soldering layer in a prescribed region, in a warm state after casting of the first aluminum casting while applying ultrasonic vibration to the first aluminum casting; and then, bonding the second aluminum casting to the first aluminum casting through the zinc alloy soldering layer.

Figure 72:
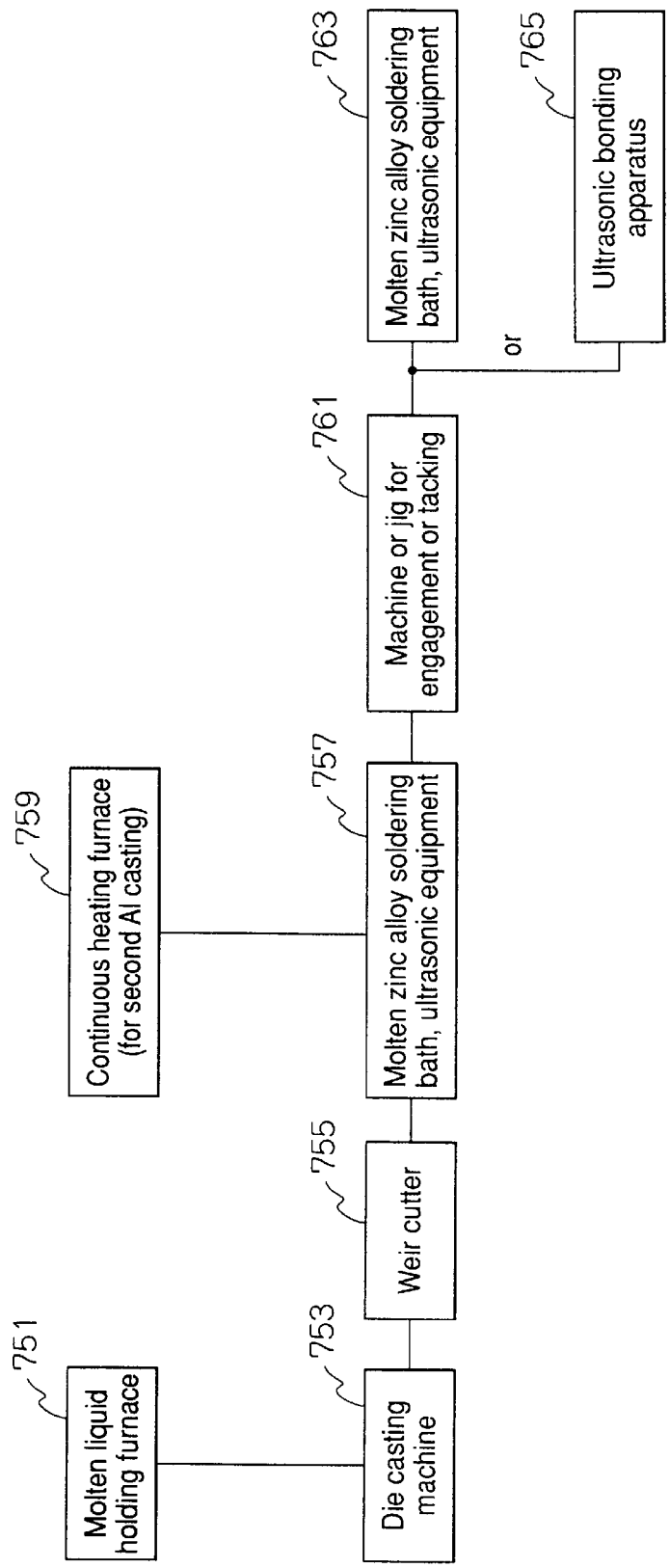
FIG. 72 is a block diagram illustrating a layout of the equipment used in the bonding method of aluminum members shown in FIG. 71.

Now, the equipment layout of a manufacturing line used for the bonding method of aluminum members of the present invention will be described below with reference to FIG. 72. First, a molten aluminum (aluminum alloy) material is kept in a melt keeping furnace 751. The aluminum material is poured into a die of a die casting machine 753 arranged adjacent to this melt keeping furnace 751. A weir breaker 755 is arranged in the downstream of the die casting machine 753, which breaks an overflow formed on an aluminum casting. In addition, a molten zinc alloy soldering bath and an ultrasonic devices 757 for forming a zinc alloy soldering layer on the aluminum casting are provided in the downstream of the weir breaker 755. A continuous heating furnace 759 for preheating the second aluminum casting to a prescribed temperature is arranged in parallel with the molten zinc alloy soldering bath. The die casting machine 753 and the weir breaker 755 for the first aluminum casting may be installed with those for the second aluminum casting.

In the downstream of the molten zinc alloy soldering bath and the like, a machine or jig 761 for engaging or tacking the second aluminum casting to the first aluminum casting is arranged. Each integrally formed aluminum casting is transferred to the molten zinc alloy soldering bath and the ultrasonic devices 763 arranged further in the downstream, for final bonding operations. The final bonding process may be carried out only with the ultrasonic bonding apparatus 765 without using the molten zinc alloy soldering bath 763 or the like.

More specifically, FIGS. 73 to 77 illustrate a case of applying the bonding method of aluminum members of the present invention to the manufacture of a cylinder block used for an internal combustion engine. First, 703 in these drawings is a cylinder block body as the first aluminum casting, 705 is a bonding member as the second aluminum casting, and 709 is a cooling water channel to be engaged with the bonding member 705. While FIGS. 73 to 77 represent a dry liner type cylinder block, the present invention is not limited to this, but is applicable also to a half-wet liner type o r a w et liner type cylinder block.

Figure 73:
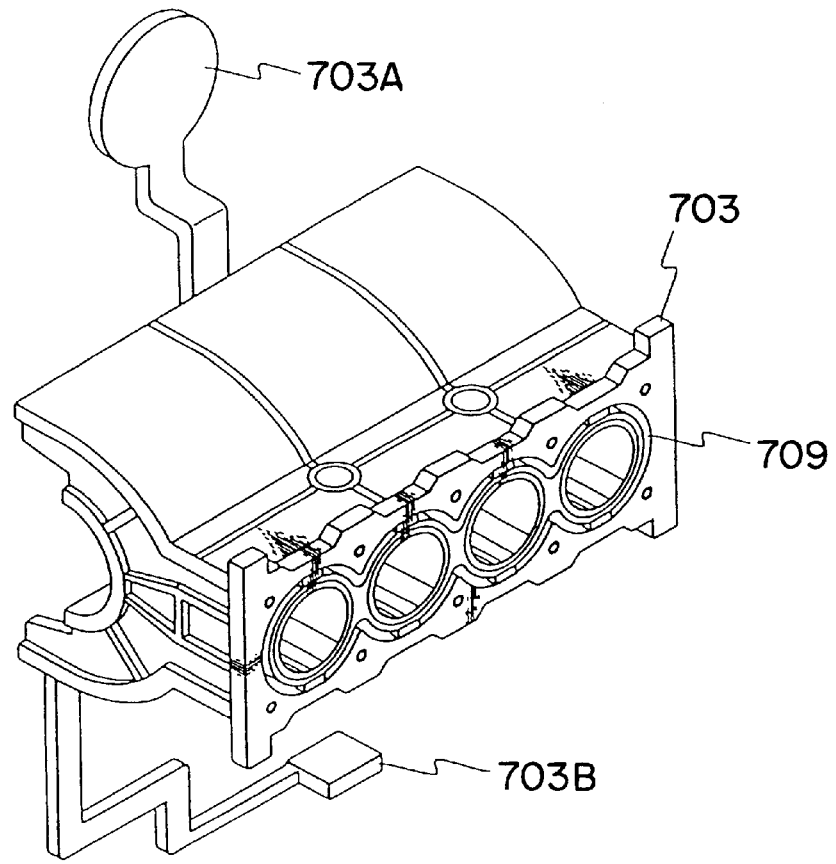
FIG. 73 is a perspective view illustrating the cylinder block body as a first aluminum casting.

The cylinder block body 703 as the first aluminum casting is made of an aluminum alloy, and the bonding member 705 as the second aluminum casting is also made of an aluminum alloy, individually formed. In this embodiment, as shown in FIG. 73, a plurality of cylinders are arranged in a row. The cylinder block body 703 is a die-cast casting. A prescribed cooling water channel 709 is formed over the entire periphery of the portion engaging with a cylinder liner (not shown) of the cylinder block body 703.

The cooling water channel 709, in which the cylinder head (not shown) attaching side is open before insertion of the bonding member 705, as shown in FIG. 73, is formed into the form of glasses to surround each cylinder region, and the cooling water channels 709 for the individual cylinders are mutually connected. Such weirs as a biscuit 703a or an overflow 703b produced during the casting process are formed on the cylinder block body 703.

Figure 74:
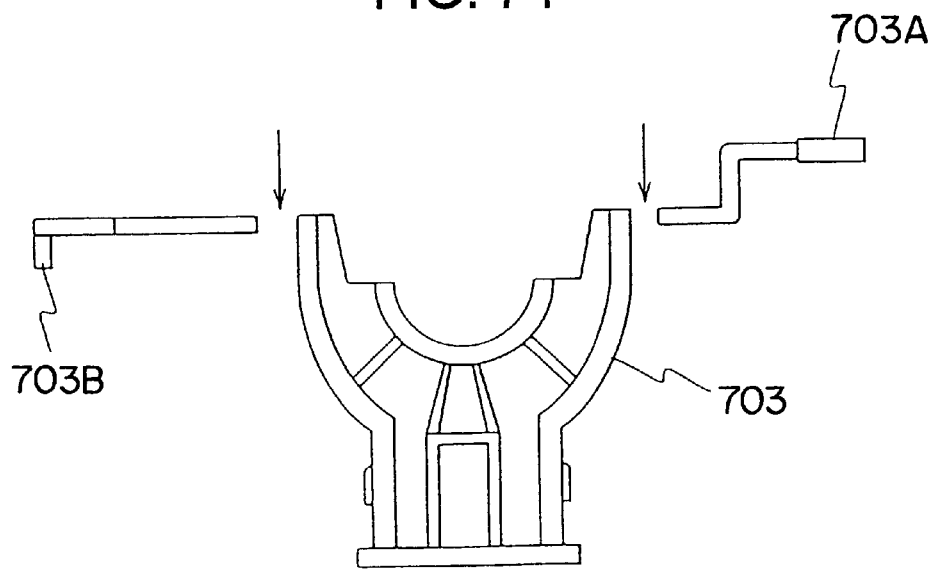
FIG. 74 is a side view illustrating a case where a weir such as an overflow of the cylinder block body shown in FIG. 73 is broken.

Now, the bonding method of the cylinder block body 703 and the bonding member 705 will be described in detail with reference to FIG. 71. Using a die-cast (S1 in FIG. 71) cylinder block body 703, bonding operations are started in a warm state before temperature of the cylinder block body 703 is decreased completely. First, as shown in FIG. 74, the weir such as the biscuit 703a or the overflow 703b formed on the cylinder block body 703 is broken (S2 in FIG. 71).

To prevent temperature of the cylinder block body 703 from decreasing, a constant temperature is kept by a heat holder (a hot plate, for example) (S3 in FIG. 71). At this point, heat accumulated during casting is utilized. As compared with the conventional practice of heating again after temperature has once been reduced to the room temperature, the required energy is smaller, and the operating time for heating can be omitted. Another advantage is that blisters or distortion caused by heating do not occur. It is necessary here to maintain the holding temperature at a level of at least 250° C. When bonding operation is continued immediately after casting, the heat accumulated during casting can directly be utilized. It is not therefore necessary to provide this heat holder. Heat holding is not necessary for an aluminum casting having a small mass and a small heat capacity (dotted line in FIG. 71).

Figure 75:
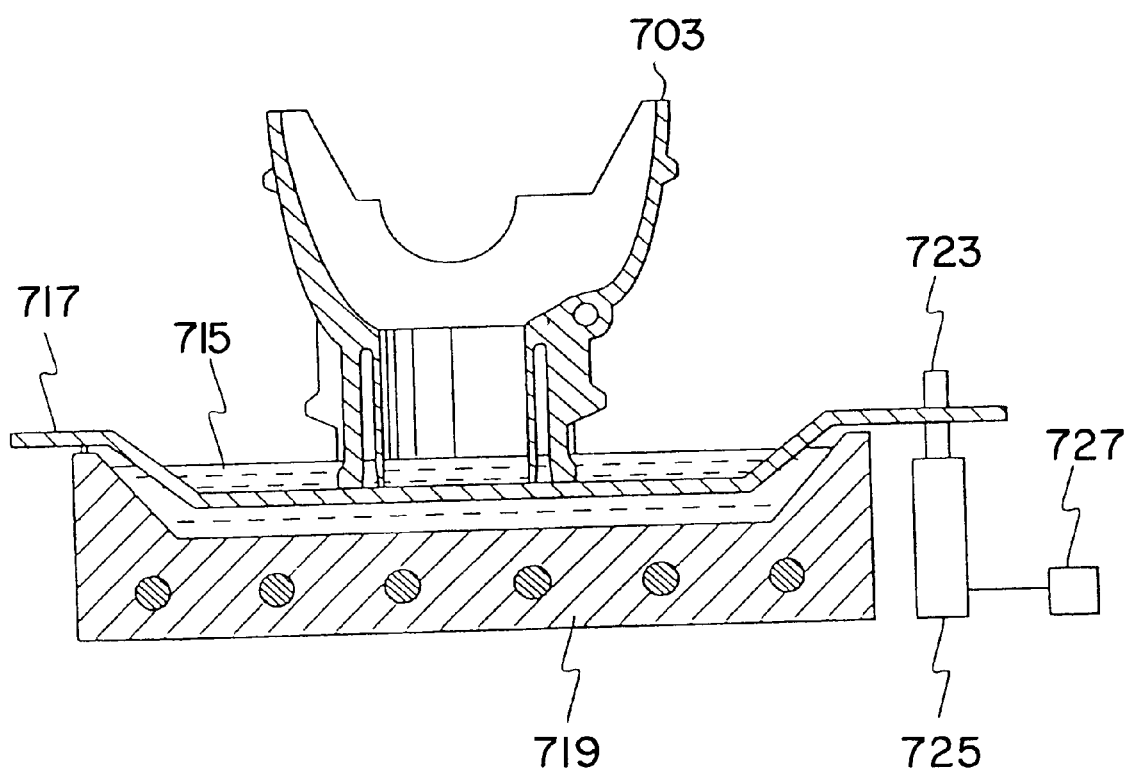
FIG. 75 is a sectional view illustrating a case where a zinc alloy soldering layer is formed in the cylinder block body.

Thereafter, a portion (cylinder head attaching side) of the cylinder block body 703 is immersed in a molten zinc alloy soldering bath 715 (S4 in FIG. 71), as shown in FIG. 75, in the state in which temperature of the cylinder block body 703 is still high. Ultrasonic vibration is applied through a vibration plate 717 (see FIG. 75) in the molten zinc alloy soldering bath 715 (S5 in FIG. 71). A zinc alloy soldering layer is formed in the proximity of the cooling water channel 709 (S6 in FIG. 71).

Now, an apparatus for applying ultrasonic vibration to the cylinder block body 703 will be described in detail. The cylinder block body 703 is carried by the prescribed vibration plate 717 as shown in FIG. 75, and the proximity of the portion to be attached with the cylinder heat (not shown) is immersed in the molten zinc alloy soldering bath 715. This molten zinc alloy soldering bath 715 is held in a soldering tank 719 with a heater, which maintains temperature of the molten zinc alloy soldering bath 715 at a prescribed level. A prescribed ultrasonic apparatus is engaged with the vibration plate 717 for communicating ultrasonic vibration. This ultrasonic apparatus comprises a horn 723 giving ultrasonic vibration to the above-mentioned vibration plate 717, a vibrator 725 transmitting vibration to this horn 723, and an oscillator 727 communicating an oscillation signal to the vibrator 725.

Now, the bonding member 705 as the second aluminum casting will be described. The bonding member 705 ha s a construction permitting engagement with the cooling water channel 709 (see FIG. 76) of the foregoing cylinder block body 703, or more specifically, is of the block type having a trapezoidal cross-section. When manufacturing the bonding member 705, on the other hand, it is first formed into a shape and size that permit insertion into the channel walls of the cooling water channel 709 of the cylinder block body 703 by die casting (S11 in FIG. 71). The prescribed weir is then broken (S12 in FIG. 71). The manufacturing method is not however limited to die casting, but for example, it may be manufactured by grinding out a prescribed shape from a rolled material. The surface on the side in contact with the cooling water channel 709 is machined.

Figure 76:
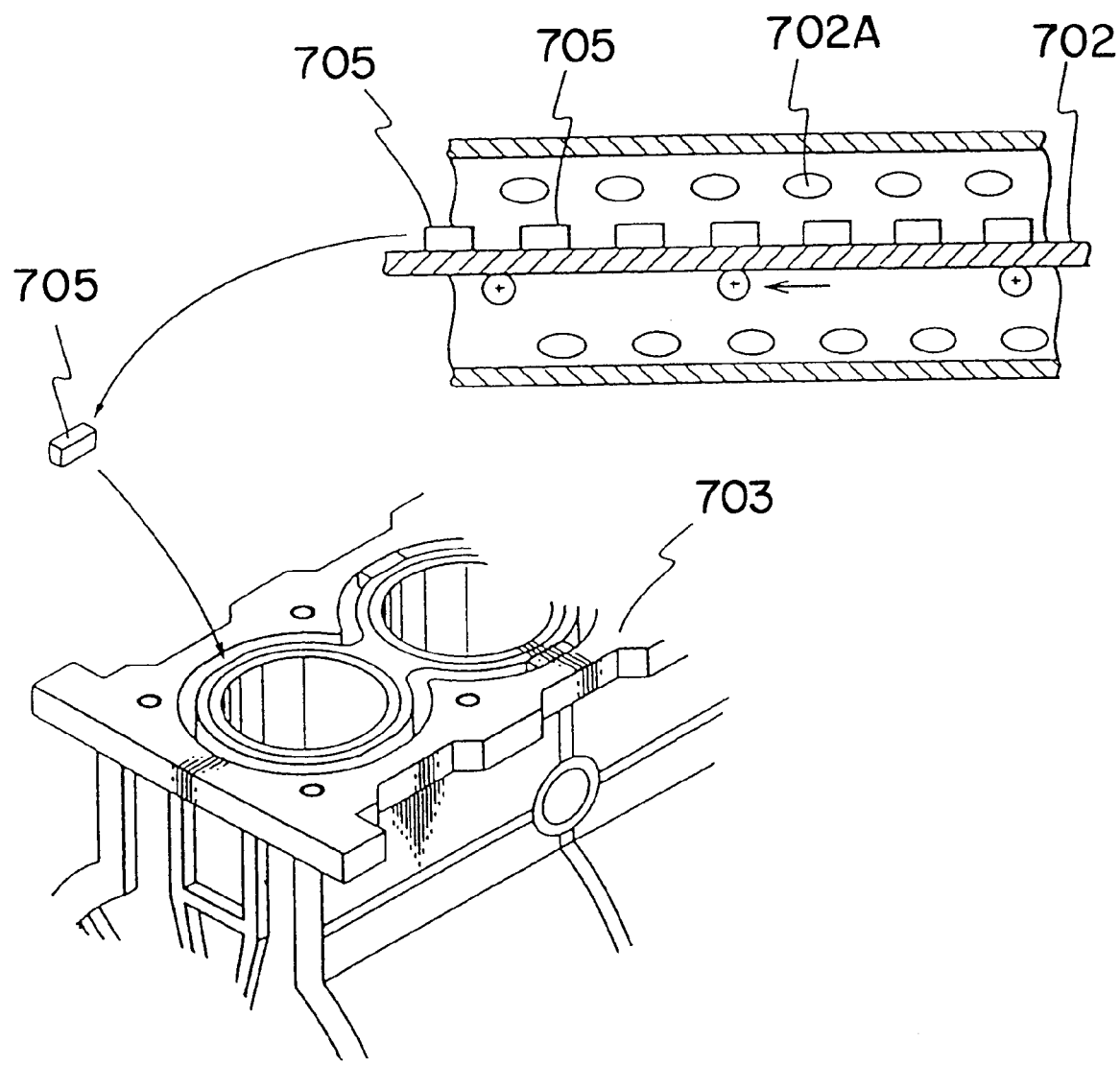
FIG. 76 is a perspective view illustrating a preheater preheating the bonding member as a second aluminum casting and a case of engaging the bonding member with the cylinder block body 3.

After machining, it is preheated to a prescribed temperature (S13 in FIG. 71). The preheater here is a continuous type heating furnace capable of continuously preheating a number of bonding members 705, as shown in FIG. 76, and comprises a belt conveyor 702 and a heater 702a. The preheated bonding member 705 is taken out, and immersed in the molten zinc alloy soldering bath 715 (S14 in FIG. 71), and ultrasonic vibration is applied (S15 in FIG. 71). At this point, immersion of the bonding member 705 in the molten zinc alloy soldering bath 715 forms a zinc alloy soldering layer over the entire surface of the bonding member 705 (S16 in FIG. 71), but this poses no problem in the manufacture.

Now, the process of conducting bonding by inserting the bonding member 705 into the cylinder block body 703 will be described. As described above, zinc alloy soldering layers are formed on the cylinder block body 703 and the bonding member 705, respectively, and as shown in FIG. 76, the bonding member 705 is engaged with, or tacked to, the cooling water channel 709 at the top end of the cylinder block body 703 (S21 in FIG. 71). Prior to this engagement or tacking, the bonding member 705 is preheated by the preheater to a prescribed temperature.

Figure 77:
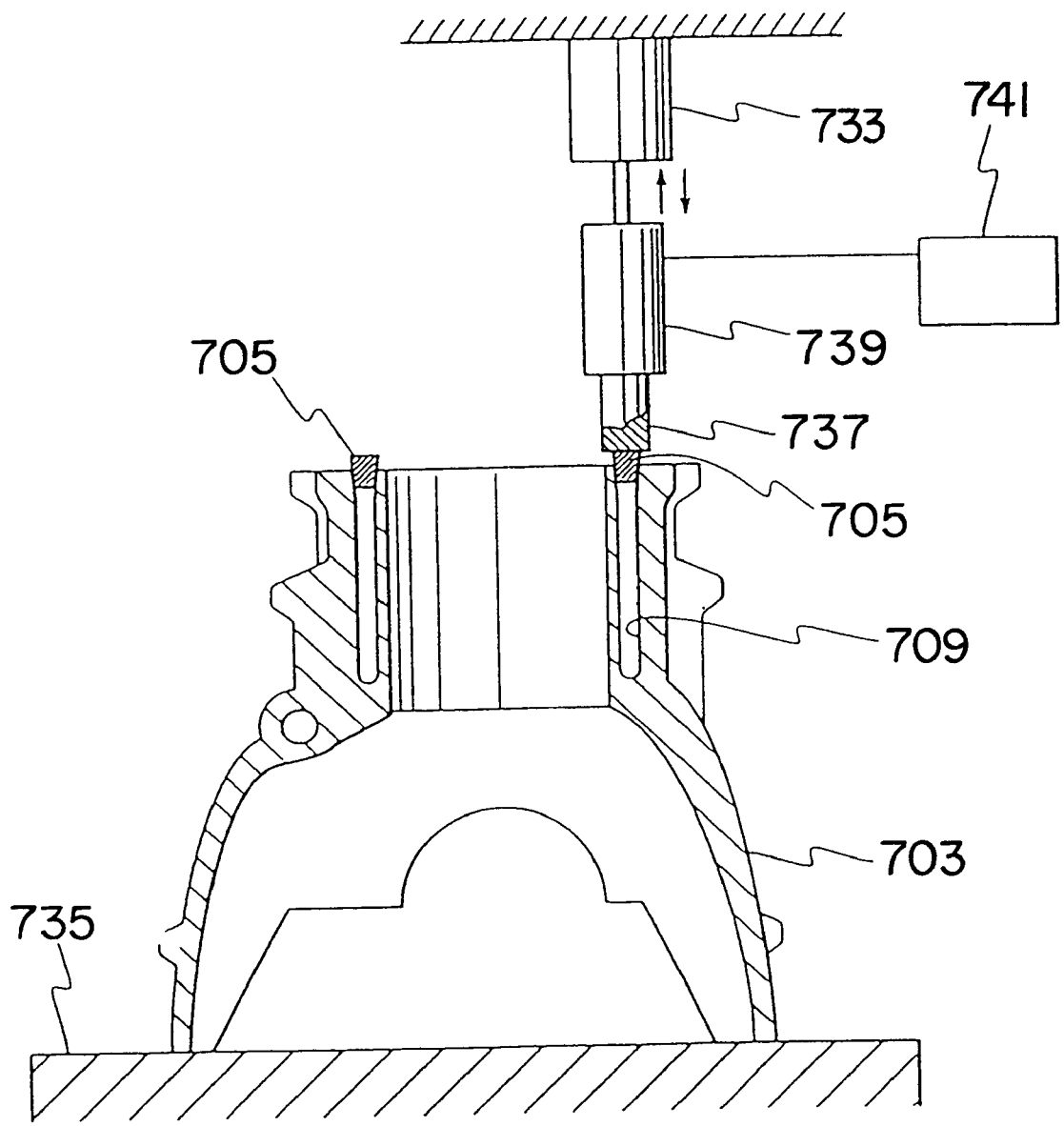
FIG. 77 is a partially cut-away side view illustrating an ultrasonic bonding apparatus bonding the cylinder block body and the bonding member.

The bonding member 705 and the cylinder block body 703 formed integrally as described above are finally bonded by the use of a separately provided ultrasonic bonding apparatus as shown in FIG. 77. This ultrasonic bonding apparatus is arranged above the cylinder block body 703 carried by a prescribed base member 735, and comprises a horn 737 in direct contact with the bonding member 705, a vibrator 739 communicating vibration to this horn 737, and an air cylinder 733 moving this vibrator 739 up and down. An oscillator 741 giving an oscillation signal is connected to the vibrator 739.

The vibrator 739 and the horn 737 go down under the action of the air cylinder 733. The horn 737 comes into contact with the bonding member 705 engaged with the cylinder block body 703. Thereafter, ultrasonic vibration is applied through the horn 737 to the bonding member 705. Since the air cylinder 733 presses the bonding member 705 against the cylinder block body 703 always with a prescribed pressure, the bonding member 705 is gradually inserted into the cooling water channel 709 of the cylinder block body 703 along with application of ultrasonic vibration.

These steps connect the cylinder block body 703 integrally with the bonding member 705, and machining finally applied completes a cylinder block.

In this embodiment, a case where accumulated heat by casting is utilized only on the side of the cylinder block body 703 as the first aluminum casting has been described. This is because the cylinder block body 703 has a larger weight and a larger heat capacity as compared with the bonding member 705, and requires larger energy for heating. That is, when an aluminum casting having a larger heat capacity is once cooled to the room temperature, it is difficult to heat it again to a prescribed temperature, and application of the present invention to an aluminum casting having a large heat capacity gives a more remarkable effect.

Figure 78:
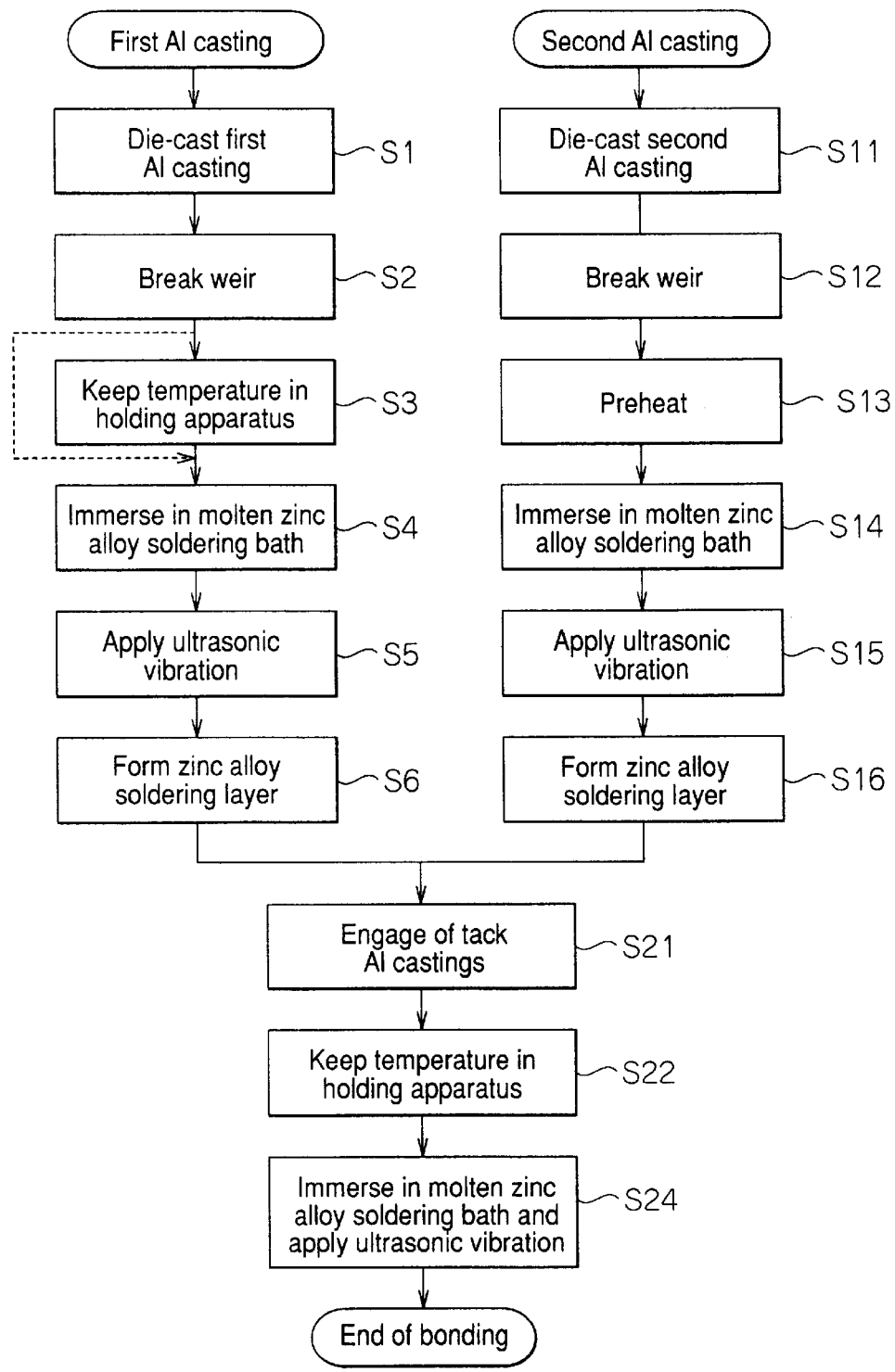
FIG. 78 is a flowchart illustrating a variation of the sixth embodiment.
Figure 79:
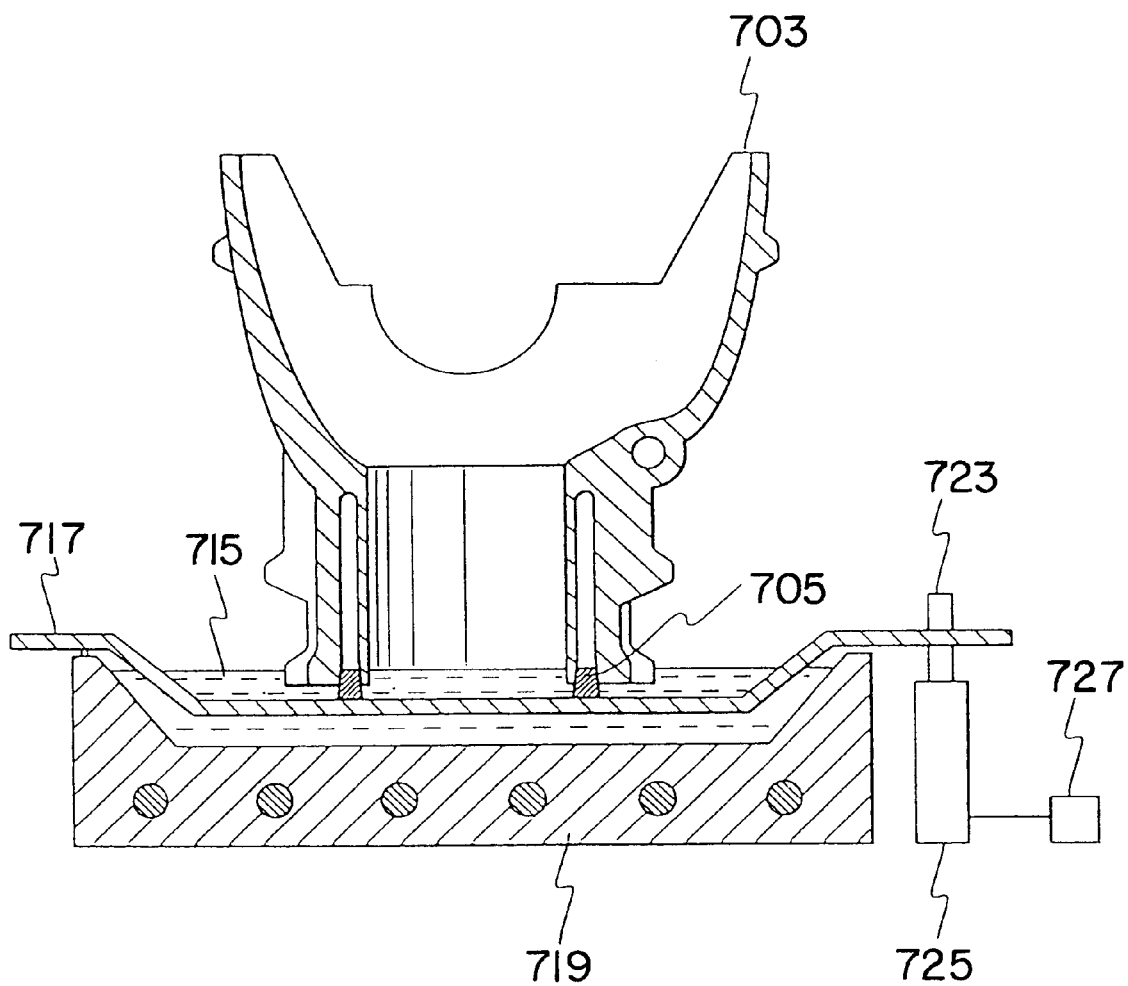
FIG. 79 is a sectional view illustrating a molten zinc alloy soldering bath and an ultrasonic equipment applied to the bonding method of aluminum members shown in FIG. 78.

Now, a variation of the present embodiment will be described with reference to FIGS. 78 and 79. This variation is different in that the cylinder block body 703 having the bonding member 705 inserted into the cooling water channel 709 thereof is kept at a prescribed temperature by a heat holder (S22 in FIG. 78). Thereafter, as shown in FIG. 79, the proximity region of the bonding member 705 is immersed again in the molten zinc alloy soldering bath 715. Ultrasonic vibration is applied through the vibration plate 717 (S24 in FIG. 78), and the bonding member 705 is firmly bonded to the cylinder block body 703. Even in this variation, the cylinder block body 703 and the bonding member 705 are appropriately bonded by the effect of the weight of the cylinder block body 703 and ultrasonic vibration.

Figure 80:
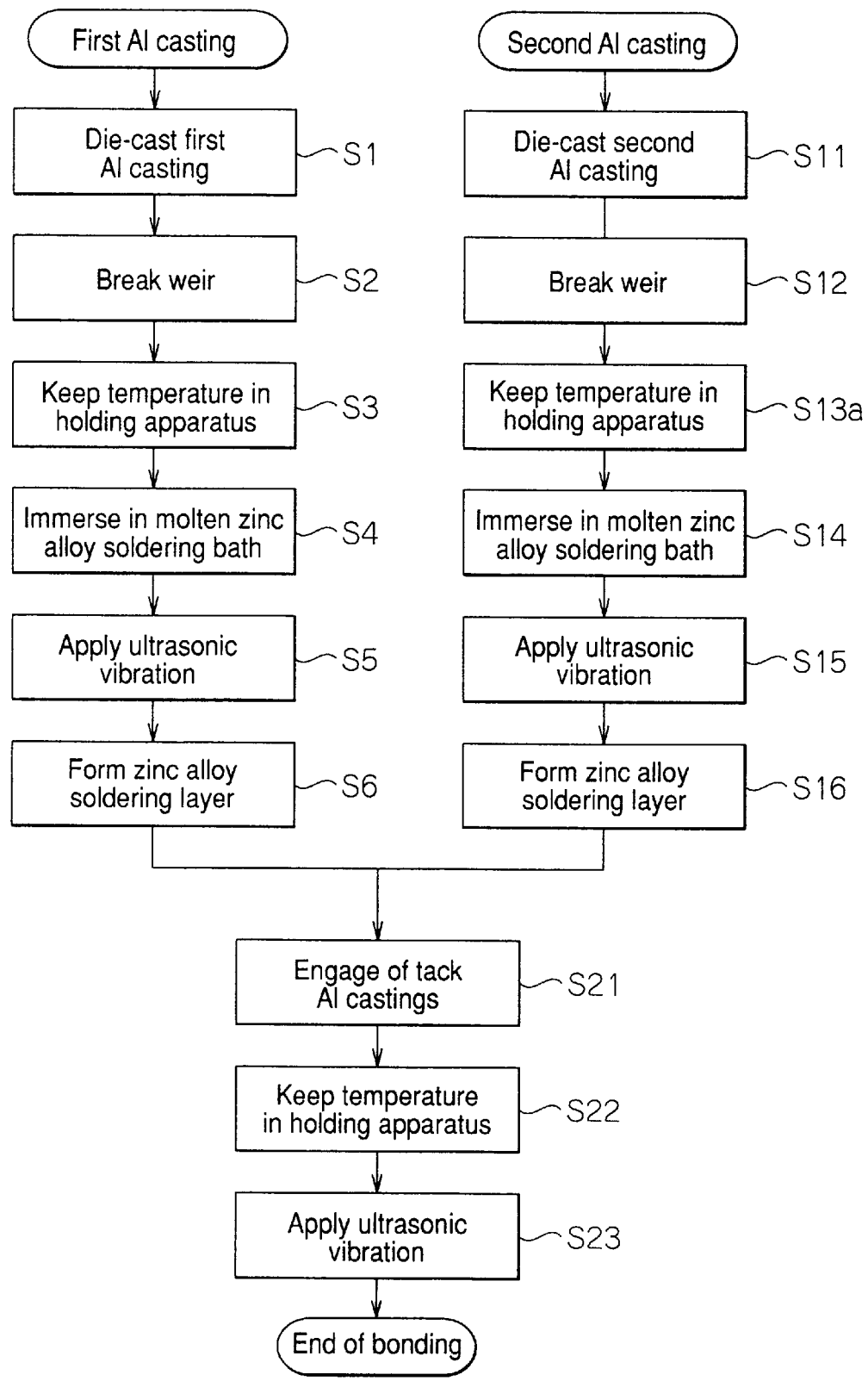
FIG. 80 is a flowchart illustrating another variation of the sixth embodiment.

Now, another variation of the embodiment will be described below with reference to FIG. 80. In this variation, the heat accumulated during casting is utilized also for the bonding member 705 as the second aluminum casting to form a zinc alloy soldering layer. As shown in FIG. 80, after casting of the second aluminum casting, the weir is broken in a warm state (S12 in FIG. 80). Heat is held by the heat holder (S13a in FIG. 80) to prevent temperature of the bonding member 705 from decreasing. Ultrasonic vibration is applied by an ultrasonic bonding apparatus, the other steps being the same as in the above embodiment (S23 in FIG. 80), thus bonding the bonding member 705.

Figure 81:
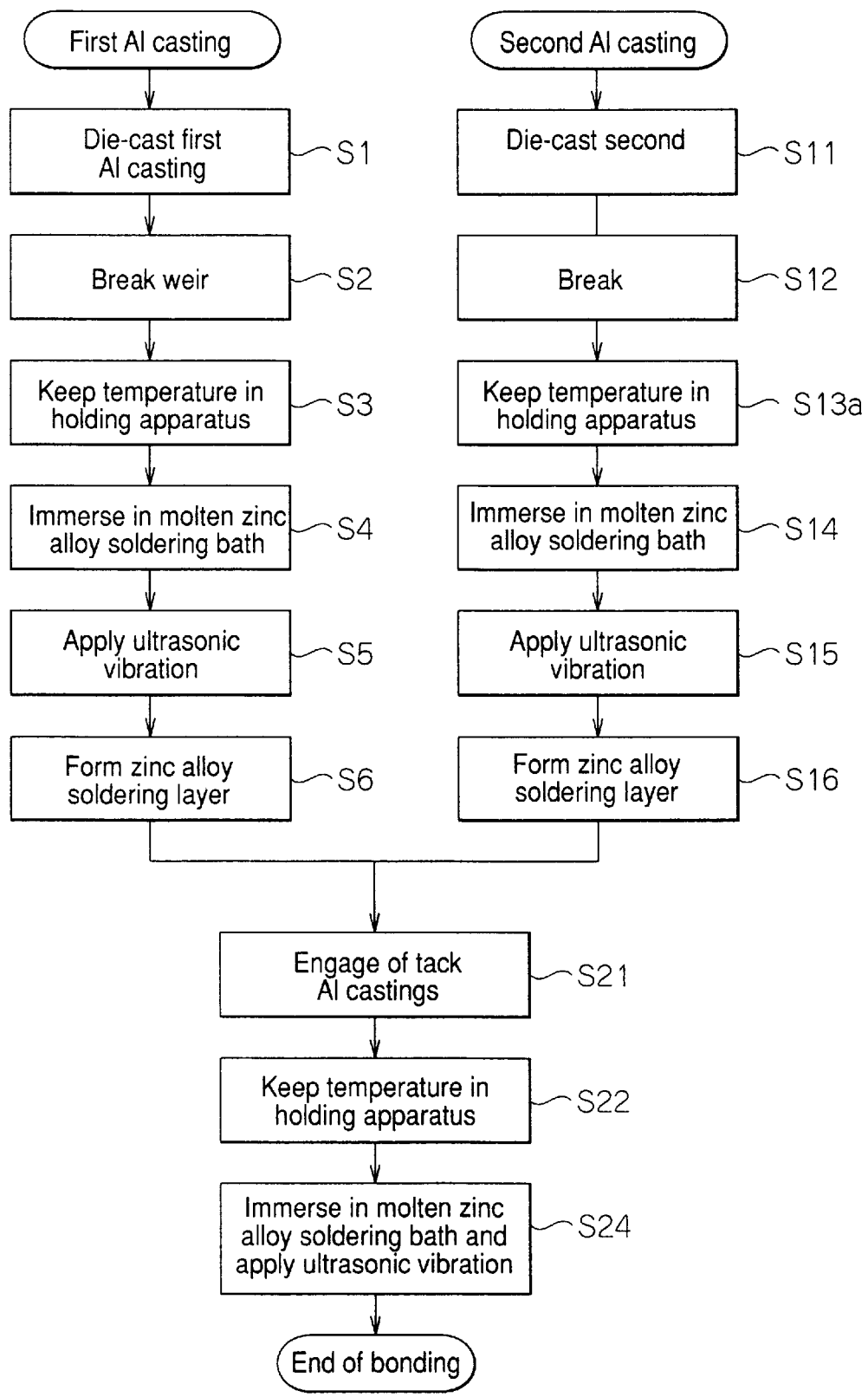
FIG. 81 is a flowchart illustrating another variation of the sixth embodiment.

Another variation of the embodiment will now be described with reference to FIG. 81. In this variation, the difference is in that ultrasonic vibration is applied in the molten zinc alloy soldering bath 715 in place of the application of ultrasonic vibration by the ultrasonic bonding apparatus in the final bonding step, thereby bonding the bonding member 705 (S24 in FIG. 81).

In the present invention, a zinc alloy soldering layer is formed in a prescribed region of an aluminum casting while applying ultrasonic vibration in a warm state of the aluminum casting after casting. This provides an excellent effect of improving the time efficiency in manufacture, eliminating the need of the conventional preheating process.

In the present invention, in which the aluminum casting immediately after casting is held at a temperature, and the zinc alloy soldering layer is formed by the utilization of the accumulated heat of casting, heating energy for preheating is not necessary, requiring only energy for holding temperature to the minimum extent, thus providing an excellent effect of permitting improvement of energy efficiency as well.

In addition, because reheating of the aluminum casting becomes partially unnecessary, it is possible to avoid blisters or distortion of the aluminum casting itself caused by reheating, and to prevent decrease in strength of the aluminum casting itself.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application Nos. 8-35444 (Filed on Jan. 30, 1996), 8-44111 (Filed on Feb. 6, 1996), 8-54227 (Filed on Feb. 16, 1996), 8-58460 (Filed on Feb. 21, 1996), 8-166880 (Filed on Jun. 6, 1996), 8-186615 (Filed on Jun. 27, 1996), 8-267947 (Filed on Sep. 18, 1996) including specification, claims, drawings and summary are incorporated herein by reference in its entirety.

What is claimed is:

1. A method of bonding aluminum members comprising, a first aluminum member and a second aluminum member to be bonded together, the method comprising:

forming a zinc alloy soldering layer on at least one surface of the first aluminum member and at least one surface of the second aluminum member while applying ultrasonic vibration thereon, to form bonding surfaces on the first aluminum member and the second aluminum member;

bringing the first aluminum member and the second aluminum member into abutting relationship to form a gap between the bonding surfaces, wherein the gap has a length in a range of from 0.2 mm to 1.5 mm; and bonding together the first aluminum member and the second aluminum member though the zinc alloy soldering layer.

2. The method of claim 1, wherein the first aluminum member comprises a cylinder block body on which a cooling water channel is formed along the periphery of a cylinder liner, the cooling water channel being formed by opposed channel walls, and the second aluminum member comprises a bonding member for bonding together opposed channel walls forming the cooling water channel.

3. The method of claim 2, wherein the cylinder block body comprises a cylinder head attaching side and the zinc alloy soldering layer relative to the cylinder block body is formed within an end region on the cylinder head attaching side of the cylinder block body.

4. A method of bonding aluminum members according to claim 2, wherein the opposed channel walls of said cylinder block body are bonded together by means of said bonding member through said zinc alloy soldering layer.

5. The method of claim 2, wherein one of the opposed channel walls of said cylinder block is formed with a channel wall of the cylinder block body, and the other is formed with an outer peripheral wall of the cylinder liner, whereby the channel wall and the outer peripheral wall are bonded together by the bonding member through said zinc alloy soldering layer.

6. The method of claim 2, comprising engaging the bonding member with the channel wall of the cylinder block body under a prescribed pressure to form a joint therebetween, and bonding of the both members by heating the proximity of the joint and applying ultrasonic vibration to at least one of the cylinder block body and the bonding member.

7. A method of bonding aluminum members according to claim 1, wherein the first aluminum member comprises a cylinder block body having a cylinder head attaching side, and comprising a recess forming a cooling water channel on a periphery of a cylinder liner, and the second aluminum member comprises a sealing member which seals the recess from the cylinder head attaching side;

which comprises:
forming a liner-supporting hole having substantially the same diameter as an outside diameter of the cylinder liner in the scaling member after forming the soldering layer and after bonding; and
pressure-inserting the cylinder liner into the liner supporting hole.

8. The method of claim 7, wherein the sealing member comprises at least two liner-supporting holes.

9. The method of claim 7, wherein the cylinder block body comprises an end region and the zinc alloy soldering layer relative to the cylinder block body is formed within the end region of the cylinder block body.

10. The method of claim 7, which comprises:
engaging the sealing member with the end region of said cylinder block body;
heating the proximity of the end region; and
bonding comprising applying ultrasonic vibration to at least one of the cylinder block body and the scaling member.

11. The method of claim 1, wherein the first aluminum member and the second aluminum member comprise a first bonding member and a second bonding member, respectively, comprising bonding surfaces formed with the zinc alloy soldering layer;
the method comprising:

bringing the bonding surfaces of the bonding members to be bonded into abutting relationship to form the gap;
immersing the gap into a molten zinc alloy soldering bath;
filling the gap with molten zinc alloy by applying ultrasonic vibration to the proximity of the gap; and then,
bonding the bonding members while applying pressure uniformly onto the bonding surfaces.

12. The method of claim 11, comprising releasably abutting the bonding members.

13. The method of claim 1, wherein said first aluminum member is a first aluminum casting, and the second aluminum member is a second aluminum casting;
which comprises:
forming a zinc alloy soldering layer on a prescribed portion of the first aluminum casting in during the forming of the soldering layer in a hot state after casting the first aluminum casting; and then
bonding the second aluminum casting to the first aluminum casting through the zinc alloy soldering layer.

14. The method of claim 13, wherein the first aluminum casting is held at a temperature after casting of the aluminum casting, and after forming the soldering layer, and the second aluminum casting is bonded to the first aluminum casting.

15. The method of claim 1, wherein the zinc alloy solder used to form the soldering layer comprises from 88 to 99 wt. % Zn, from 0.5 to 8 wt. % Al, from 0.5 to 4 wt. % Mg, from 0 to 1.5 wt. % Cu, and from 0 to 1.0 wt. % other elements.

16. A method of bonding aluminum members comprising a first aluminum member and a second aluminum member to be bonded together, the method comprising:
forming a zinc alloy soldering layer on at least one surface of the first aluminum member and at least one surface of the second aluminum member while applying ultrasonic vibration thereon, to form bonding surfaces on the first aluminum member and the second aluminum member; and
bonding together the first aluminum member and the second aluminum member through the zinc alloy soldering layer, wherein the zinc alloy solder used to form the the soldering layer comprises from 88 to 99 wt. % Zn, from 0.5 to 8 wt. % Al, from 0.5 to 4 wt. % Mg, from 0 to 1.5 wt. % Cu, and from 0 to 1.0 wt. % other elements.

17. The method of claim 16, wherein the first aluminum member comprises a cylinder block body on which a cooling water channel is formed along the periphery of a cylinder liner, the cooling water channel being formed by opposed channel walls, and the second aluminum member comprises a bonding member for bonding together opposed channel walls forming the cooling water channel.

18. The method of claim 17, wherein the cylinder block body comprises a cylinder head attaching side and the zinc alloy soldering layer relative to the cylinder block body is formed within an end region on the cylinder head attaching side of the cylinder block body.

19. A method of bonding aluminum members according to claim 17, wherein the opposed channel walls of said cylinder block body are bonded together by means of said bonding member through said zinc alloy soldering layer.

20. The method of claim 17, wherein one of the opposed channel walls of said cylinder block is formed with a channel wall of the cylinder block body, and the other is formed with an outer peripheral wall of the cylinder liner, whereby the channel wall and the outer peripheral wall are bonded together by the bonding member through said zinc alloy soldering layer.

21. The method of claim 17, comprising, engaging the bonding member with the channel wall of the cylinder block body under a prescribed pressure to form a joint therebetween, and bonding of the both members by heating the proximity of the joint and applying ultrasonic vibration to at least one of the cylinder block body and the bonding member.

22. A method of bonding aluminum members according to claim 16, wherein the first aluminum member comprises a cylinder block body having a cylinder head attaching side, and comprising a recess forming a cooling water channel on a periphery of a cylinder liner, and the second aluminum member comprises a sealing member which seals the recess from the cylinder head attaching side;

which comprises:

forming a liner-supporting hole having substantially the same diameter as an outside diameter of the cylinder liner in the sealing member after forming the soldering layer and after bonding and pressure-inserting the cylinder liner into the liner supporting hole.

23. The method of claim 22, wherein the sealing member comprises at least two liner-supporting holes.

24. The method of claim 22, wherein the cylinder block body comprises an end region and the zinc alloy soldering layer relative to the cylinder block body is formed within the end region of the cylinder block body.

25. The method of claim 22, which comprises:

engaging the sealing member with the end region of said cylinder block body;

heating the proximity of the end region; and bonding comprising applying ultrasonic vibration to at least one of the cylinder block body and the sealing member.

26. The method of claim 16, wherein the first aluminum member and the second aluminum member comprise a first bonding member and a second bonding member, respectively, comprising bonding surfaces formed with the zinc alloy soldering layer;

the method comprising:

bringing the bonding surfaces of the bonding members to be bonded into abutting relationship to form a gap;

immersing the gap into a molten zinc alloy soldering bath;

filling the gap with molten zinc alloy by applying ultrasonic vibration to the proximity of the gap; and then, bonding the bonding members while applying pressure uniformly onto the bonding surfaces.

27. The method of claim 16, wherein said first aluminum member is a first aluminum casting, and the second aluminum member is a second aluminum casting;

which comprises:

forming a zinc alloy soldering layer on a prescribed portion of the first aluminum casting in during the forming of the soldering layer in a hot state after casting the first aluminum casting; and then bonding the second aluminum casting to the first aluminum casting through the zinc alloy soldering layer.

28. The method of claim 27, wherein the first aluminum casting is held at a temperature after casting of the aluminum casting, and after forming the soldering layer, and the second aluminum casting is bonded to the first aluminum casting.

29. The method of claim 26, wherein the gap has a length in a range of from 0.2 mm to 1.5 mm.

\* \* \* \* \*

UNITED STATES PATENT AND TRADEMARK OFFICE
CERTIFICATE OF CORRECTION

PATENT NO. : 6,148,515
DATED : November 21, 2000
INVENTOR(S) : N. Suzuki et al.

It is certified that error appears in the above-identified patent and that said Letters Patent is hereby corrected as shown below:

Column 34,
Line 55 (claim 1, line 1) after "comprising" delete -- , --.
Line 57 (claim 1, line 3) "bc" should be -- be --.

Column 35,
Line 44 (claim 7, line 11) "scaling" should be -- sealing --.
Line 59 (claim 10, line 6) "scaling" should be -- sealing --.

Column 37,
Line 1, (claim 21, line 1) after "comprising" delete -- , --.

Signed and Sealed this

Sixth Day of November, 2001

Attest:

NICHOLAS P. GODICI
*Attesting Officer*   *Acting Director of the United States Patent and Trademark Office*